(12) United States Patent
Dacosta

(10) Patent No.: US 9,730,100 B2
(45) Date of Patent: *Aug. 8, 2017

(54) TERSE MESSAGE NETWORKS

(71) Applicant: DYNAMIC MESH NETWORKS, INC., Santa Clara, CA (US)

(72) Inventor: Francis Dacosta, Santa Clara, CA (US)

(73) Assignee: MeshDynamics, Santa Clara, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 14/523,778

(22) Filed: Oct. 24, 2014

(65) Prior Publication Data

US 2015/0138977 A1    May 21, 2015

Related U.S. Application Data

(63) Continuation-in-part of application No. 13/627,883, filed on Sep. 26, 2012, now Pat. No. 8,923,186, and
(Continued)

(51) Int. Cl.
*H04H 20/71* (2008.01)
*H04W 28/02* (2009.01)
(Continued)

(52) U.S. Cl.
CPC ..... *H04W 28/021* (2013.01); *H04W 28/0268* (2013.01); *H04W 84/18* (2013.01); *H04W 4/005* (2013.01)

(58) Field of Classification Search
CPC ........... H04W 28/021; H04W 28/0268; H04W 84/18; H04W 4/005
(Continued)

(56) References Cited

U.S. PATENT DOCUMENTS 5,818,830 A * 10/1998 Daane ............... H04W 72/0453
370/344
6,046,992 A * 4/2000 Meier ................... G06F 1/1626
370/256
(Continued)

*Primary Examiner* — Peter Cheng
(74) *Attorney, Agent, or Firm* — Cherskov Flaynik & Gurda, LLC

(57) ABSTRACT

A tree-shaped mesh network is discussed which uses a mesh of wireless nodes that form a tree shaped network with one root node having a connection to an external network; chirp clients; and wireless network clients. Chirp clients comprise low cost chirp devices wherein said low cost chirp devices transmit short duration messages wherein transmission of said short duration messages are scheduled at preset transmission intervals. At least one wireless node of the mesh of wireless nodes is a designated chirp-aware node wherein said chirp-aware node sets the preset transmission intervals for chirp client communication by broadcasting a beacon prior to transmission by chirp clients and said chirp-aware node further comprises a bridge between the short duration messages and IP based devices wherein said bridge includes a wireless receiver to receive the short duration messages and is connected to said external network. The short duration messages are encapsulated into action frames, for onward transmission to other chirp aware routers. Each wireless node further comprises two logical radios and a service radio wherein each wireless node uplink and downlink operates on distinct non-conflicting frequencies. The wireless network clients communicate with the wireless nodes using node service radios.

12 Claims, 56 Drawing Sheets

Related U.S. Application Data a continuation-in-part of application No. 13/541,446, filed on Jul. 3, 2012, now abandoned, and a continuation-in-part of application No. 12/696,947, filed on Jan. 29, 2010, now Pat. No. 8,520,691, application No. 14/523,778, filed on Oct. 24, 2014, which is a continuation-in-part of application No. 13/571,294, filed on Aug. 9, 2012, now Pat. No. 9,172,738, and a continuation-in-part of application No. 13/541,446, filed on Jul. 3, 2012, now abandoned, and a continuation-in-part of application No. 12/352,457, filed on Jan. 12, 2009, now Pat. No. 8,477,762, which is a continuation-in-part of application No. 11/266,884, filed on Nov. 4, 2005, now Pat. No. 7,583,648, and a continuation-in-part of application No. 10/434,948, filed on May 8, 2003, now Pat. No. 7,420,952, application No. 14/523,778, filed on Oct. 24, 2014, which is a continuation-in-part of application No. 13/952,781, filed on Jul. 29, 2013, now Pat. No. 9,049,000, which is a continuation of application No. 12/625,365, filed on Nov. 24, 2009, now Pat. No. 8,514,852.

(60) Provisional application No. 61/895,393, filed on Oct. 24, 2013, provisional application No. 61/555,400, filed on Nov. 3, 2011, provisional application No. 61/621,926, filed on Apr. 9, 2012, provisional application No. 61/615,802, filed on Mar. 26, 2012, provisional application No. 61/148,803, filed on Jan. 30, 2009, provisional application No. 60/696,144, filed on Jun. 30, 2005, provisional application No. 60/421,930, filed on Oct. 28, 2002, provisional application No. 61/117,502, filed on Nov. 24, 2008.

(51) Int. Cl.
*H04W 84/18* (2009.01)
*H04W 4/00* (2009.01)

(58) Field of Classification Search
USPC .......................................................... 370/312
See application file for complete search history.

(56) References Cited

U.S. PATENT DOCUMENTS

| | | | | |
|---|---|---|---|---|
| 7,085,292 | B1* | 8/2006 | Grayson | H04L 29/1232 370/475 |
| 8,923,186 | B1* | 12/2014 | daCosta | H04W 84/18 370/312 |
| 9,258,765 | B1* | 2/2016 | daCosta | H04W 84/18 |
| 9,363,651 | B1* | 6/2016 | daCosta | H04W 4/14 |
| 2002/0062388 | A1* | 5/2002 | Ogier | H04L 45/26 709/238 |
| 2002/0191573 | A1* | 12/2002 | Whitehill | H04L 1/0002 370/338 |

* cited by examiner

Fig. 25

DISTRIBUTED DHCP SERVICE WITH INHERENT CONFLICT RESOLUTION

ASSUME A FIXED SUBNET MASK OF 255.0.0.0 IS USED

- IP ADDRESSES OF THE FORM A.x.y.k where
- A defines the *CUSTOMER-NETWORK-ID* 16 bit (0 -255)
- k is *CLIENT BASED ID* 16 bit (0-255)
- x, y are each 16 bit : $2^{32}$ unique networks each with up 255 clients possible

POLICY DIRECTIVE: SPLIT UP ADDRESS SPACE BETWEEN STATIC and MOBILE networks

- Assign 15 bits to distributed DHCP services for floating networks
- Let NODES CHOOSE A RANDOM 15-bit NUMBER 'R' AT STARTUP and
  1. LET 'M' BE THE DECIMAL EQUIVALENT OF THE 7-MSBs OF 'R'
  2. LET 'N' THE DECIMAL EQUIVALENT OF THE 8-LSBs OF 'R'

THE DHCP ADDRESS SPACE OF THE NODE WOULD BE

A.255-M.N.0 to A.255-M.N.254 where 0<=M<=127 and 0<=N<=255

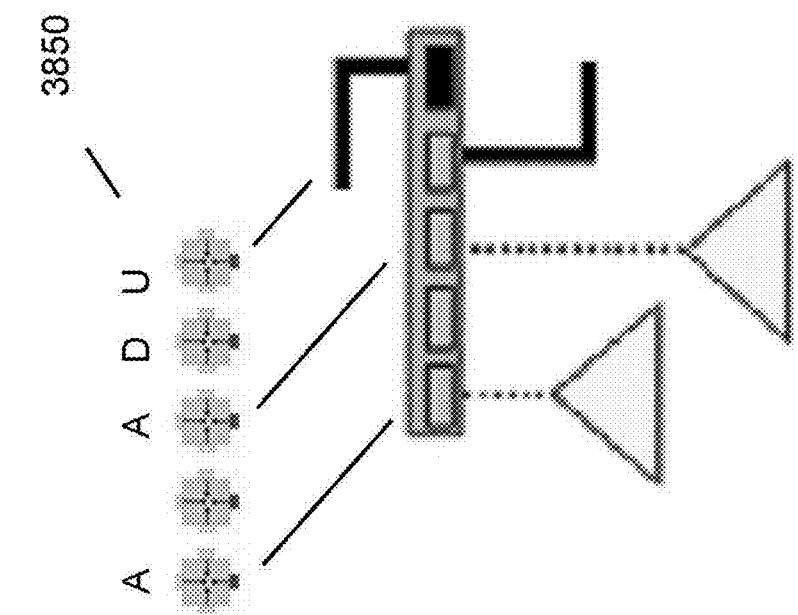
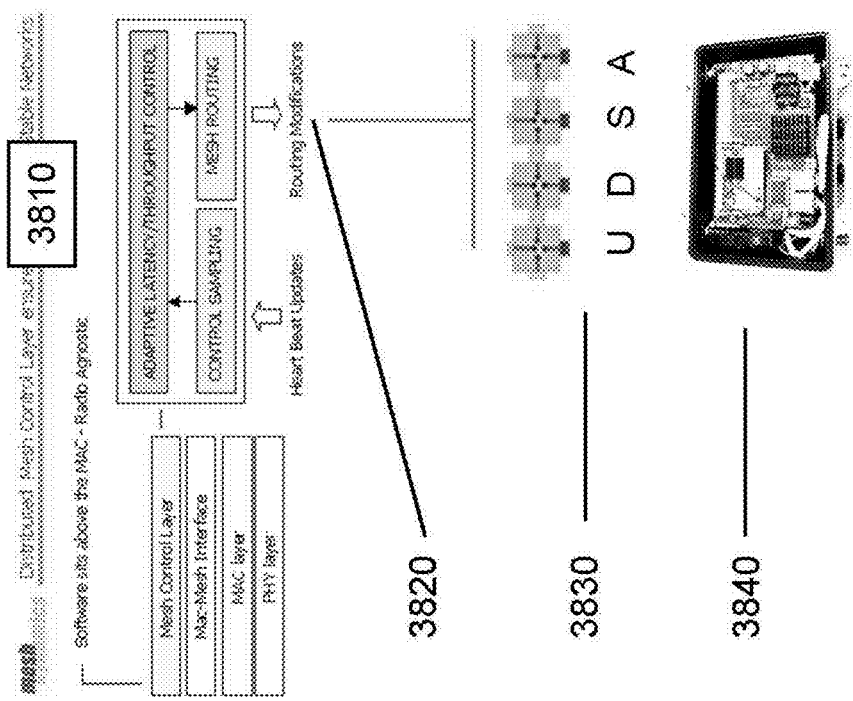
Fig. 30

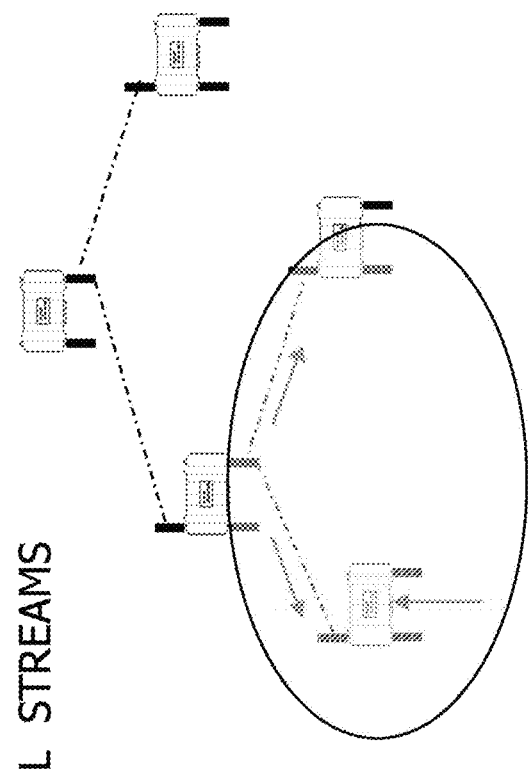
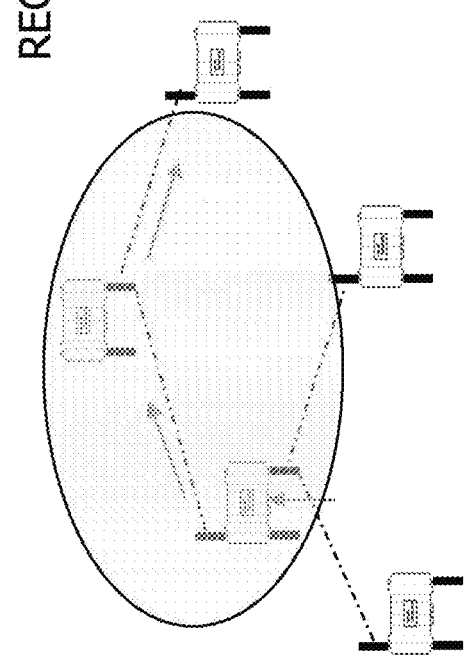
Fig. 40

Fig. 45

Package Class Tree Deprecated Index Help
PREV PACKAGE NEXT PACKAGE                                    FRAMES NO FRAMES

Package com.meshdynamics.api

Interface Summary

| | |
|---|---|
| NMS.ConnectedDevice | Defines the properties of all devices connected to a *see Node*. |
| NMS.NeighborNode | Defines the properties of all neighbor nodes detected by a *this Node*. |
| NMS.Network | The Network interface defines all properties and actions associated with a mesh network. |
| NMS.NetworkListener | The NetworkListener interface is used to receive events on a mesh network. |
| NMS.Node | The node interface defines all the properties and actions that can be carried out on a mesh node. |
| NMS.ThreadRunnable | The Runnable interface is implemented by any class whose instances are executed by a thread |

Class Summary

| | |
|---|---|
| NMS | NMS is the primary class for using the MeshdynamicsNetwork Management System |
| NMS.ACLConfiguration | Defines the Access Control List configuration for a node |
| NMS.ACLEntry | Defines an Access Control List entry |
| NMS.EthernameRate | Defines a Ethernet QoS rule. |
| NMS.GeneralConfiguration | Defines all Node level fields used by a *this Node*. |
| NMS.Hashable | The Hashable class provides an implementation of a Hashtable of generic Object keeps s |
| NMS.InterfaceConfiguration | Defines the interface level settings for a *see Node*. |
| NMS.ObjectArray | The ObjectArray class provides an interface to a growable array that stores object refere |
| NMS.ShortArray | Defines an array of short integers. |
| NMS.Thread | The Thread class provides multi-threading functionality to scripting platforms. |
| NMS.VlanConfiguration | Defines the settings for a Virtual LAN as a *this Node*. |
| NMS.WDRoamin | Defines the information used by the IEEE 802.11 Wired Equivalent Privacy (WEP) set |
| NMS.WPAEnterpriseSecurity | Defines the information used for the WPA Protected Access security setting by a Node s |
| NMS.WPAPersonalSecurity | Defines the information used for the WPA Protected Access (WPA) security setting by a |

All Classes

TERSE MESSAGE NETWORKS

CROSS REFERENCE TO RELATED APPLICATIONS

This application claims the priority benefit as a Nonprovisional of U.S. Provisional Application No. 61/895,393 filed on Oct. 24, 2013, the contents of which is incorporated herein by reference. This application also claims the priority benefit as a continuation in part of U.S. Utility application Ser. No. 13/627,883, filed on Sep. 26, 2012, patented as U.S. Pat. No. 8,923,186 on Dec. 30, 2014, the contents of which is incorporated herein by reference.

This application claims priority as a continuation in part of U.S. patent application Ser. No. 13/541,446, filed on Jul. 3, 2012, which claimed priority as a nonprovisional of the following U.S. Provisional Patent Applications: 61/555,400, filed on Nov. 3, 2011; 61/621,926, filed on Apr. 9, 2012; and 61/615,802, filed on Mar. 26, 2012. The contents of the '446, '400, '926, and '802 applications are hereby incorporated by reference.

The '446 application also claims priority as a continuation in part of U.S. patent application Ser. No. 12/696,947, filed on Jan. 29, 2010, patented as U.S. Pat. No. 8,520,691 on Aug. 27, 2013, which was a nonprovisional of U.S. Provisional Application No. 61/148,803, filed on Jan. 30, 2009. The contents of the '947 and '803 applications are hereby incorporated by reference.

This application claims priority as a continuation in part of U.S. patent application Ser. No. 13/571,294, filed on Aug. 9, 2012, which claimed priority as a nonprovisional of the following U.S. Provisional Patent Applications: 61/555,400, filed on Nov. 3, 2011; 61/621,926, filed on Apr. 9, 2012; and 61/615,802, filed on Mar. 26, 2012. The contents of the '294 application are hereby incorporated by reference. The '294 application also claims priority as a continuation-in-part to U.S. patent application Ser. No. 13/541,446. The '294 application further claims priority as a continuation-in-part to U.S. patent application Ser. No. 12/352,457, filed on Jan. 12, 2009, patented as U.S. Pat. No. 8,477,762 on Jul. 2, 2013, which claimed priority as a continuation-in-part to U.S. patent application Ser. No. 11/266,884, filed on Nov. 4, 2005, patented as U.S. Pat. No. 7,583,648 on Sep. 1, 2009, which in turn claimed priority as a nonprovisional of U.S. Provisional Patent Application No. 60/696,144, filed on Jun. 30, 2005, and as a continuation-in-part of U.S. application Ser. No. 10/434,948, filed on May 8, 2003 and patented as U.S. Pat. No. 7,420,952 on Sep. 2, 2008, which was a nonprovisional of U.S. Provisional Patent Application No. 60/421,930, filed on Oct. 28, 2002. The contents of the '457, '144, '884, '948, and '930 applications are hereby incorporated by reference.

This application claims priority as a continuation in part of U.S. patent application Ser. No. 13/952,781, filed on Jul. 29, 2013, which in turn claimed priority as a continuation of U.S. patent application Ser. No. 12/625,365, filed on Nov. 24, 2009, patented as U.S. Pat. No. 8,514,852 on Aug. 20, 2013, which was a nonprovisional of U.S. Provisional Application No. 61/117,502, filed on Nov. 24, 2008. The contents of the '781, '365, and '502 applications are hereby incorporated by reference.

BACKGROUND OF THE INVENTION

1. Field of the Invention

The invention relates to a system and method of aggregating and transmitting terse messages, especially terse machine to machine datagrams, commonly referred to as chirps.

2. Background of the Invention

The invention, in one embodiment, is a system and method of integrating terse messages into a pre-existing network, in this case a wireless mesh network. The terse messages occur within the context of Internet of Things ("IoT") machine to machine ("M2M") communications.

As networking continue to evolve, the burden on the IP packet routing infrastructure increases. Moore's law has helped with processing speed, but Moore's law is linear —$O(n)$- while Metcalfe's law is exponential —$O(n^2)$. As networks grow, exponential growth will overtake linear-growth systems. The growth of IoT is burgeoning and is occurring at the edge of the network. With IoT, a tipping point can occur, as the burgeoning M2M communication with cloud based services consume IP bandwidth at exponentially faster rates—both within local M2M social networks and the larger M2M social networks caused by multiple layers of publishers and subscribers.

A need exists in the art for a system and method of accommodating M2M and IoT communications within pre-existing networks without flooding the networks or decreasing their performance.

SUMMARY OF INVENTION

An object of the invention is to provide extensions to wireless mesh networks organized in a tree topology. A feature of the invention is that it adds terse messages to a tree-based topology network. An advantage of the invention is that it allows for terse messages to be routed within a wireless network in an optimal fashion.

Another object of the invention is to provide terse message or chirp routing protocols. A feature of the invention is that it includes routing protocols using extensible network management. An advantage of the invention is that terse messages are efficiently transmitted over a changing network.

Yet another object of the invention is to provide improvements in the transmission of terse messages. A feature of the invention is that it provides several means of managing chirp contention as well as providing security benefits. An advantage of the invention is that it facilitates creation of large data sets from terse messages.

A further object of the invention is to provide control loop polling intervals. A feature of the invention is that it provides a means for local decision making and local control. An advantage of the invention is that devices are able to make autonomous decisions on basis of terse messages.

Another object of the invention is to provide a classification-based protocol for routing. A feature of the invention is that it establishes terse message architectures, information encoding techniques and transmission information into the system. A benefit of the invention is that it creates agility at the edge of the network.

Another object of the invention is to limit latency and other forms of unfavorable network performance within a network. A feature of the invention is that it defines propagator nodes and networks to improve performance. An advantage of the invention is that it ensures that datagrams are processed within a relevant time period.

BRIEF DESCRIPTION OF DRAWING

The invention together with the above and other objects and advantages will be best understood from the following detailed description of the preferred embodiment of the invention shown in the accompanying drawings, wherein:

In FIG. 6, there is one service radio to service both voice and data customers. However voice and data traffic has different performance requirements. By having different Access Point radios service the voice and data clients, the contention between voice and data packets attempting to gain access to the same medium is reduced. Also, with different radios servicing the data and voice clients, the voice and data packets can now be treated differently. The Access Point radios servicing the voice clients could therefore be operating in TDMA (time division multiple access) mode while the AP radio servicing the data clients operates in CSMA (Collision Sense Multiple Access) mode. The two radios (032) and (034) thus provide different functionality. VoIP devices such as phones connect to the former, data devices such as laptops to the latter.

FIGS. 24 and 25 describe an embodiment wherein isolated network clusters may converge with distributed DHCP services and inherent conflict resolution using randomized sub net address ranges.

FIGS. 29 and 30 map the equivalent slots/ports of wired and wireless switch equivalents as shown in FIGS. 3 and 4.

FIG. 40 depicts broadcasts/streams restricted to a region. The region may be defined by geography, membership and mesh topology e.g. restrict the number of hops or sub trees. Further, the region may include directions: up/down or a set of turn by turn directions. An example of regional streams may include a section of the home, where only siblings of a sub tree need. Note that backhaul bandwidth is not affected outside stipulated regions. Restricted broadcasting improves overall network health.

FIGS. 45 and 46 depict the published interfaces for the Network Manager Streams API and the Heart Beat Entity relationships, respectively. Together, they enable speedy viewport development.

FIG. 51 is a example of a small "exchange" of multiple data streams, operating on different, non interfering wire-less media. The "vital signs" Integrator is fed exception and periodic, non urgent pruned data from the propagator. The exchange between device and integrator is managed by having two segmented control loops, maintained by the propagator. FIG. 52 is an example of a proactive control system, operating on the confluence of both local and external data publishers. The propagator, with appropriate transceivers, picks up multiple sensor streams, from a grid of diverse sensor types. Local Integrators/Agents residing in the propagator, can quick discern patterns and overall state of a large area—since small data is being generated and shared across a local mesh network, see FIGS. 49 through 50. Local data streams are consolidated to provide a composite view of the region of interest. This feeds a second control systems where big data publishers provide a more global perspective. Thus, weather forecasts predicting rain, can cause the cloud server to direct the propagator network to direct which section of the corn field need additional local irrigation.

DETAILED DESCRIPTION OF THE INVENTION

Figure 1:
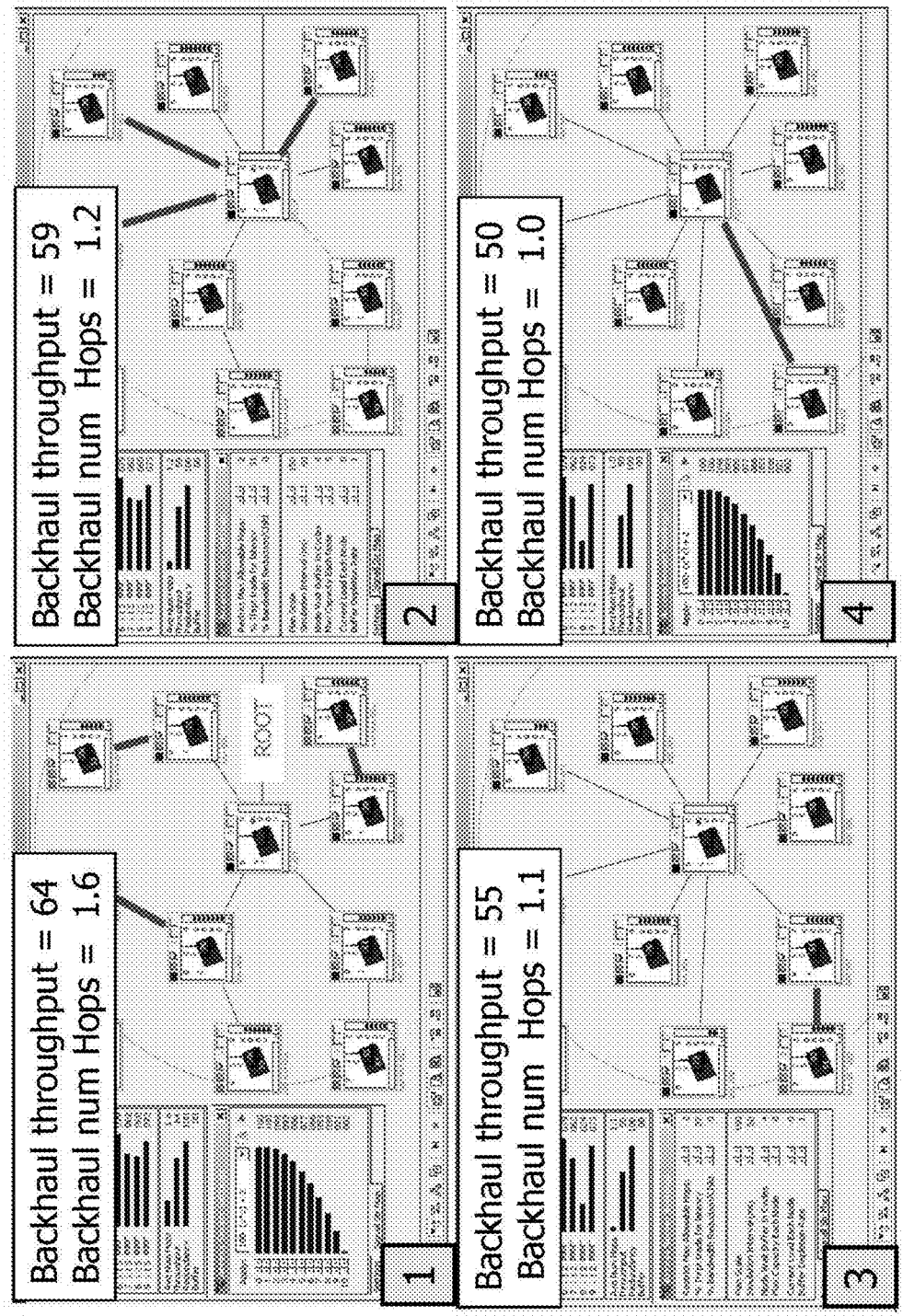
FIG. 1 illustrates how the network topology is changed by selecting a different backhaul in a two-radio system, with one link to the backhaul AP and the other link servicing the child AP. It depicts four network topologies. Each of the four network topologies provides a different set of performance in terms of latency and throughput. The mesh control software adjusts the latency and throughput parameters to meet voice/video or data performance requirements in terms of latency and bandwidth.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the embodiment described in the instant application, the terse or chirp datagrams are transmitted within a wireless mesh network. The details of the mesh network are described in U.S. Pat. No. 7,420,952 the contents of which are incorporated by reference into the instant application. The relevant concepts of the tree-shaped mesh network are described below.

Logical Radios and Tree Topologies

Figure 4:
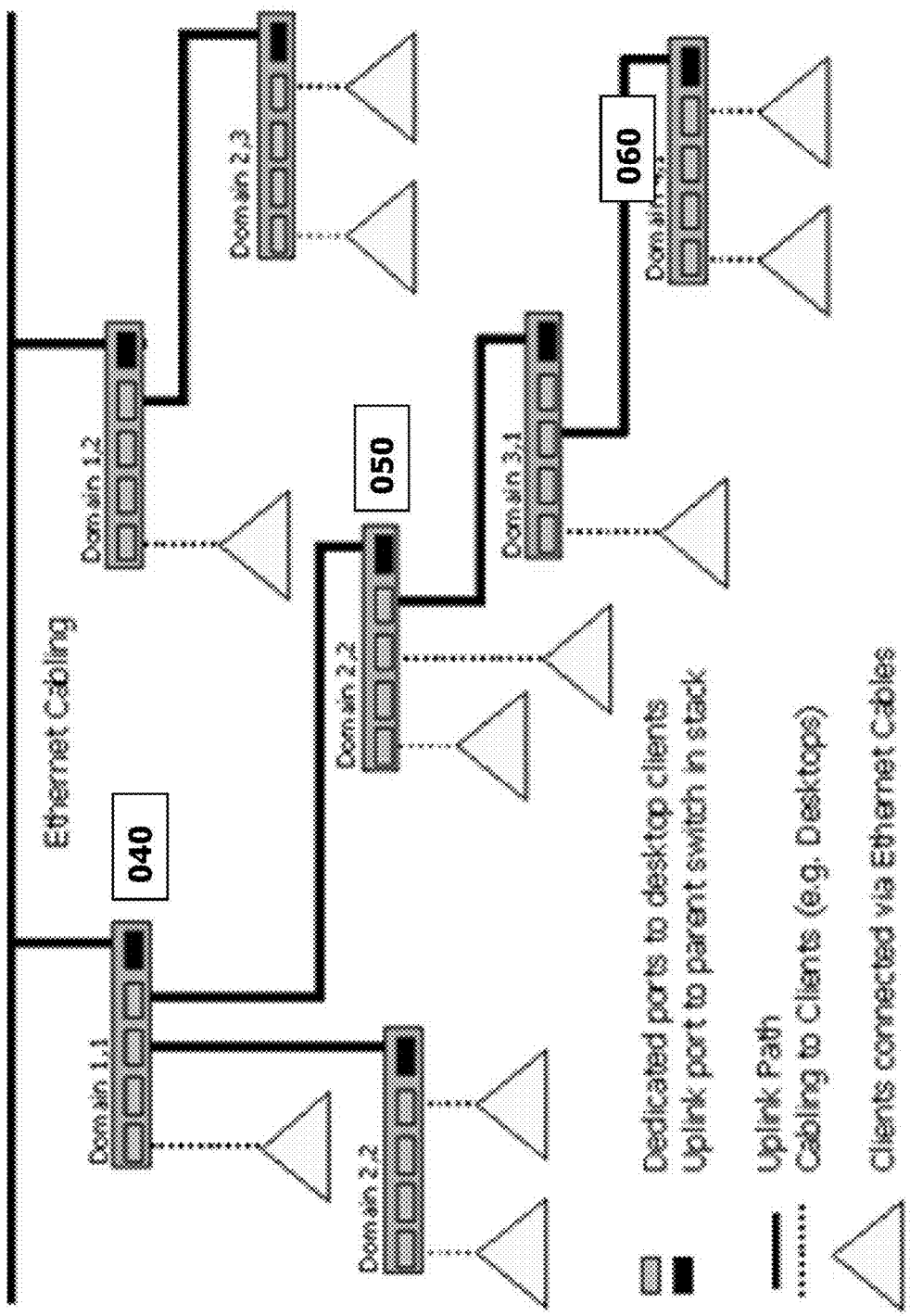
FIG. 4 shows the similarities between FIG. 3 and a wired switch stack with the same chain of connectivity 040-050-060. Both have the same tree-like structure and up link and down link connections. In both cases the units (040,050,060) operate on a distinct sub domain.
Figure 12:
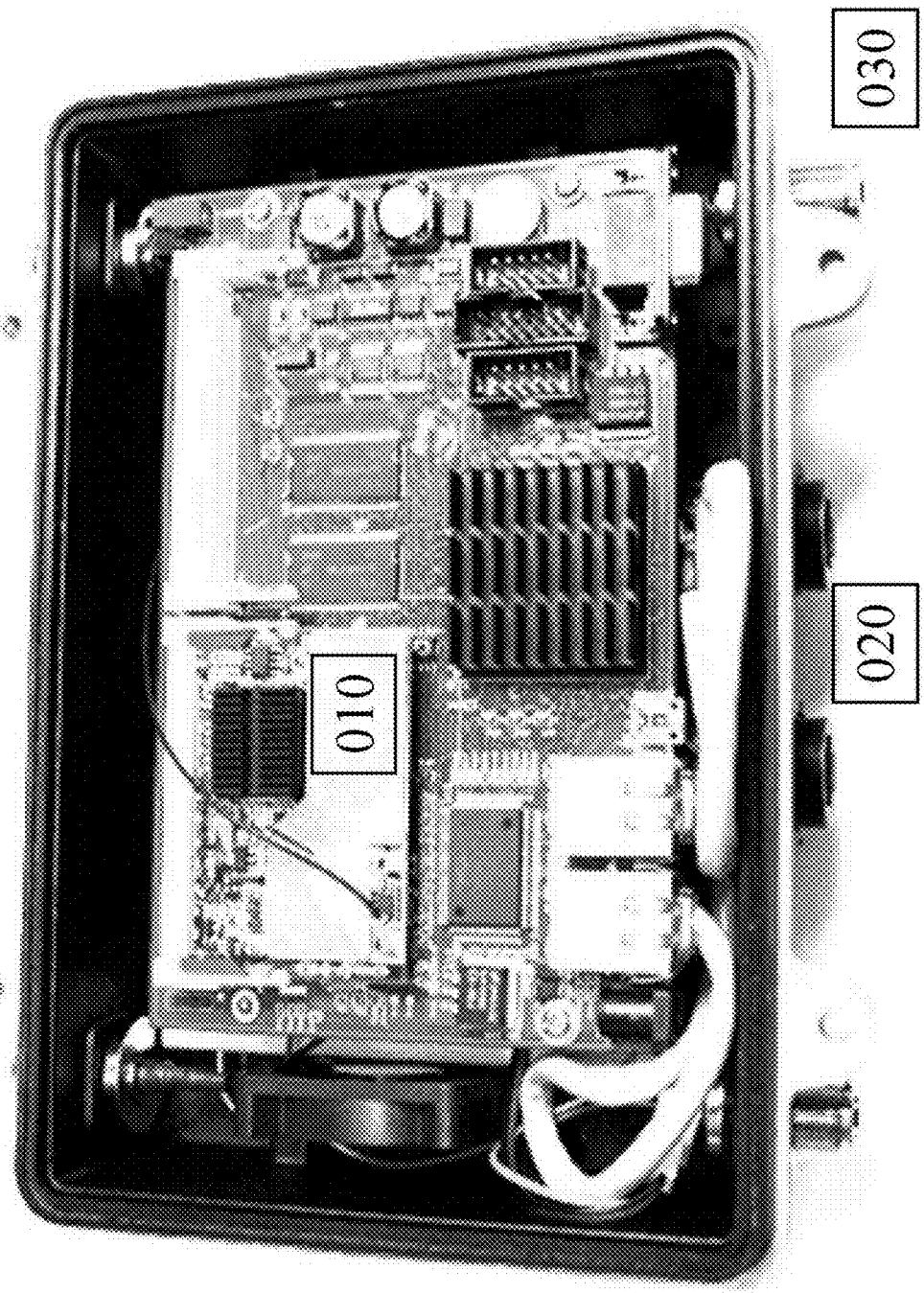
FIG. 12 depicts an embodiment using mesh nodes which feature four radio slots also used in the modular mesh framework of FIG. 13. There are two slots for radio cards on the front and back. Up to four radios 010 are thus supported on a single embedded systems board. The radio card antenna connections 030 are included for four radios. Two Ethernet ports 020 provide wired access to provision wired uplink and wired service access.
Figure 29:
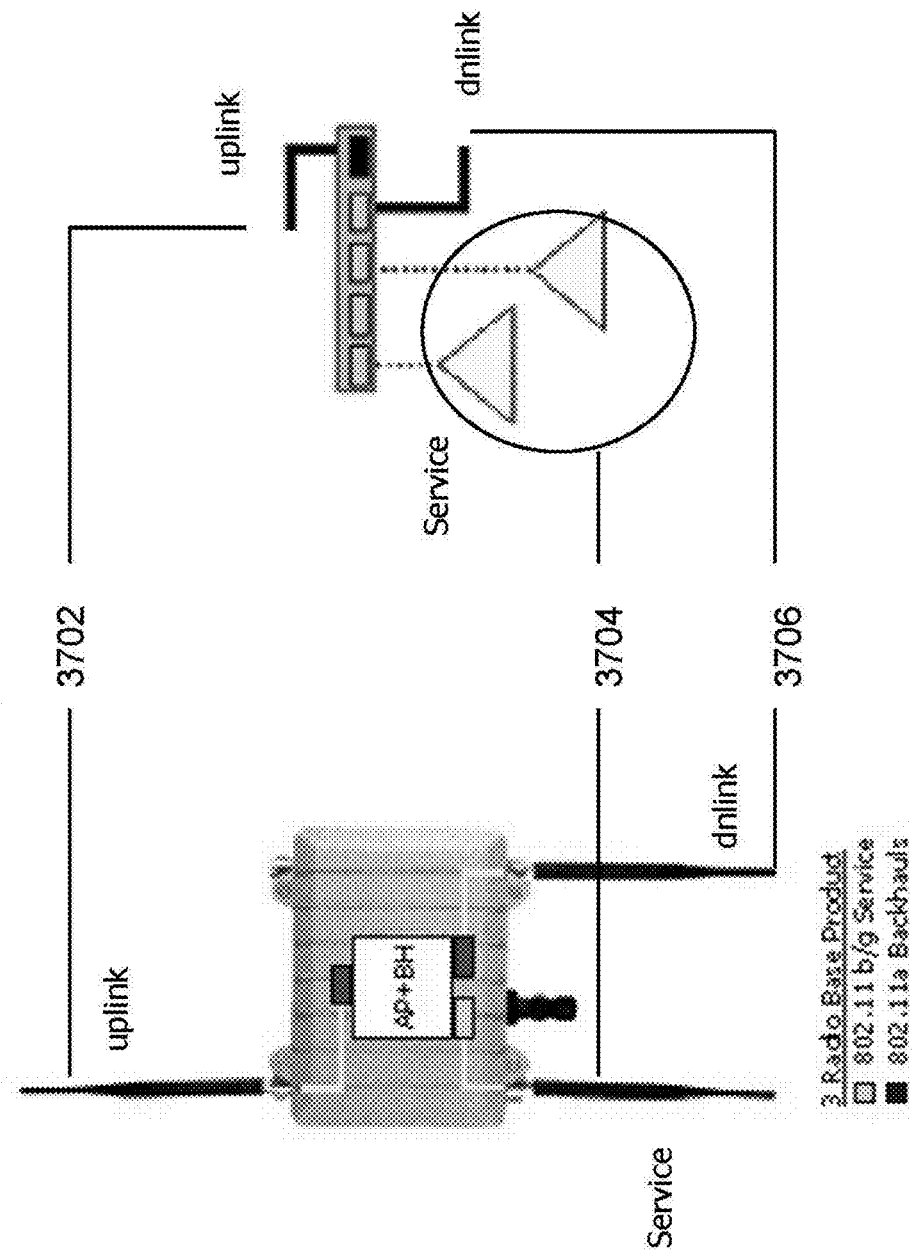

FIG. 29 maps the wireless transceiver having multiple logical radio "slots" of FIG. 12, 13 to the wired transceivers on the slots/ports of your typical switch/bridge/routers of FIG. 4. The Uplink, 3702, Downlink 3706 and Service Access 3704, provide equivalent services in a switch stack hierarchy, see FIG. 4. Note that a single access point (AP) radio services multiple wireless clients, hence it represents multiple "ports". Further, while multiple Service Access and Down link ports/slots are typical, there is always only one UP link, since a tree based (non cyclical) topology, is being maintained at all times by Mesh Control FIGS. 9, 16.

Figure 8:
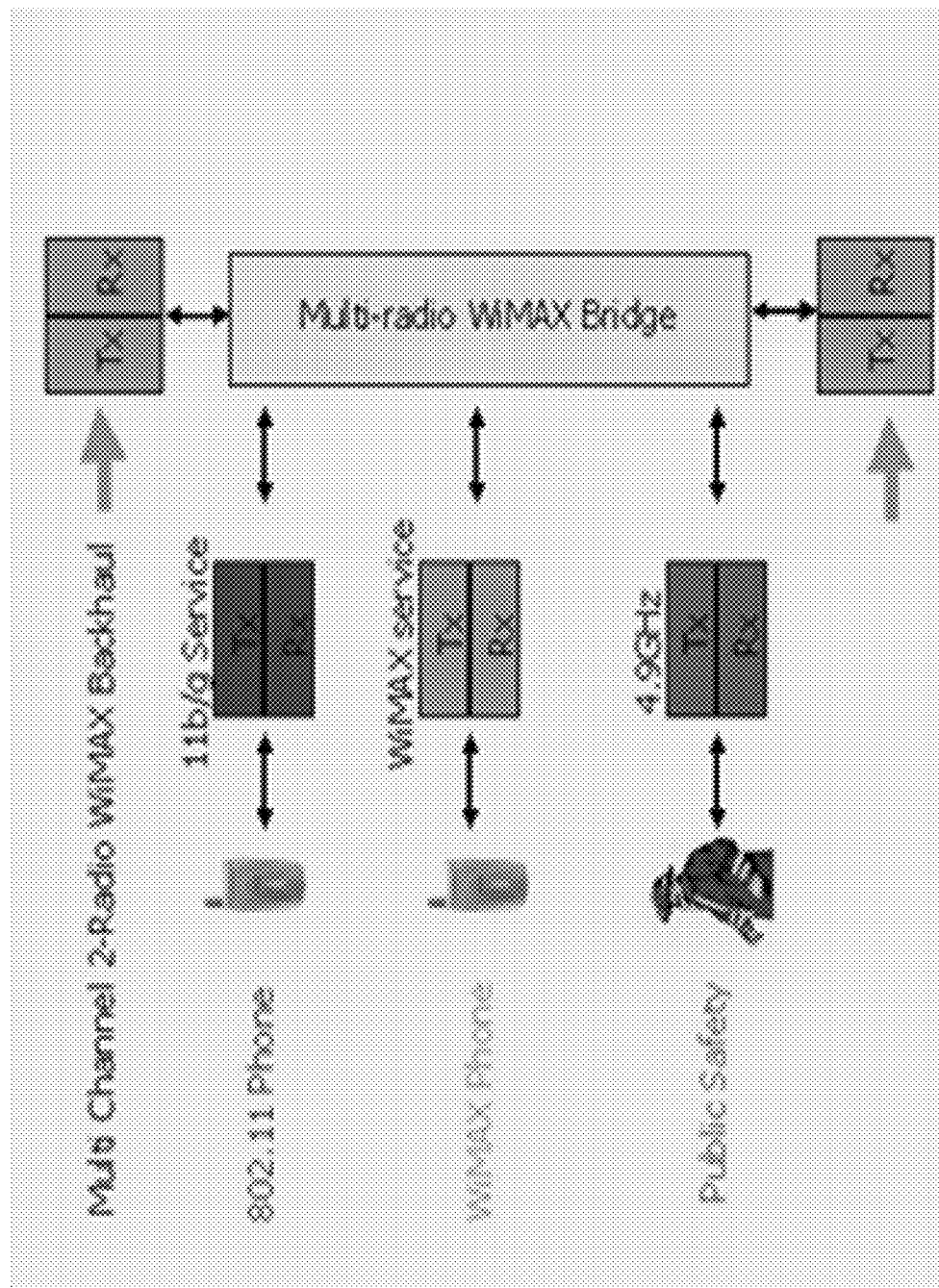
FIG. 8 is a five-radio extension of the three-radio configuration shown in FIG. 5 but with more dedicated service radios operating on different frequencies for different types of client radios.
Figure 9:
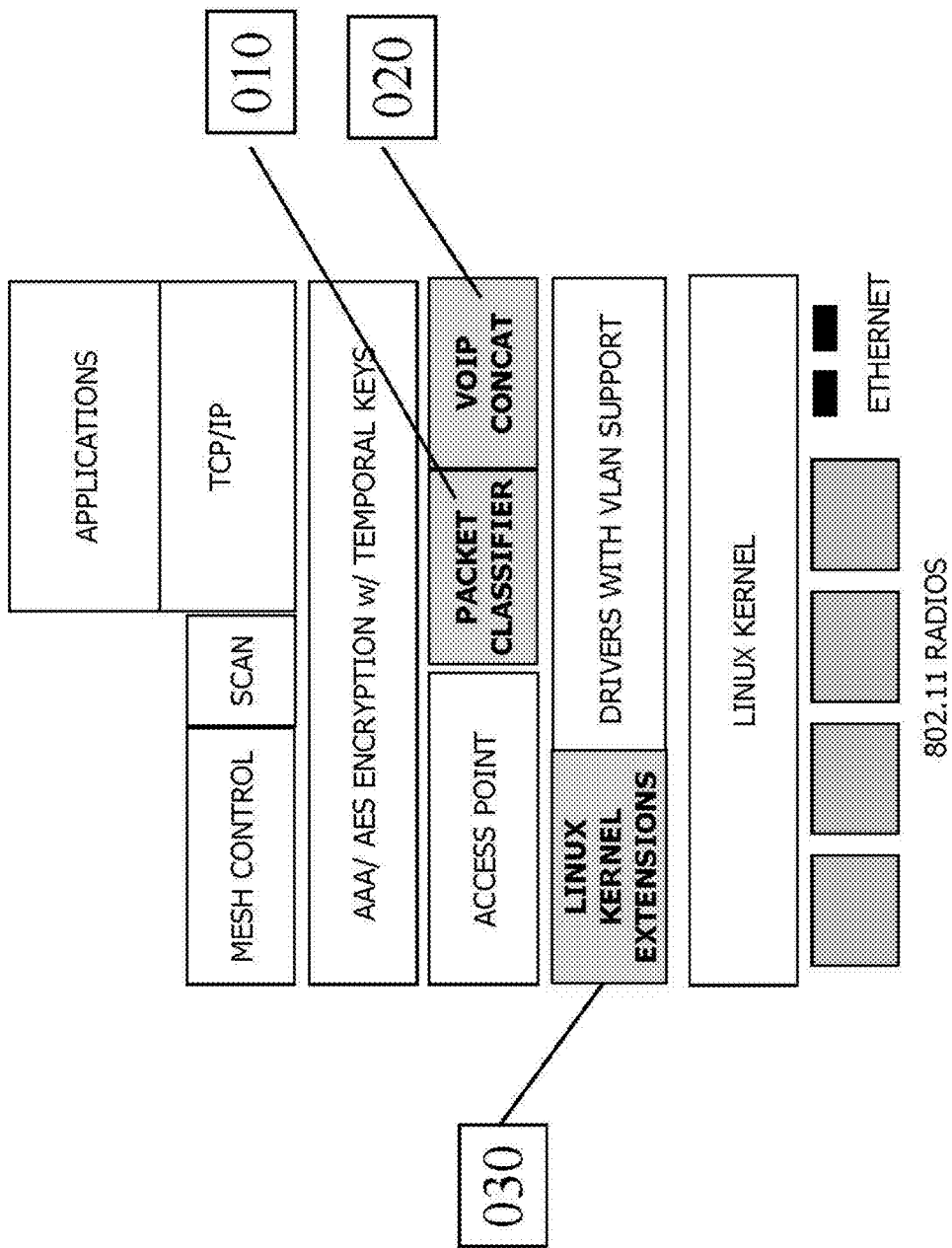
FIG. 9 shows extensions developed and implemented in the mesh network stack to provide an efficient backhaul for voice. The small voice packets are concatenated into larger packets and sent (as one packet) at regular intervals to the backhaul radios. At each mesh node voice packets intended for that destination are removed and the rest sent back (as one large packet). Salient portions include the Packet classifier (labeled 010) that recognizes voice packets based on size and regularity of transmissions, the VoIP concatenation engine (labeled 020) that "container-izes" small voice packets into a larger "container" packet for more efficient transportation, Real time extensions (labeled 030) to the Linux kernel enable the system to provide near real time performance regarding sending and receiving the latency sensitive VoIP container packets through the network—regardless of what the Operating System is doing at the time.
Figure 16:
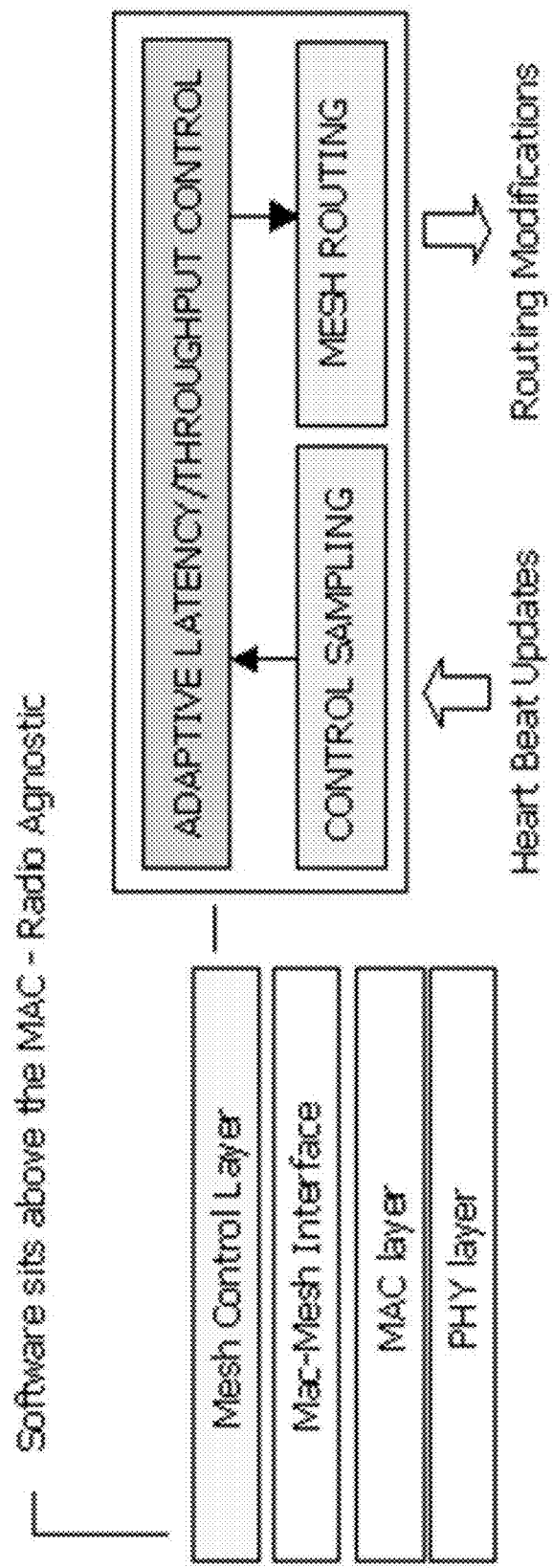
FIG. 16 shows that the Mesh Control Software sits above the Media Access Control (MAC) of the radio. As such it is radio and protocol agnostic, in one embodiment.

FIG. 30 explores this equivalence further. 3810 is a view into what the "Routing Modifications" 3810 of FIG. 16 entails. Based on a strict tree based formalism, radio/wired slots/ports are equivalently either a uplink (U) or one of multiple downlinks (D), service access or APs (A) or scanners (S), 3830, managed by the Scan Control, FIG. 11. Those are the only four types of logical radio modes allowed. Each Transceiver "slot" must map to a physical transceiver device that performs the operation. Thus FIG. 9 shown a six slot/port switch, with four 802.11 radio and two wired ports. Slots could be U, D, S, A in non overlapping transceiver domains (e.g. Wi-Fi to 3 G, Infra Red to Power-line). This embodiment allows for bridging across disparate mediums, see FIG. 8, 18, 19.

FIG. 30, 3840 depicts an embodiment of this principle for a four physical radio and six slot box, FIGS. 9 and 12. Here, each U,D,S,A logical radio functions maps to a physical radio. In 3840 and its equivalent switch embodiment 3850 each slot is performing a dedicated function. This is desirable from a performance perspective but not a requirement: the mesh control layer is logical radio function based. For example, in FIG. 13, 010, AP or Service Access logical radio "A" is being supported by the same radio supporting BH downlink (D) services.

Figure 10:
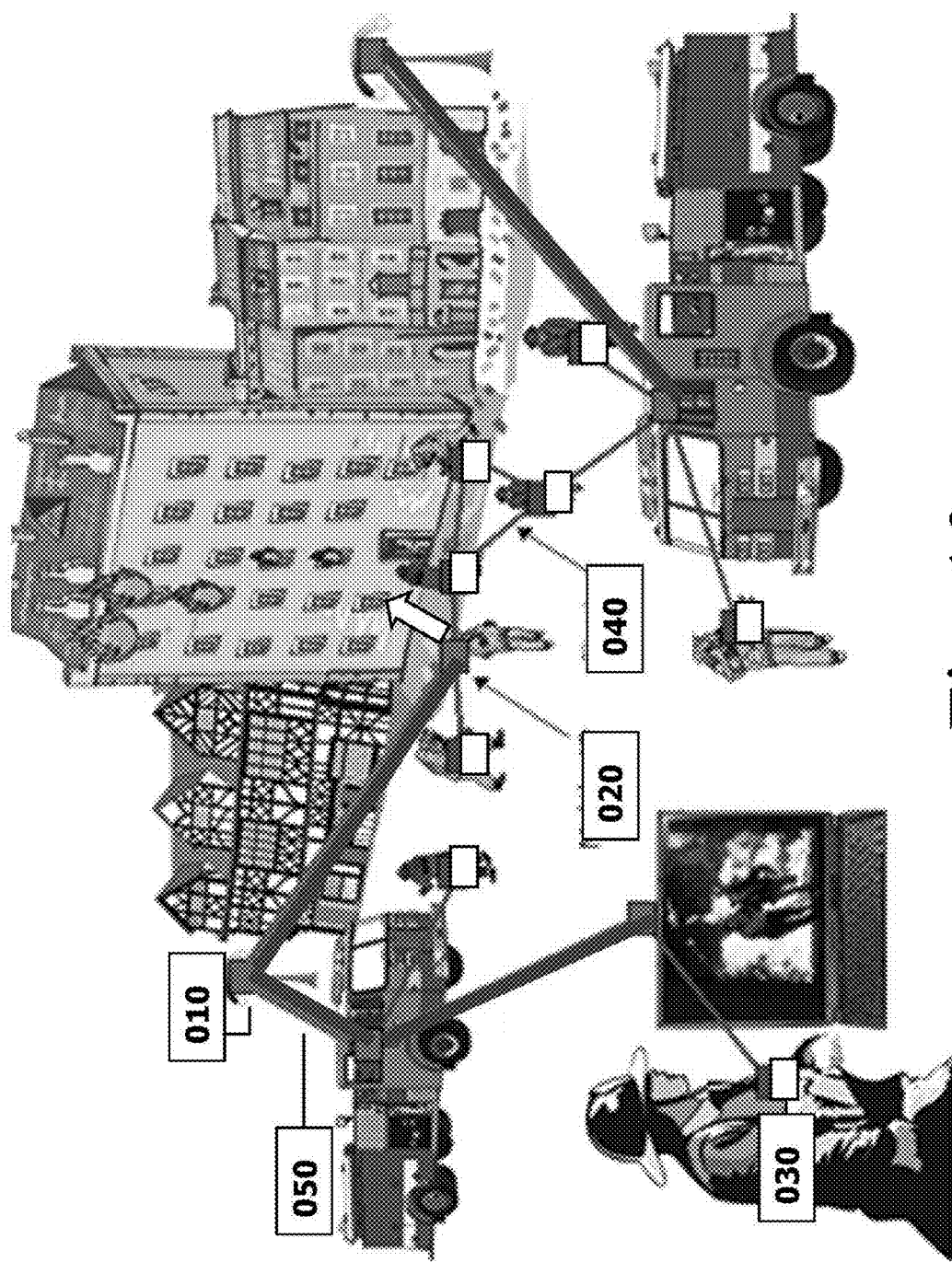
FIG. 10 is an application of the Hybrid Mesh concept to a Public Safety embodiment. The node labeled 010 is a Stationary node on top of a light pole, in this embodiment. A mobile embodiment shown as labeled 020 is entering the building (arrow) such as when carried by firefighters. These mobile units are also called "breadcrumb" routers. The Mobile Mesh nodes provide connectivity to two-radio portable units worn by the firefighters in this picture. All firefighters are thus connected to themselves through a peer-to-peer mesh network shown as a thin line. They are also connected to the Infrastructure mesh backhaul through one or more connect points. This ensures redundancy in network connectivity.
Figure 11:
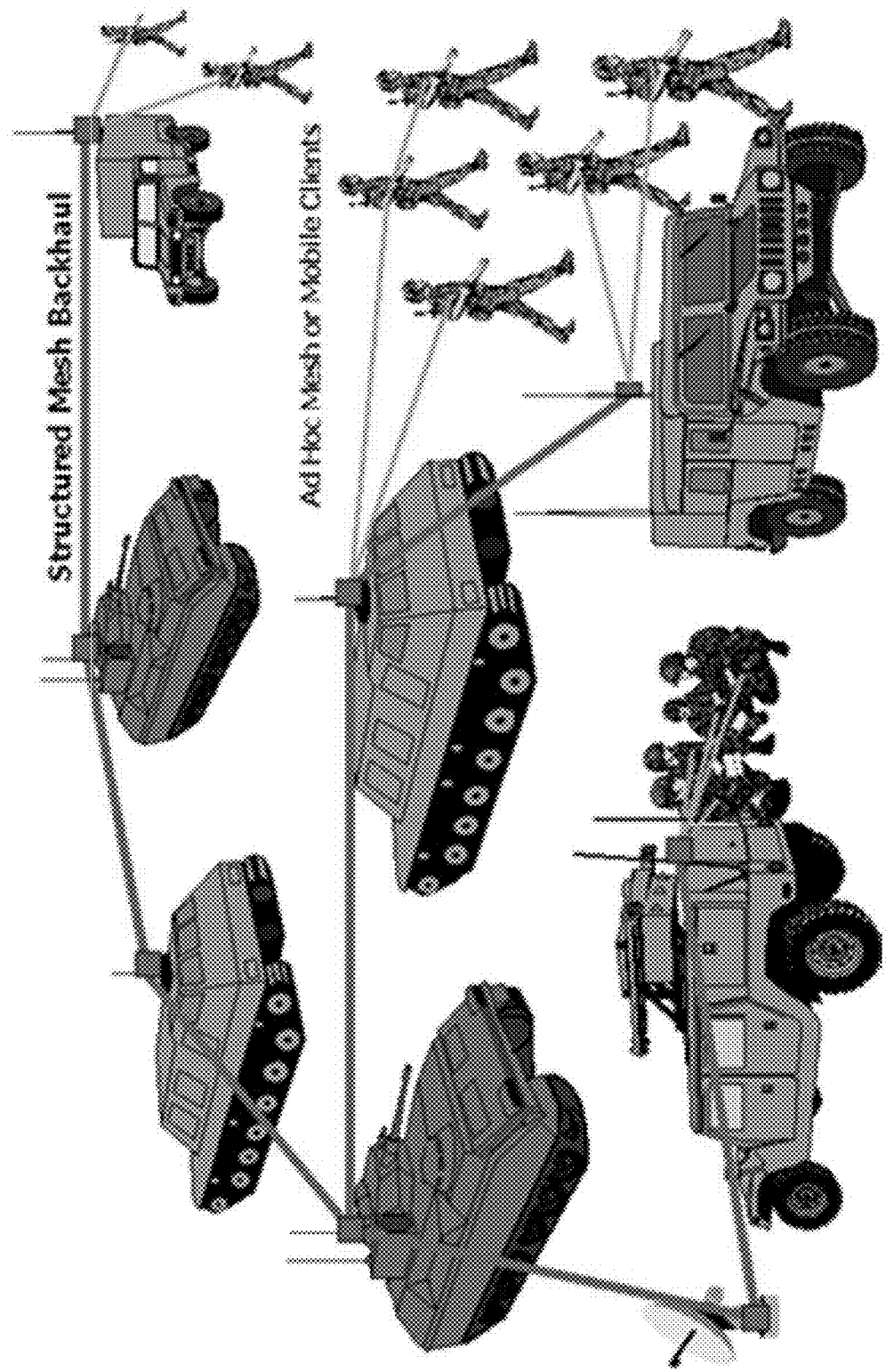
FIG. 11 is an application of the Hybrid Mesh concept related to a Battle Force Protection embodiment.

Similarly, in one embodiment using a purely logical radio functionality, a single physical transceiver/radio may share U, D and S responsibilities with dynamically allocated duty cycle for each, based on application and present circumstances, see FIGS. 10, 11. The physical radio may be directed to switch back and forth between distinct uplink or downlink channels, for example, thus emulating a two radio backhaul. Or they may share the same channel, collaboratively reducing "stacking" of packet queues, to stay in alignment with requirements, see FIG. 1 and 61/555,400.

Figure 31:
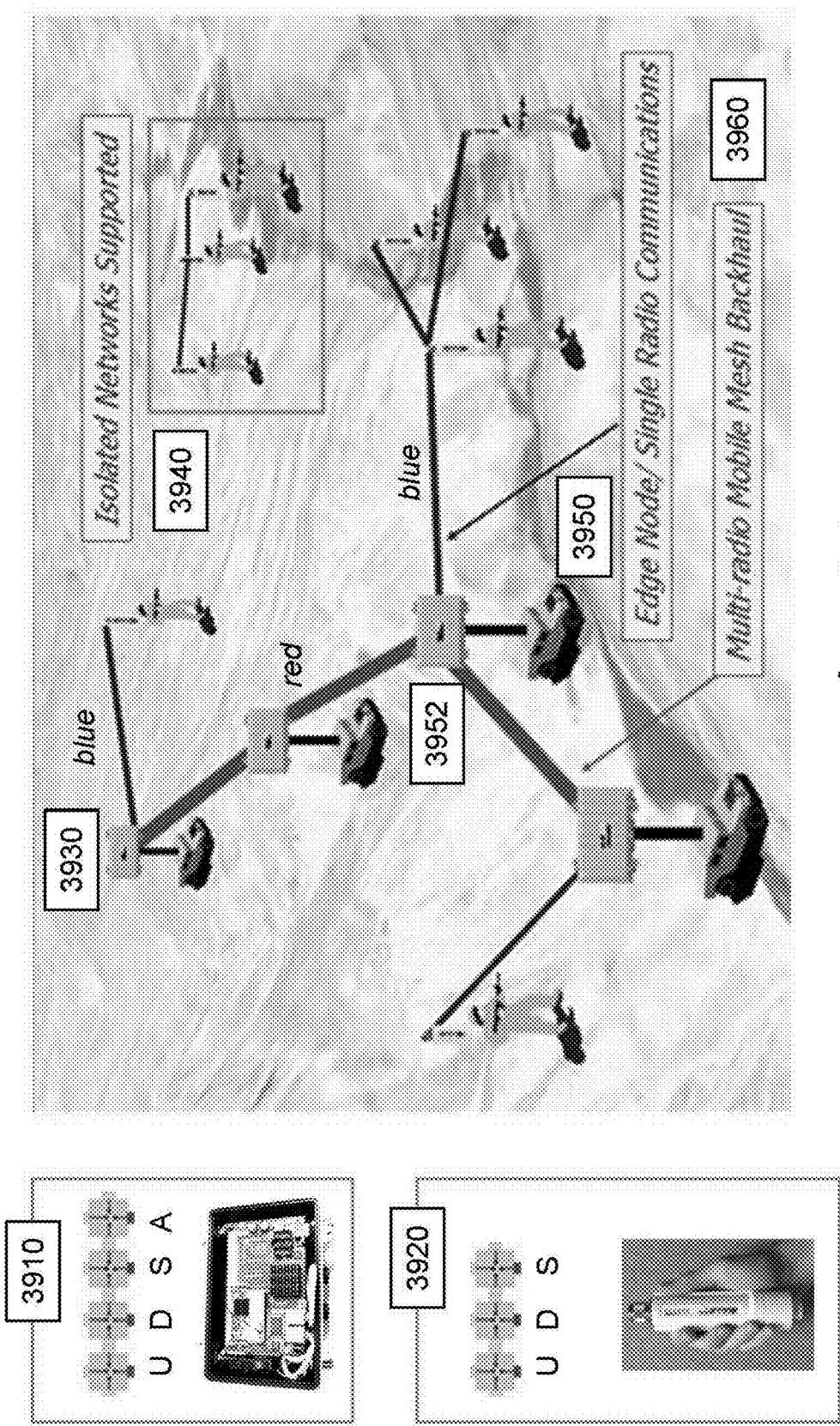
FIG. 31 shows how logical radio modes, Uplink (U), Downlink (D), Scanner (S), Access Point for Service (A) map to physical transceivers in single radio and multi radio mesh node embodiments. The joining of tree branches 3950 to tree trunks 3960 is aided by common routers 3952.

FIG. 31, 3920, is an embodiment of a single Wi-Fi radio that is successfully employed to provide mission critical voice and video communication in military applications, as shown in FIGS. 10, 11. Since the embodiment uses a single radio, three U, D and S logical radios are shown supported by the same physical radio, 3920. 3930 shows a single radio uplink connecting to a four radio downlink. In 3940 they form an isolated cluster, where each single radio mesh node performs U, D and S, logical radio functions/agents, see also FIGS. 10, 11. Further, the single radio connectivity linkage is a thinner "tree branch", (blue) 3950, connecting back to the backhaul or trunk of the tree (red) 3960. Thus, mesh node 3952, join the "red" and "blue" lines of two otherwise isolated trees. It is providing the common router function described in Ser. No. 10/434,948, Appendix A.

Figure 24:
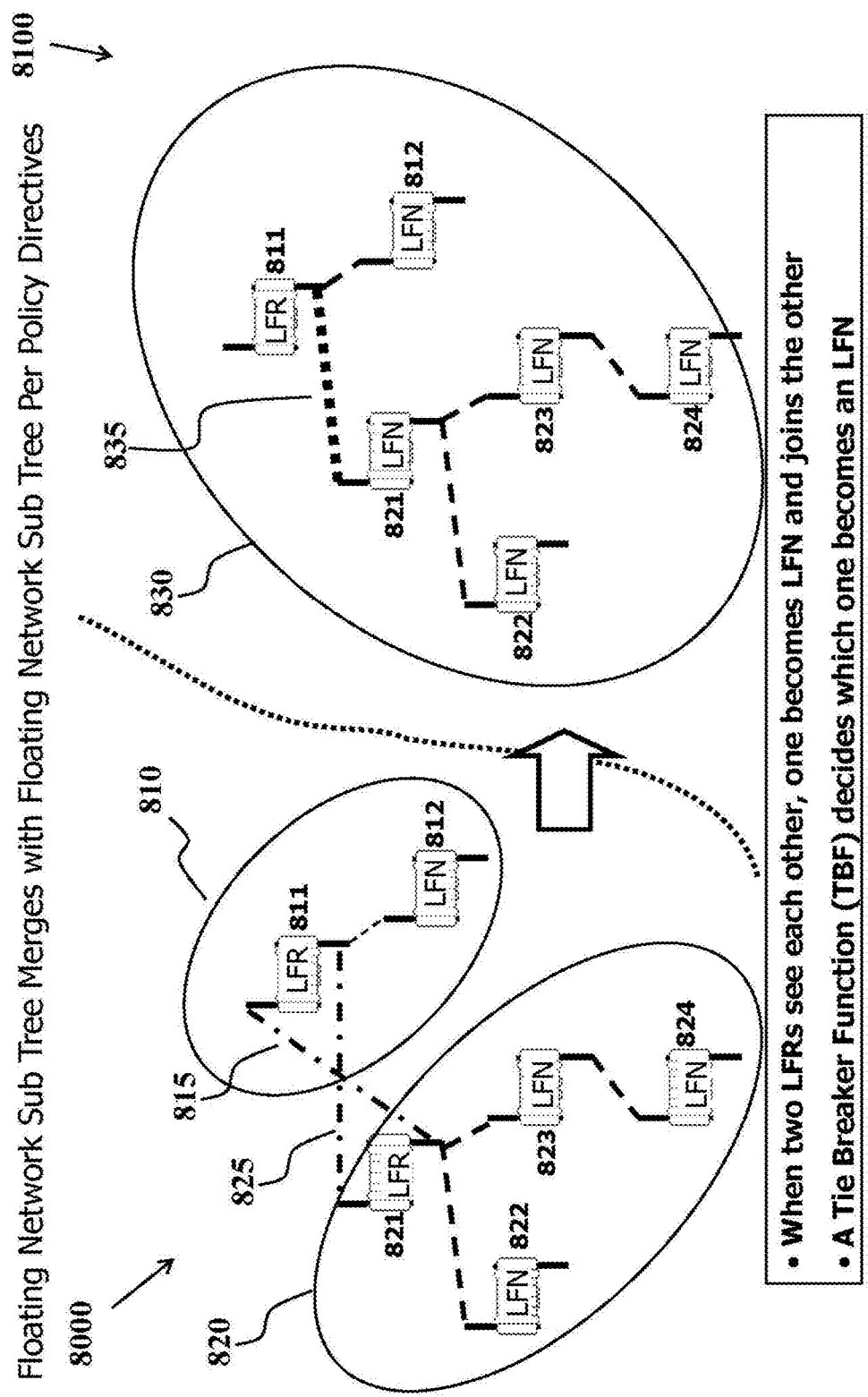

The SCAN Agent, FIG. 9, makes that bridge happen, in one embodiment. The red and blue "channels" are intentionally distinct, on non-interfering channels, possibly on different frequency bands e.g. IR and Wi-Fi, FIGS. 8 and 18. Hence, mobile/temporal networks scan, using logical radio S, so they may join others on the "blue" line 3950. They may also apply a portion of their scan duty cycle in search for a "red" node, as described in Ser. No. 12/696,947 and FIGS. 24, 25.

Figure 2:
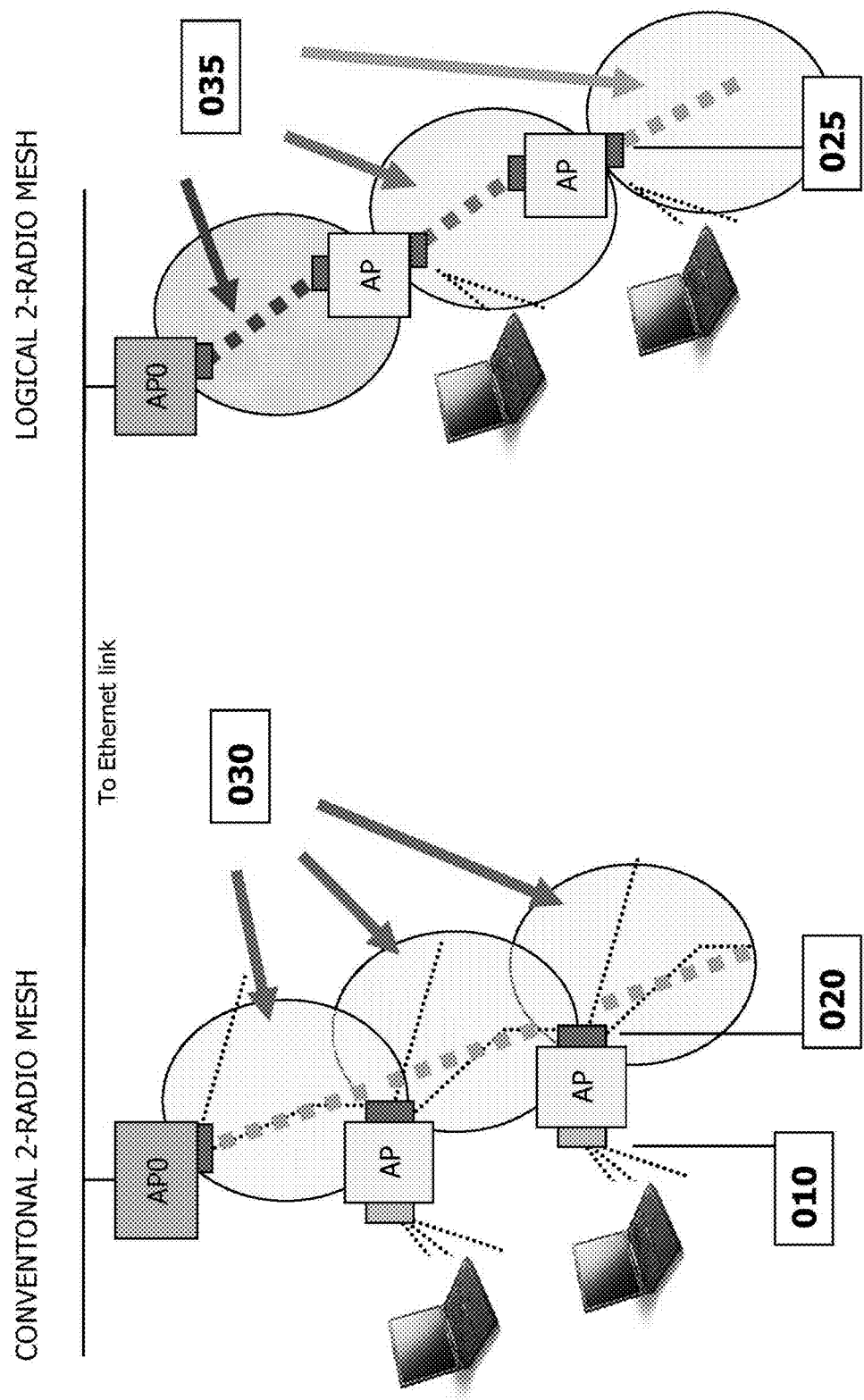
FIG. 2 contrasts the conventional "Dual Radio" mesh with the Logical Two-Radio Mesh. On the left of FIG. 2, 2 radios labeled 010 and 020 provide client connectivity and ad hoc mesh backhaul functionality, respectively. All the mesh backhaul radios (020) are on the same channel depicted by the clouds of coverage of the same color (030). There are all part of the same sub-network. In contrast, on the right of FIG. 2, the same radio (025) provides service to clients and also backhaul functionality but operates in different sub domains depicted by different color clouds of coverage (035). The left resembles a "hub", the right a "switch." Hubs are not scalable.
Figure 20:
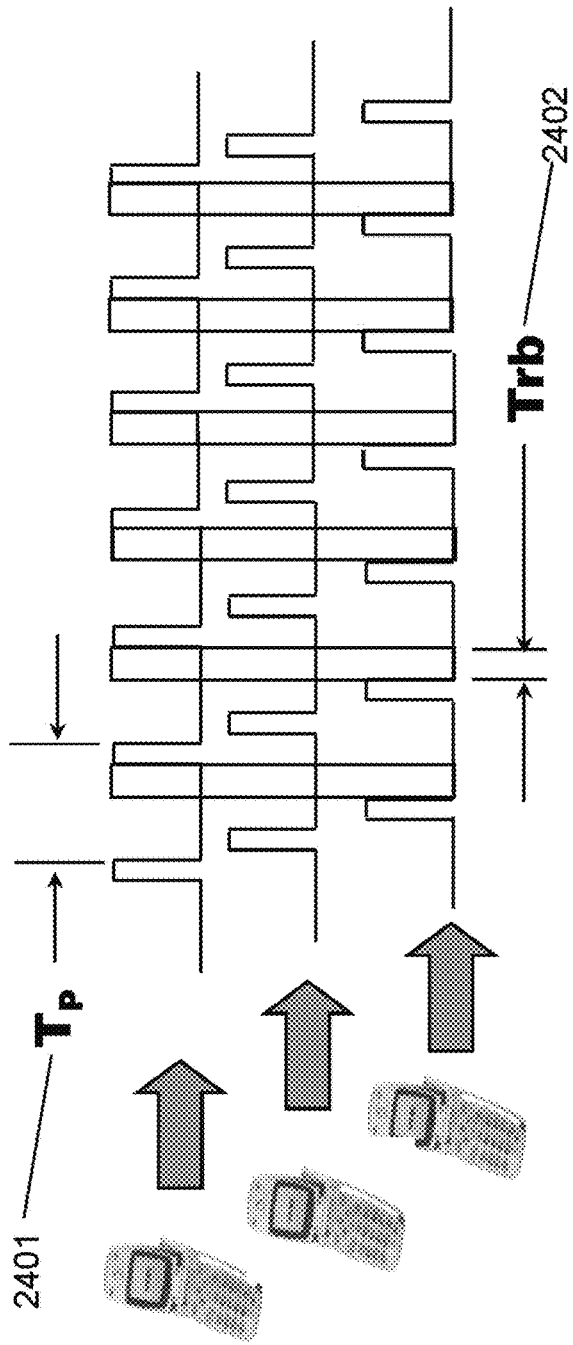
FIG. 20 shows the synchronization of multiple voice devices accessing the same wireless medium with a focus on the time for bulk receipt of packets that are shared among the separate devices.
Figure 23:
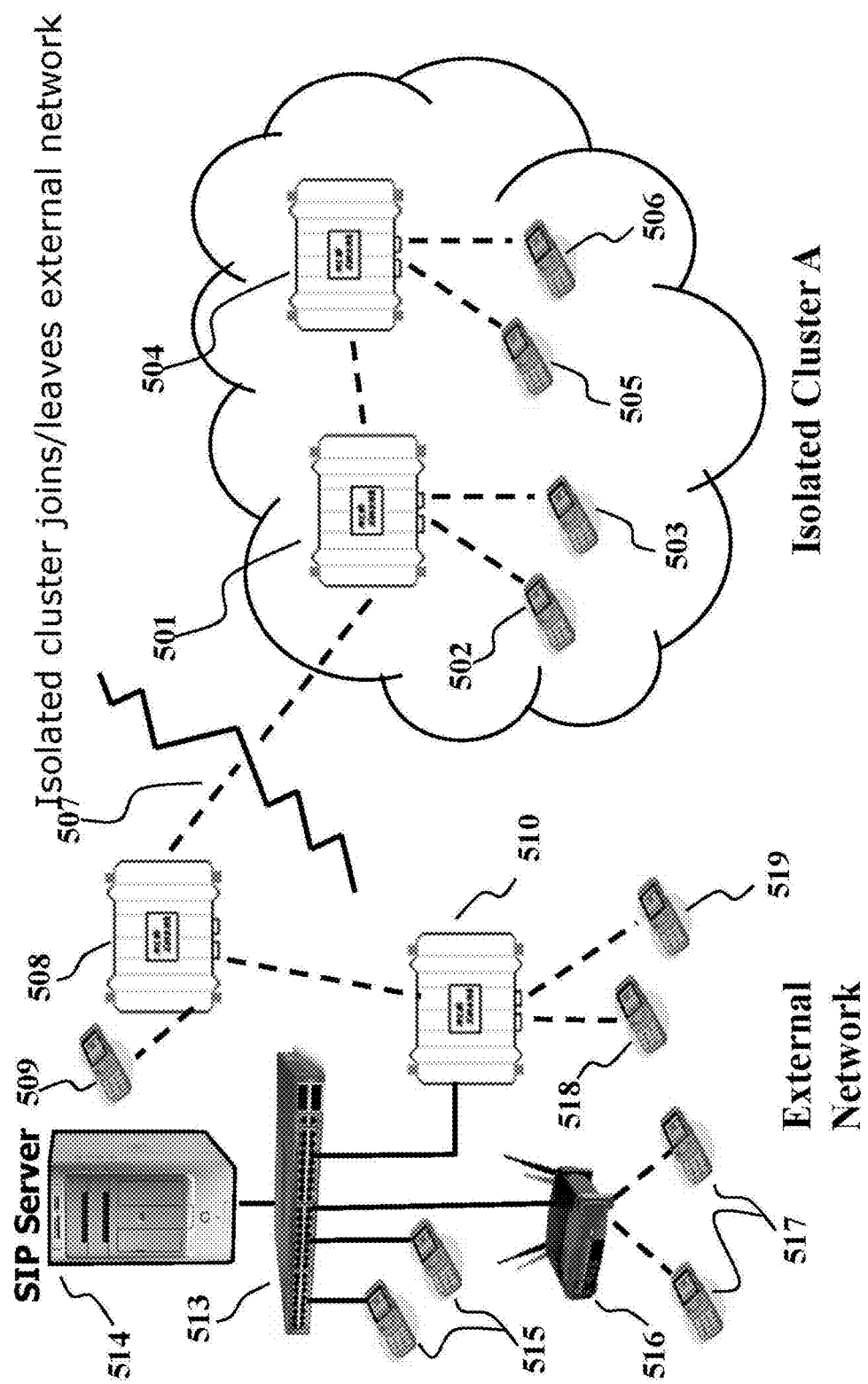
FIG. 23 shows an isolated mobile network cluster and communication within it using VOIP phones.

Further, if all the radios are operating the same "blue" channel, as shown, 3940, 3950, then throughout degrades with each hop, See FIG. 2, 020. However, the routing overhead remains O(n) in tree based topologies and hence low jitter and latency is maintained, see FIGS. 20, 21, 23. For example, in one embodiment, clear VOIP has been demonstrated 44+ hops down in mining tunnels. Note that scalable tree based O(n) routing overhead applies to both multi-radio 3910 and single radio 3920 backhauls, As explained in a previous section, one distinctive benefit of the logical radio approach is Faster Routing Updates, because tree like structures are O(n)

In contrast, routing updates within prior art mesh architectures require $O(n^2)$ resources. Ser. No. 10/434,948 Appendix A, reproduced herein, describes these mesh routing techniques and their limitations. Topologies are peer to peer, single physical radio backhauls. A minimal spanning tree must be maintained by each node. In a family of n siblings, each sibling must re-evaluate its relationships with all the other (n−1) siblings. For all n siblings, the routing update is $O(n^2)$. In contrast, with tree based routing overhead is still O(n), even in single radio chains, see FIG. 31, 3940, 3950.

This disparity between resource overhead in maintaining the mesh becomes apparent as the network grows—an inordinately large portion of system resources are devoted to managing mesh infrastructure in prior art embodiments. As such, fewer resources are available for its intended purpose—providing proactive connectivity in static and temporal mesh networks and their forming, joining, dispersal etc. Hence $O(n^2)$ networks simply cannot scale beyond a tipping point. The tipping point may vary as newer radio technologies evolve and provide better throughput capacity. But at some point the performance will be too sluggish to be relevant, especially in dynamic, mobile and temporal networks.

As smart phones proliferate, in some embodiments, the smart phones form their own mesh networks with both static (kitchen night light) and mobile (other smart phones) chirp aware devices. In some embodiments, a network is capable of maintaining communications with many such devices. A prior art single radio peer to peer network with $O(n^2)$ will be consumed with overhead from routing and other functions within a few hops and/or a few members, limiting its "Social Network" value. In contrast, $O(n)$ systems can exploit advancements in radio technology further to stay "current". The slot based system FIG. 12, 13, 19, 21, 22 and their embodiments, FIGS. 30, 31, are future proofed—the radio cards, FIG. 12, 010, are removable and upgradable.

Smart phones provide wireless connectivity through Wi-Fi, Bluetooth and Cellular. Chirps may travel via both IP and Cellular networks. SMS messaging are used to communicate between smart phone agents and associated chirp devices, in one embodiment. Thus, two phones may be used to remotely operate, monitor, control, or diagnose devices securely and cost effectively via SMS also. In the example of remote video surveillance, described earlier, a terse SMS e.g. "Cat in Kitchen" and a snapshot, can cover the essence of an exception handling update.

The Tree based routing favors single radio systems for smaller networks because of its capacity degradation of ½ with each hop. The degradation is half because the duty cycle is shared between uplink (U) and downlink (D) logical radio functions FIG. 31, 32. With SCAN S duty cycle added, the throughput degradation could be ⅓ per hop. For a three hop single radio U+D network, it was $1/2^3$. For its U+D+S counterpart it is $1/3^3$ or three times worse. Thus, there are limits to the capacity scalability of all single radio mesh networks using single radio logical embodiments, over multiple hops.

The benefits of O(n) tree based topologies and routing are that even within long chains and degraded capacity, latency and jitter are still deterministic, even in dynamic, temporal or mobile environments FIGS. 20 through 25. VOIP like lightweight Chirp packets are efficiently routed even in single radio versions of long chains (i.e. the "strings of pearls"), FIG. 35. The distributed mesh control layer, 12, 20 self corrects U,D,S resource allocations dynamically through heart beat updates and routing modifications, in one embodiment. FIG. 16 including using toll costs and hop costs, as described in Appendix A, manage the overall health of the network, FIG. 1.

Thus, when recent history of scans and/or GPS readings by/from smart phone embodiment indicate that the soldier FIG. 31 has slowed down, the mesh control layer proactively reduces the duty cycle of the SCAN S function to mostly quick scans. Interspersed within those quick scans would still be one or two periodic "detail" scans, in one embodiment. Thus the system would stay in dynamic alignment to changes in motion/situation, per methods also described in Ser. Nos. 11/818,889, 61/555,400 and 61/615,802, while using the radio for functions other than Scanning (uplink, downlink, client service/access).

Figure 32:
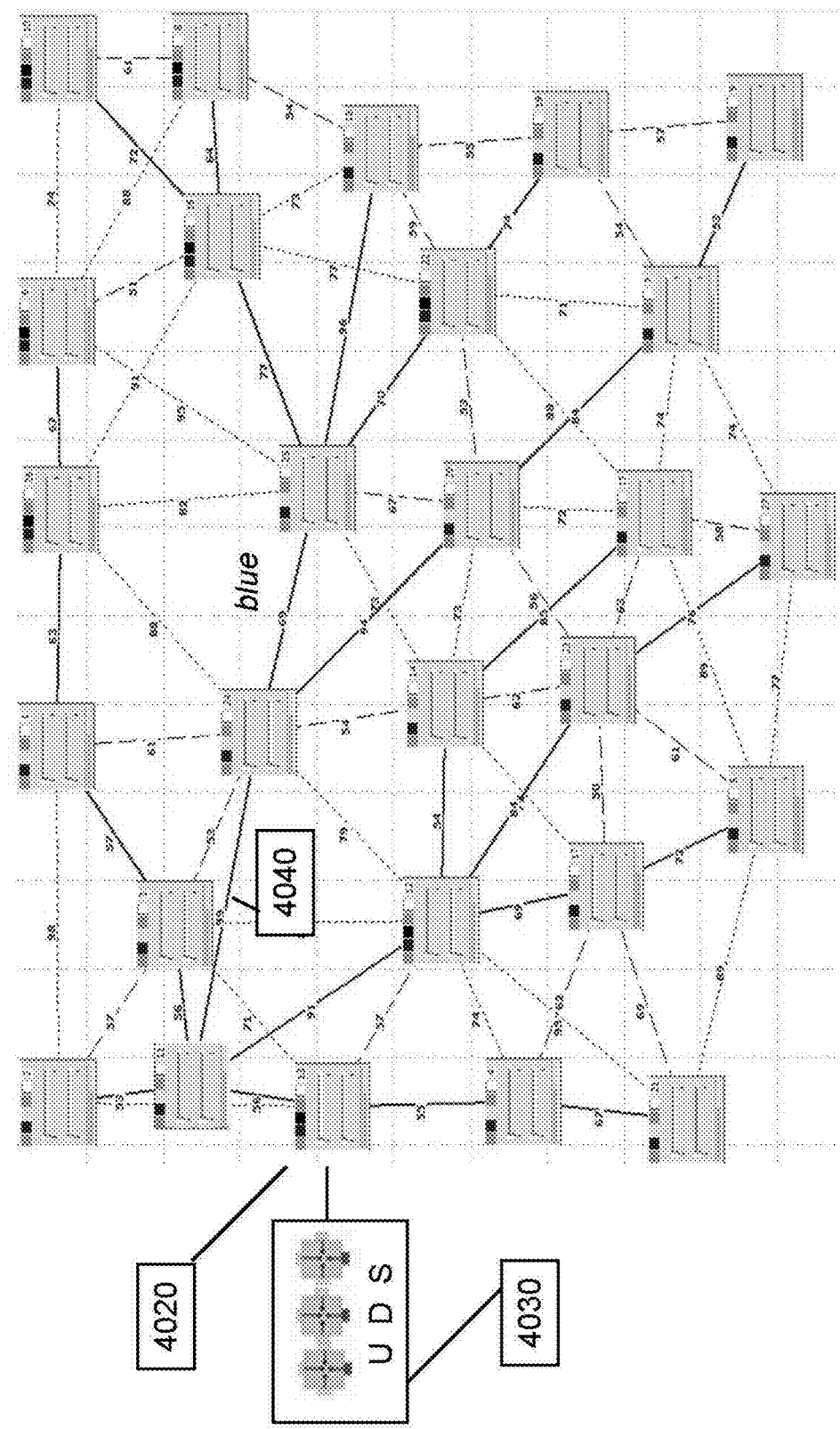
FIG. 32 is a simulation of a representative prior art mesh routing algorithm and its comparison to tree based routing of FIG. 3. The thicker blue lines in FIG. 32, 4040 denote the minimal spanning tree. Note the dashed lines have to be additionally recomputed for each node in prior art mesh routing. Performance deteriorates exponentially as $O(n^2)$ where n is the number of mesh members.

FIG. 32 is a simulation of prior art mesh routing algorithm and its comparison to tree based routing for single radio mesh networks. The thicker blue lines in FIG. 32, 4040 depict the minimal spanning tree. Note the dashed lines have to be additionally recomputed for each node in prior art mesh routing. Over multiple hops single radio backhauls suffer from both throughput degradation and faster routing updates. The former degrades by ½ with each hop, the latter with $O(n^2)$ where n is the number of nodes in the peer-peer network. Hence routing table updates will increase to $O((n+m)^2)$ with m additional new members. In sharp contrast tree based routing, with the logical radio abstractions in place, will still be linear: $O(n+m)$)

Figure 3:
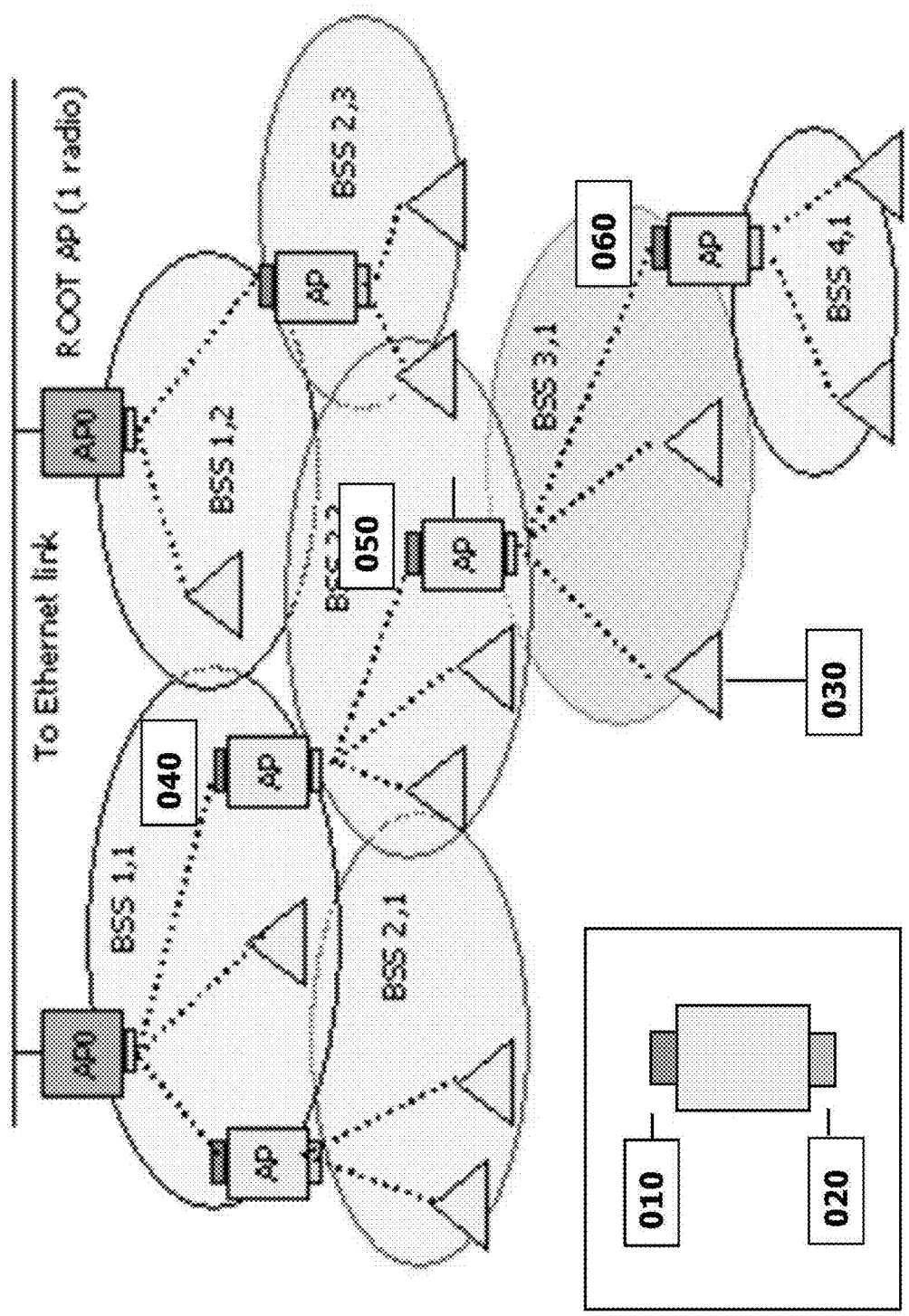
FIG. 3 shows how the structure of two-radio multiple hop mesh network where each two radio unit services a Basic Service Set (BSS) by configuring one of the two radios to serve as an AP to its clients. Clients may include the second radio of another two radio system, with this radio configured to run in station mode, providing the backhaul path back to the Ethernet link. In the insert, the uplink radio (labeled 010) connects to the parent mesh node while the downlink radio (labeled 020) acts like an Access Point to client radios, including other mesh nodes that connect to it through their uplink radio. Note that all service radios (020) operate on different non-interfering channels, depicted by different color ovals.
Figure 5:
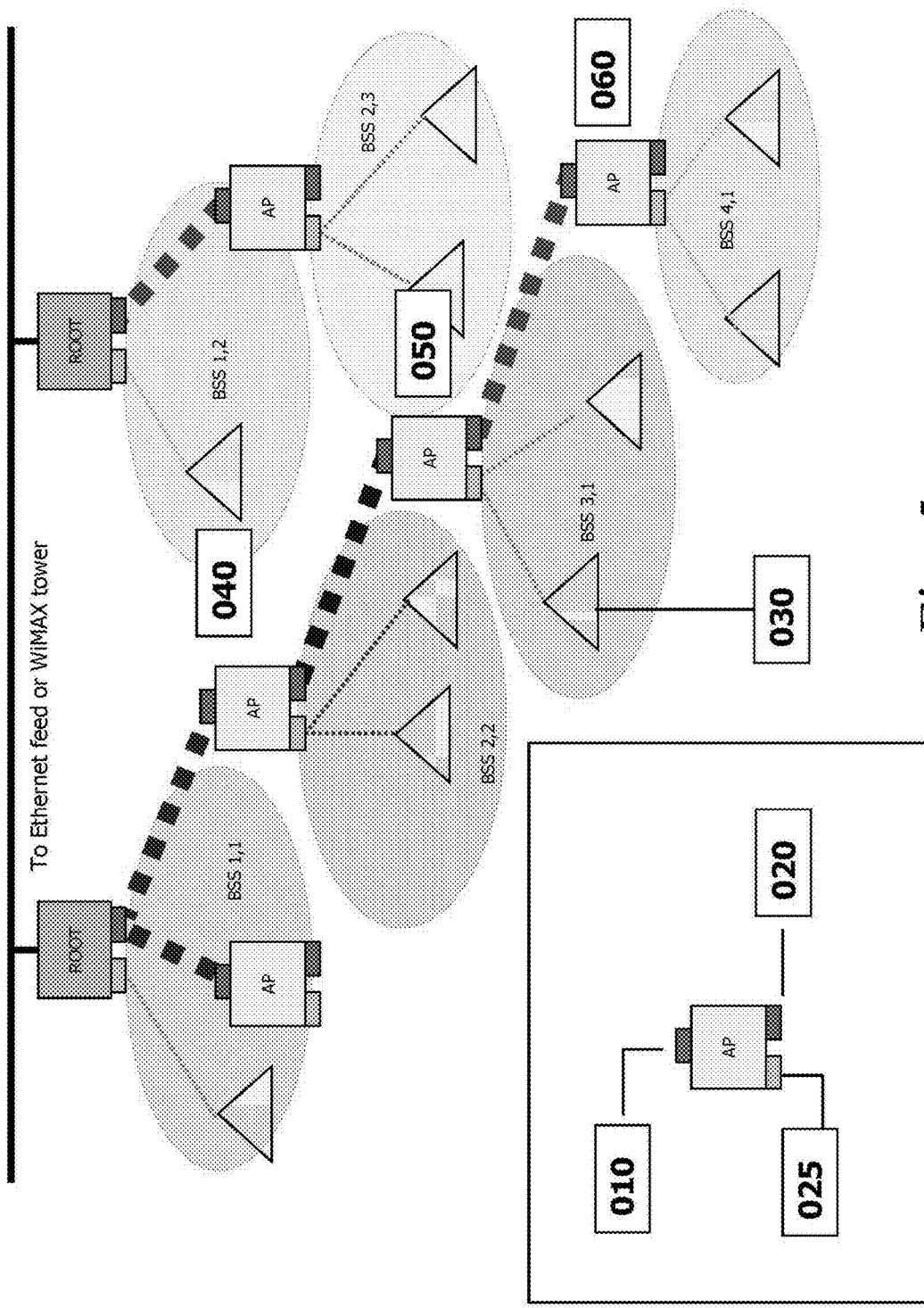
FIG. 5 illustrates one embodiment of the two logical-radio approach with three physical radios. Two radios constitute logically one radio of the two logical radio concept, while the third physical radio serves clients as the second radio of the two logical radio concept. By eliminating the sharing of physical radios for both backhaul and client services, the backhaul bandwidth has improved and also reduced the dependency to use the same type of radios for the backhaul and the client. In the insert, the uplink radio (labeled 010) connects to the parent mesh node while the downlink radio (labeled 020) connects to the uplink radio of child mesh nodes. The service radio (labeled 030) act as Access Points to client radios shown as triangles. One such is labeled 040. Note that all service radios (030) operate on different non-interfering channels, depicted by different color ovals.
Figure 17:
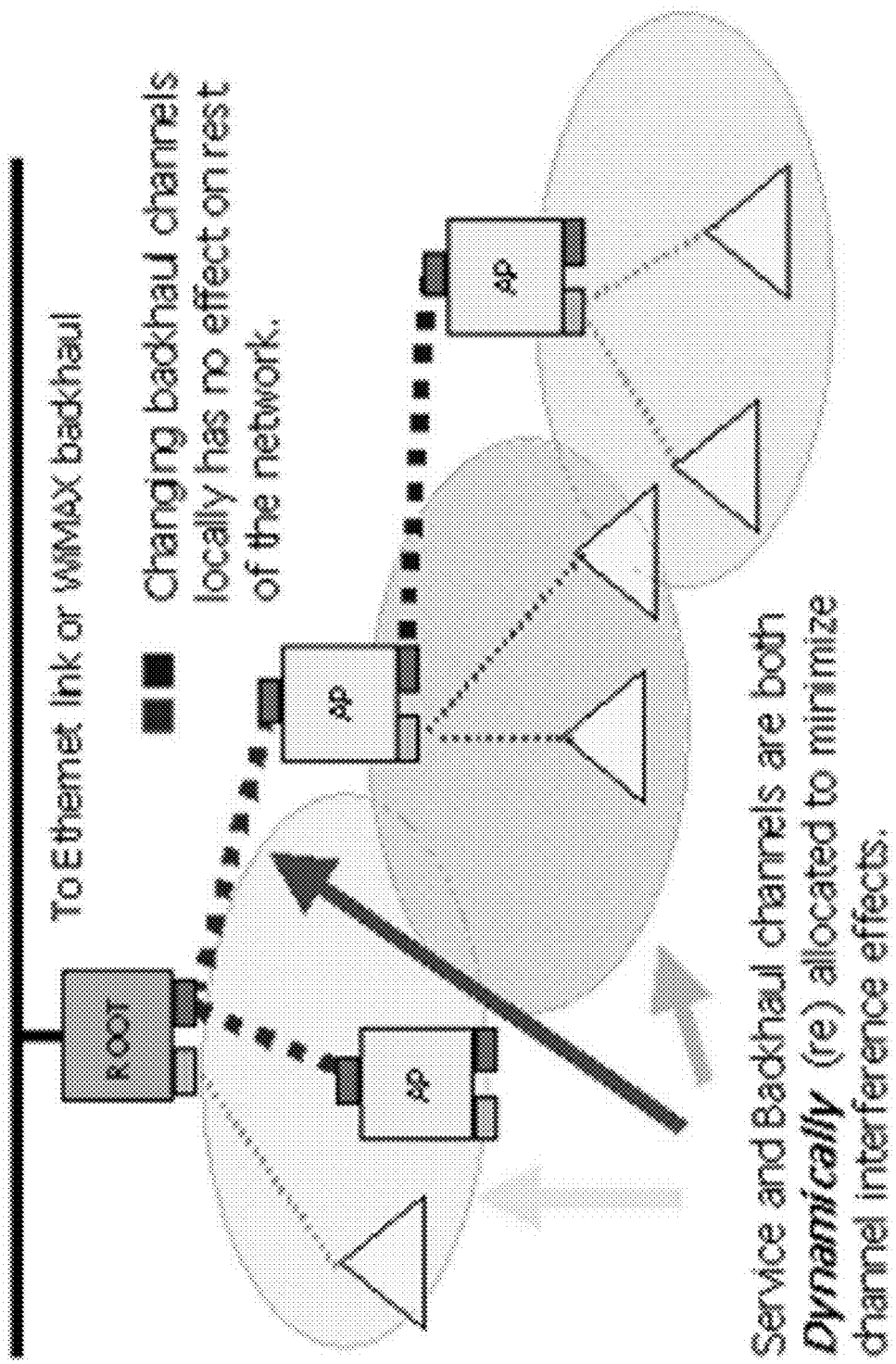
FIG. 17 shows how channel interference is dynamically managed in the logical two-radio system.
Figure 18:
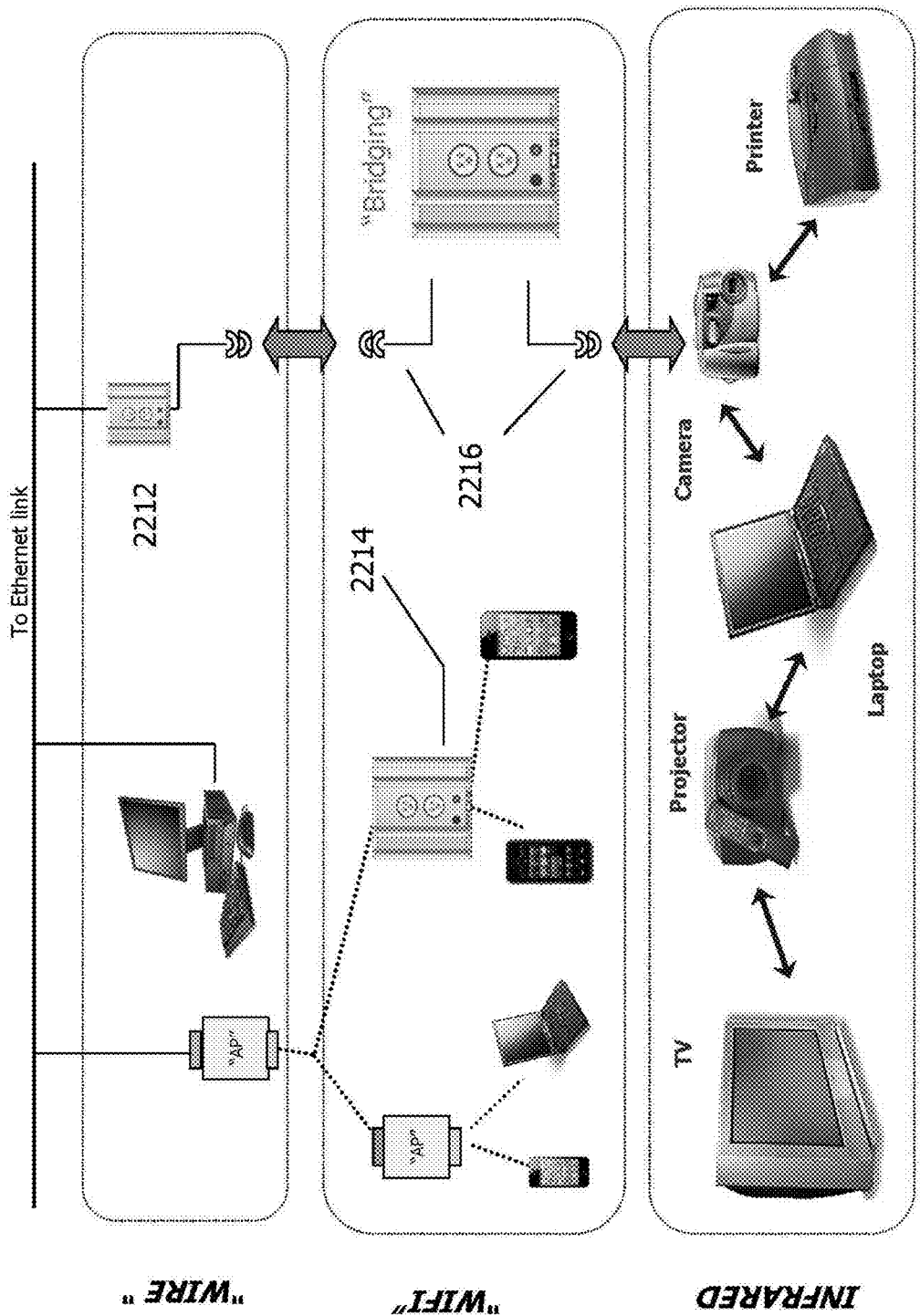
FIGS. 18 and 19 introduce an embodiment bridging across diverse wireless medium using the example of an N-Logical wireless medium bridge, referred to as the "nightlight" In one embodiment, the nightlight serves as both range extender and intermediary between device "chirps" and more conventional, IP based, communication devices and protocols.

Tree based mesh routing segments the collision domains, FIGS. 3 through 7. Each BSS in FIGS. 3, 5 is operating on a non-interfering frequency/channel. Further bridging across transmission domains, FIGS. 8, 18, is analogous to adding more frequency/channels for the BSS to operate in. In one embodiment, dynamic channel management manages channel changes, see FIG. 17, all with the intent of reducing channel contention. Reduced contention enables CSMA/CA and CSMA/CD back off algorithms to be more efficient. Jitter and Latency become deterministic, as taught in Ser. No. 11/266,884, FIGS. 20, 21.

Figure 19:
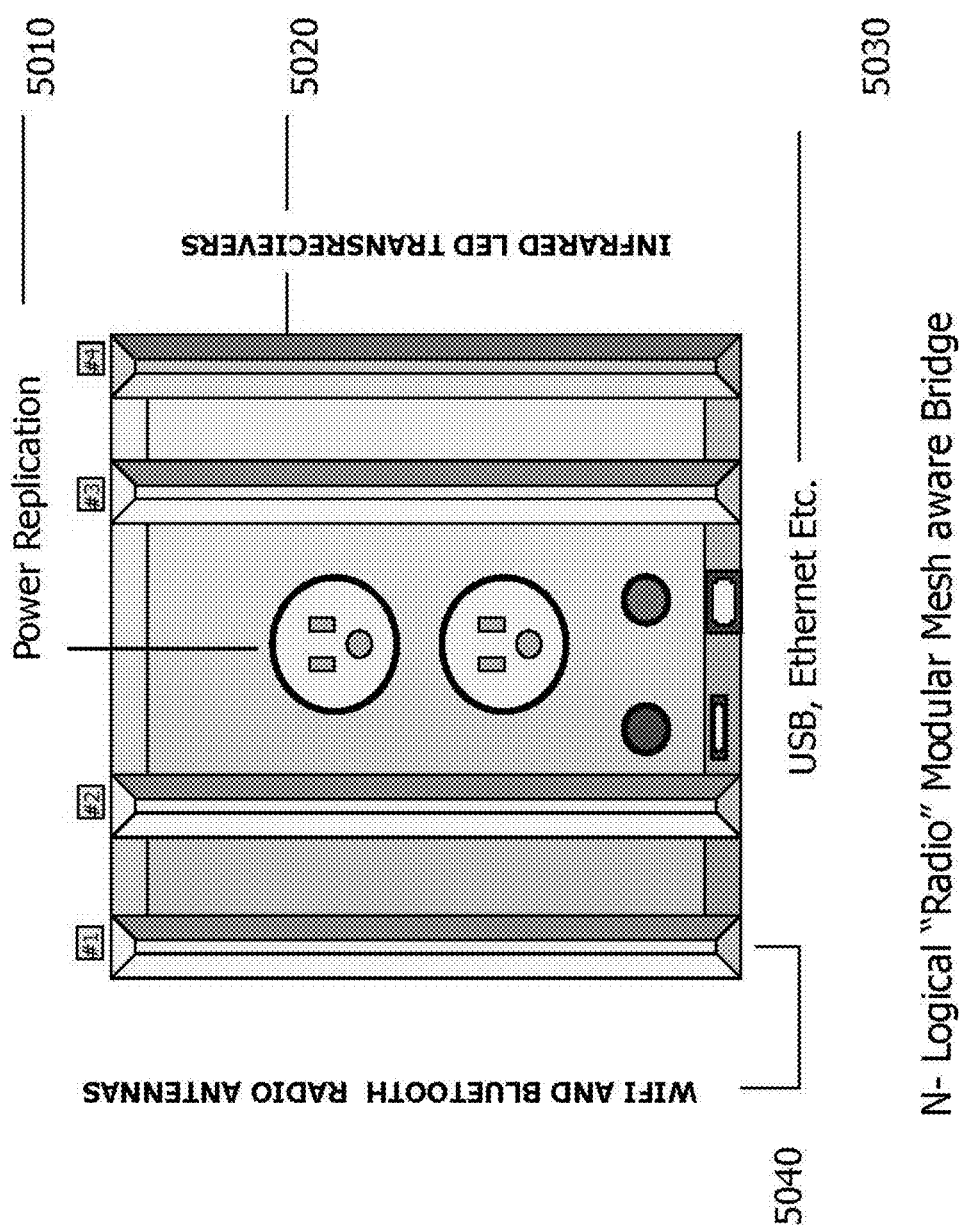

"Natural", healthy branch growth thus encourages "radios" operating in different "channels", forming non-interfering logical sub trees. Having more "channels" would favor smaller sub trees and more of them. Many would operate autonomously with the occasional need to chirp back status and receive email/firmware updates. Thus multi-transceiver chirp capable product may serve as embodiments of the slot based modular mesh framework, see FIGS. 12, 13, 19, 22. The smart phone is a candidate, in one embodiment. An IR chirp based transmission can be picked up on the IR "slot" and forwarded through IR (as in single radio mode, FIG. 31, 3940). Or the phone and/or receiving node in some embodiments may bridge IR and Wi-Fi Slots, see FIG. 18, 19. Or parts of the transmission may be over IR interspersed with Wi-Fi, where IR was not available Further they may serve as temporal common routers 3952 to provide intermittent connectivity to otherwise isolated temporal or mobile networks, 3940, operating on their own private channels and dialects.

The physics of wireless communications also favor smaller, close knit semi-autonomous "village" clusters, Reduced radio power reduces the range but also adjacent channel interference (adaptive power control is described in Ser. No. 10/434,948). A kitchen chirp aware nightlight/router embodiment thus supports a small, select chirp family, operating quietly on a common channel and possibly with their own machine Esperanto, in one embodiment. Common routers FIG. 31, 3952, and their agents provide intermittent connectivity to these largely self-sufficient clusters. A matrix of collaborating yet largely autonomous and scalable ant-like communities emerges.

In this embodiment, the routing overhead for all such rooted trees in the "park" would be $O(n*r)$ where n is the size of a representative sub tree and r is the number of "root" nodes servicing them. In FIGS. 3, 4, r is two.

Figure 33:
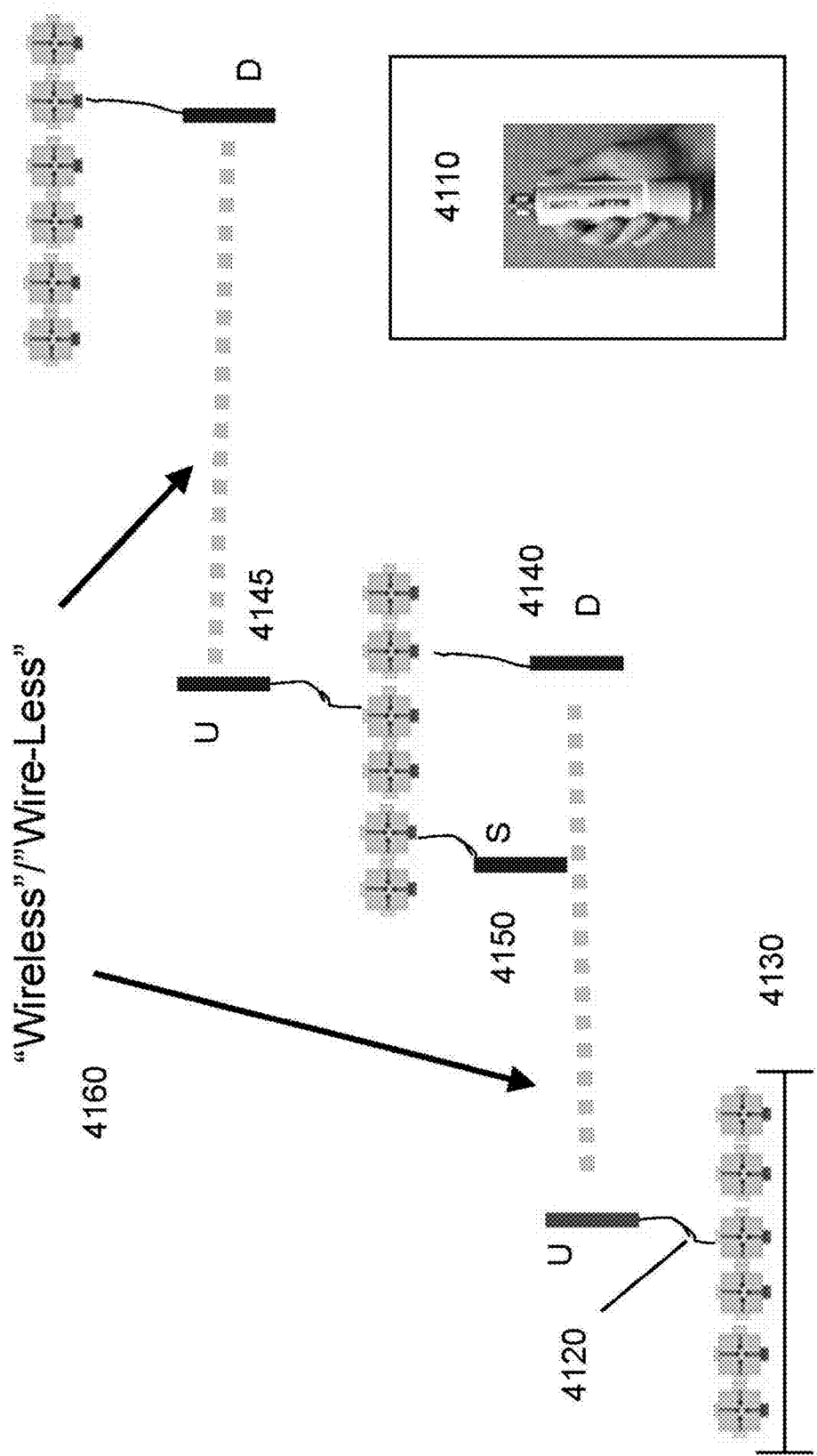
FIGS. 33 and 34 depict a switch equivalent of logical radios operating in both wired and wireless mediums/channels, using Logical Radios Uplink (U), Downlink (D), Scanner (S) and O(n) routing. The logical radio switching module (insert) is introduced.

From the perspective of the mesh control, FIGS. 9 and 16, distinctions between wired or wireless cease to be relevant, In one embodiment of the N-Logical radio concept, a bank of logical radios/transceivers 4130, FIG. 33 supports multiple otherwise isolated trees through common router functionality. Each bank is a "switch" with dynamically reconfigurable slots. A slot in the switch is equivalent to a slot in FIG. 12, 010. FIGS. 9, 12 has six such slots: four "radio"

slots 010 and two Ethernet ports 020. Similarly 4130, 4270 depict six port configurable switches, in a switch stack hierarchy. Note that the two trees, wired and wireless, provide redundant fail over functionality. FIG. 12 shows a six slot switch in one embodiment. One of the 4 radio slots 010 will support wireless backhaul services. Separately, the two Ethernet ports 020, are dynamically configured to provide the wire-based uplink and downlink backhaul, see FIG. 34, 4260. Thus, while in a tree based topology, routing is limited to North-South, adding another set of logical radios now includes "East", "West."

Switch port embodiments support (intermittent) wired and wireless connectivity. In one embodiment, a single-radio unit, 4110, has been successfully reprogrammed to provide a U, D, S capabilities, singly and in combination. The switch ports themselves are also reprogrammed so that some ports may be configured to provide 24V Power Over Ethernet (POE) to the single radio units. Note that units 4140, 4150, 4145 logical radio agents U, D, S may be serviced by one physical radio 4110, see FIGS. 10, 11, 31, 32.

In one embodiment, a logical radio agent S, 4150 hears uplink 4120 operating on a different channel than downlink 4140 is currently on—and therefore cannot "hear" uplink 4120. The Scan Function, FIG. 9, communicates this with the adjacent Mesh Control, FIG. 9. Downlink 4140 is directed to change its channel temporarily to provide intermittent service to Uplink 4120. Connectivity is intermittent: both uplink and downlink may also be servicing other clients, at other times, per the collaborative scheduling and queue/stack management, see 61/555,400. Buffering packets during scan requests is described in Ser. No. 11/818,889.

Figure 34:
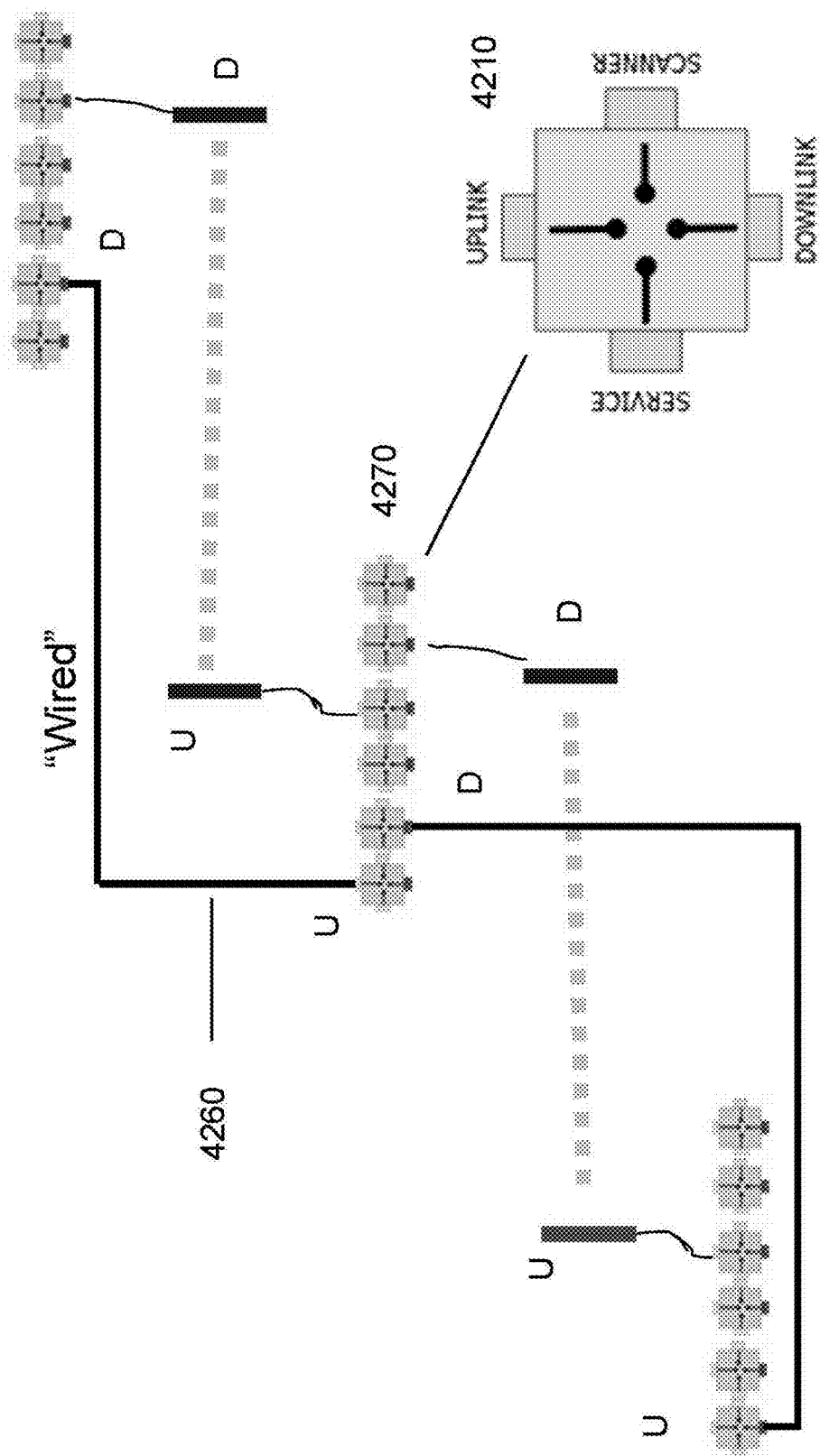

FIG. 34, depicts an embodiment showing a "wired" equivalent tree to 4160, Multiple wired and wireless links, 4160 and 4260 may concurrently exist, providing intermittent connectivity to isolated clusters. 4260. In this embodiment, a common router 4270 has two uplinks, but operating in orthogonal domains of wired and wireless and hence permitted by the mesh control layer, responsible for ensuring tree based (non-cyclic) routing. 4270 may thus also provide bridging services e.g. for IR transceivers, see FIGS. 18, and 19.

Figure 13:
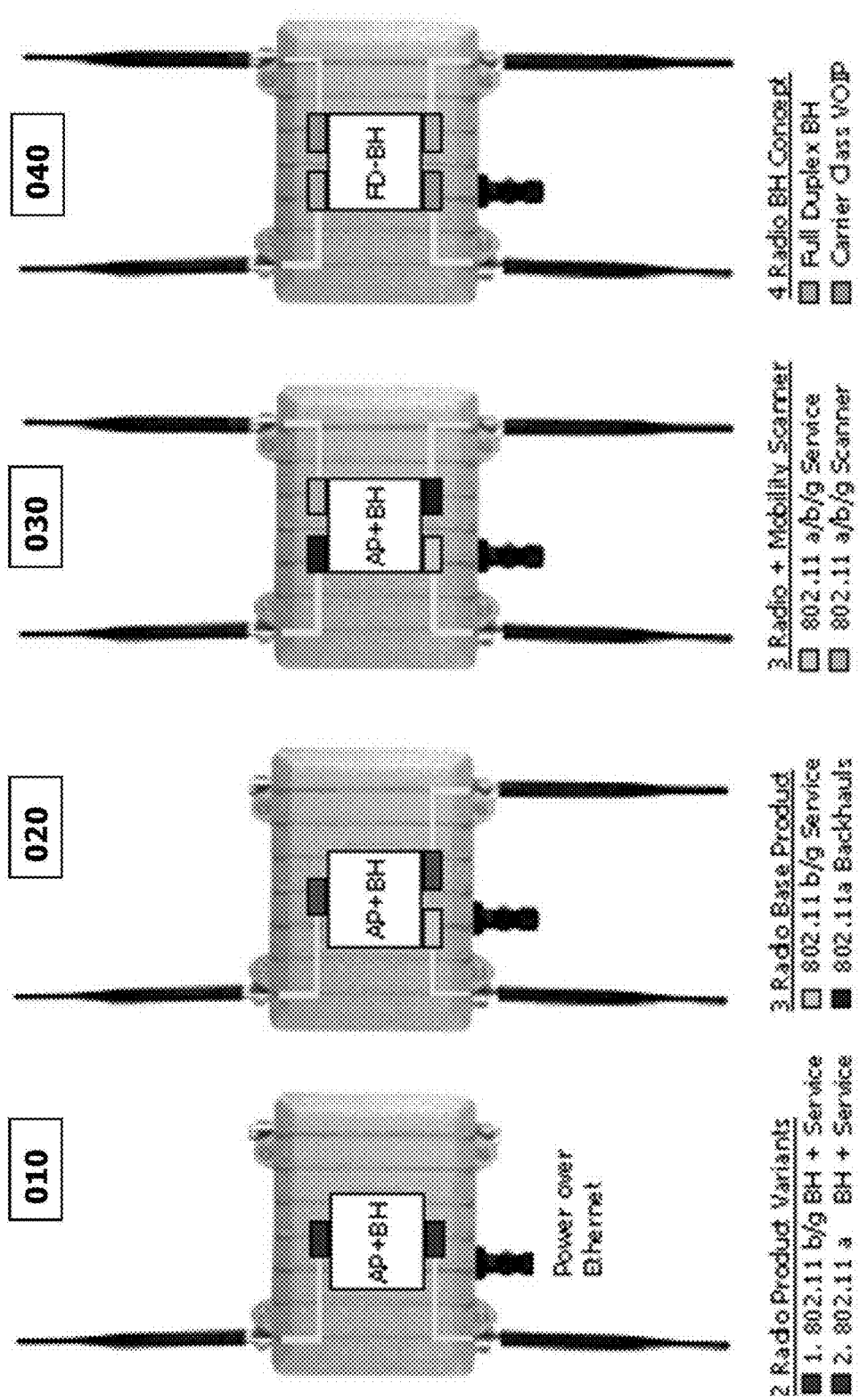
FIG. 13 indicates the modular mesh framework, whereby a four slot board, as shown in FIG. 12, may be configured to provide different functionalities: Two radio Backhaul (BH) 010; three radios BH+AP 020; four Radio with BH AP and Scanner 030; four radio with Full Duplex (FD) using a coupled two radio BH 040. Further, since the modular mesh framework always forms a tree, these nodes are part of a switch hierarchy, as shown in FIG. 4.
Figure 35:
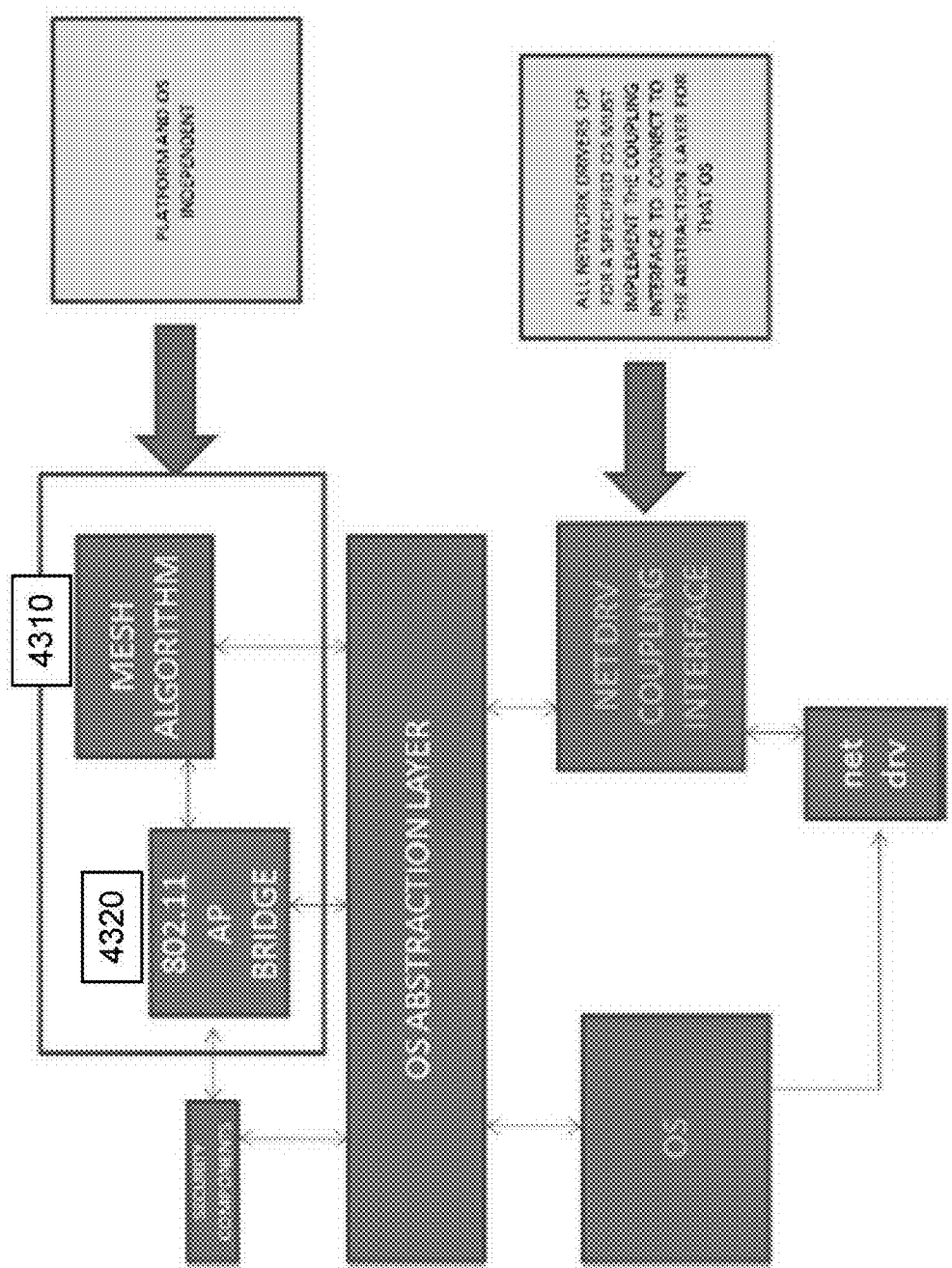
FIGS. 35 and 36 show the bridging function (as described in FIG. 35). Mobile node 4455 switches from "blue" 5.8 G backhaul to a "pink" 2.4 G backhaul. The sub tree beginning with mobile node 4457 is thus operating on a non-interfering channel/frequency/protocol. The static counterpart is 4460.
Figure 36:
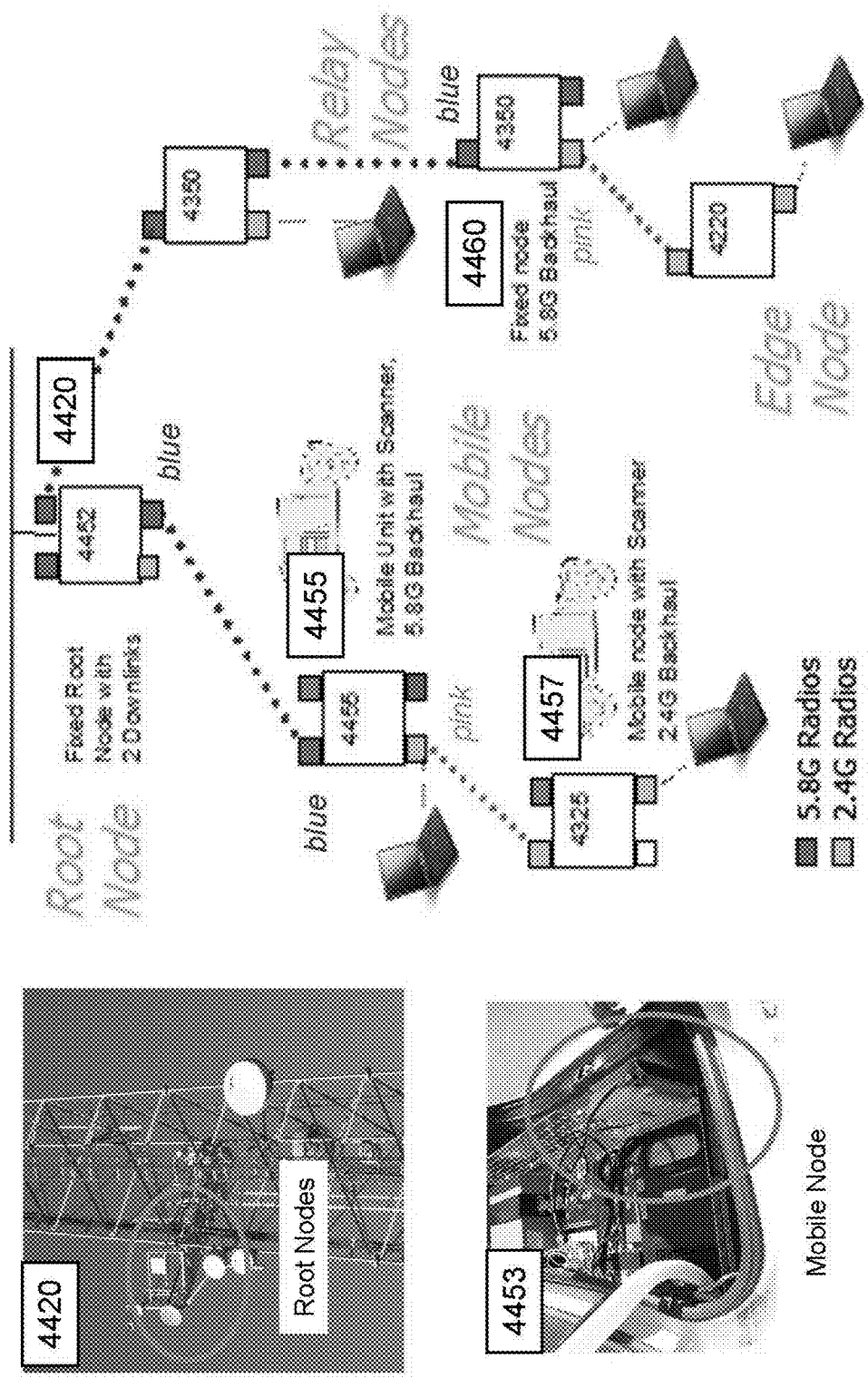

FIG. 35 is a schematic of how the logical radio abstractions may be combined to create more complex abstractions. 4320 refers to two abstractions AP (also in FIGS. 9, 13). The "bridge" is a combined logical radio abstraction, similar to the U+D backhaul, FIG. 13, but bridging over disparate frequencies and protocols. FIG. 36 shows the bridging function (as described in FIG. 35). Mobile node 4455 switches from "blue" 5.8 G backhaul to a "pink" 2.4 G backhaul. The sub tree beginning with mobile node 4457 is thus operating on a non interfering channel/frequency/protocol. The static counterpart is 4460. Thus, private networks are formed, occasionally bridge (FIG. 31, 3930, 3952) but for the most part operate autonomously.

Figure 41:
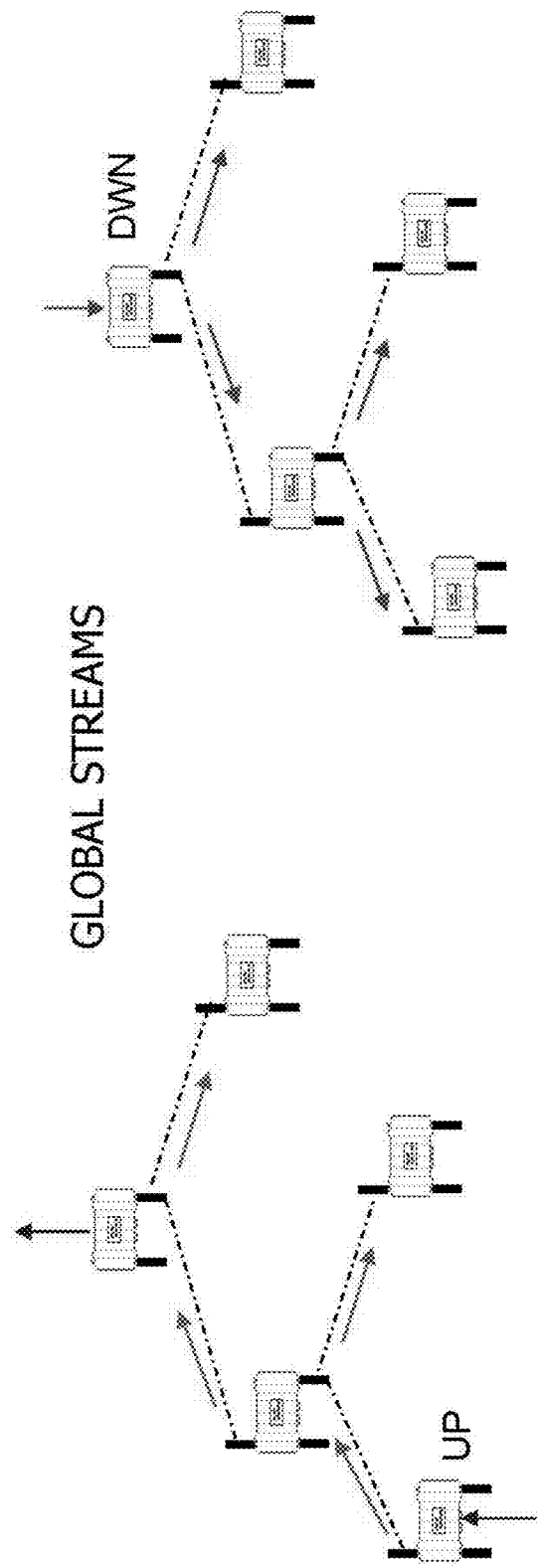
FIG. 41 is effectively the reverse of FIG. 40 and is global: e,g. not restricted. Tree based topologies favor global broadcasts. At the minimum, streams go up to the logical root. Streams can originate from anywhere on the network Streams from the root are always downwards. While streams from nodes may be either, they are typically upwards. Streams from clients may be either upwards or downwards. The majority of devices populate the edge of the network and their pollen is typically upward bound, necessitating bulking, exception handling and deterministic time mail delivery along the route.

Mission critical mesh networks favor more "channels", for wired-wireless failovers, FIG. 41. Embodiments installed in underground mining tunnels, for example, deploy a string of mesh nodes, FIG. 12, to provide voice and video over multiple hops deep inside mines. Each mesh node supports both wire and wireless up links and downlinks at each node in the chain, see FIG. 31, 3940. Traffic is cloned to travel along both parallel pathways. On arrival at each node it will be forwarded on the most reliable link, wired or wireless and so on. Thus a packet may crossover from wired to wireless (where the wire has been cut) and back multiple times. The duplicate packets, like duplicate heart beat broadcasts, are discarded by the destination station's parent, a mesh node, FIG. 12.

Figure 37:
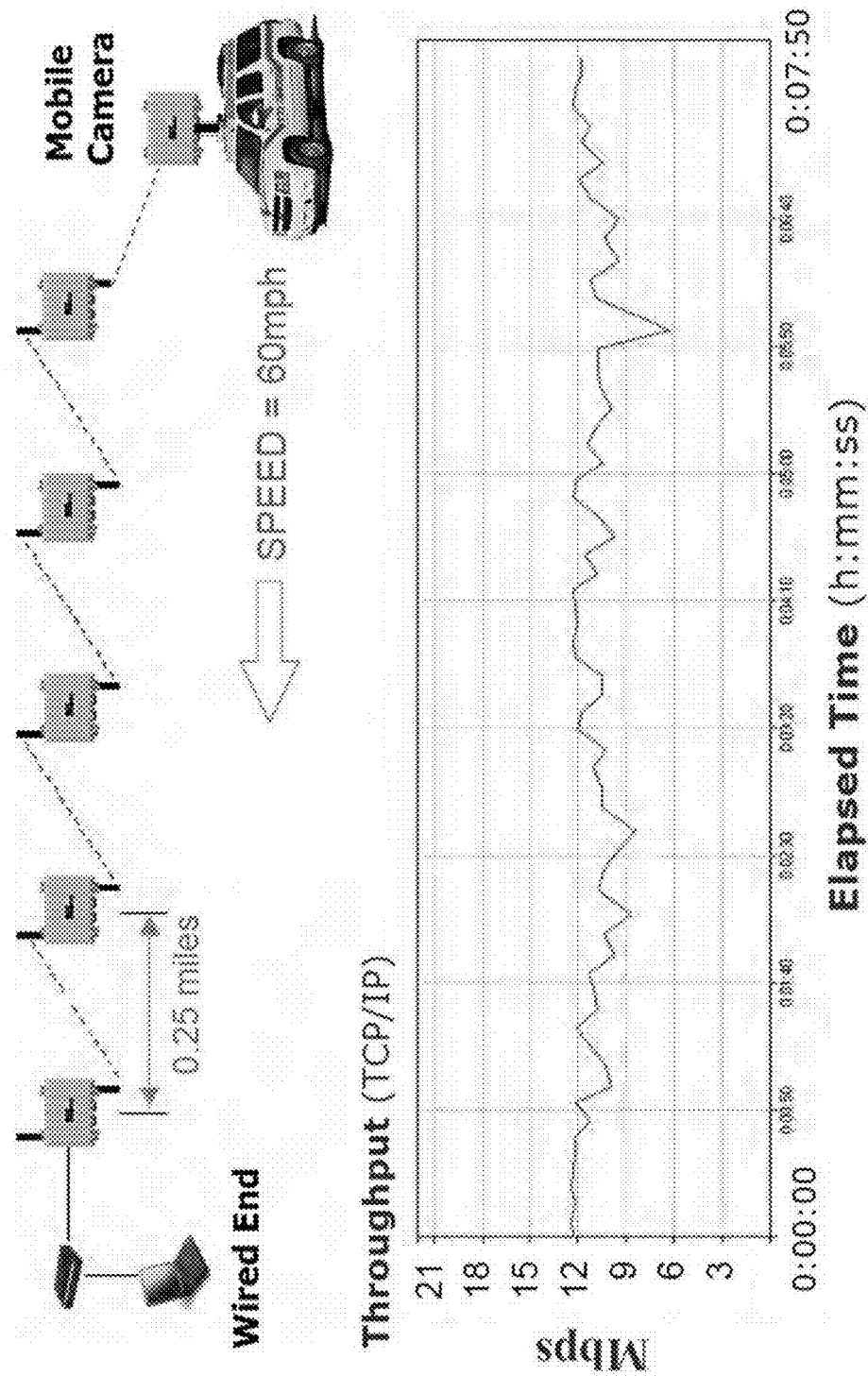
FIG. 37 depicts a "string of pearls" configuration of static mesh nodes. A mobile mesh node, traveling at 60 mph makes temporary connections with each node in the string. Switching from node to another is seamless and unbroken, as noted by the video output below. The process is repeated with single radios embodiments, using logical radios. Bandwidth degraded along the string of pearls, as expected, but video output was still jitter free and unbroken, due to proactive Scan Control, FIG. 9, Logical Radio abstractions and the benefits of O(n), tree based routing.

Embodiments employing "string of pearls" configurations are also used in mobile military applications. In FIG. 37 upper, a mobile unit makes intermittent connectivity to each static mesh node in turn. This is managed by the Scanning radio functions, FIG. 9, described in Ser. No. 11/818,889. Note that mobile unit backhaul connectivity is intermittent, but the output is not. Real time video streams are being seamlessly "switched" to the mobile unit jitter free and without interruption, see unbroken throughput graph. This was "raw" video—the efficiency enhancements described in 61/117,502 would further improve performance. Chirp based control packets were also exchanged during this exercise, without interruption, using IP packets formats, see FIGS. 26-28.

The process was repeated with single physical radios in a chain, FIG. 31, 3920. Bandwidth degraded, as expected, but the system still provided uninterrupted, jitter free, video, due to proactive SCAN agents, FIG. 9, Logical Radio Abstractions, FIGS. 30 through 34 and the benefits of O(n) tree based routing, FIGS. 3 through 7.

In summary, the wireless networks used in the system described herein use a strict tree-shaped relationship, which results in limited routing costs when adding new clients or network participants. The terse messages or chirps are added to this efficient network, as described below.

Switching Parents and Scan Management

At the base level, propagators are relays, connecting to a "root" node, thus forming a tree. On power up, its primitive behavior is to become associated with a parent, which provides a path up stream to the root node, the closer to the root node, the better. The preference may therefore be, at a rudimentary level, to connect to parents with a low hop count, 0 for the root, 1 for one removed etc. However, M2M traffic is moving mostly upstream, hence, there is more contention closer to the root. Hence, in addition to noting the candidate parent nodes within its wireless radio "zone", propagators must also be able to send a "probe request", to determine the signal quality for transmission. Additionally, it would need to know how many siblings it will need to contend with. Since siblings are part of their own sub trees, the descendants of those siblings are also, indirectly competing for the "mother" parent node's attention. In short, that is a lot of information to sift through before selecting a parent. And it would change in a few minutes, in dynamic or mobile environments. A simplified notification of the presence to a candidate parent is required. At the base level, connected Nodes transmit, through heartbeats, their "lineage" and "costs" of connectivity, e.g.

1. Their name
2. Their Parent's name
3. How many hops they are from the root node ("hop cost")
4. The "Toll Cost" of using this node—e.g. its availability
   a. Based on current processing power usage at node
   b. Based on number of active chirp and propagator descendants
   c. Its overall link quality of path back to root node
   d. etc NAME-PARENTNAME-HOPLEVEL-TOLLCOST thus defines a broadcast beacon, in one embodiment. Recall names are not unique, simply unique within a lineage sub tree. Hence node names, all the way up to the root, may be duplicated—as long as the lineage path remains unique. Thus two sibling nodes may not share the same node name.

Hence a new node with the same name as a current child node, will not be allowed to join that sub tree.

The decision to join is then simplified to whether a prospective parent toll cost/hop cost ratio meets desired characteristics of current chirp packets that the orphan node would be transporting. The orphan node, does not actually know what that data profile would be—it has not yet joined a network.

It does have access to chirp devices in its vicinity and can perform rudimentary profile analysis, with the presumption that this is a representative sample set. Based on the profiling, if more latency is acceptable, higher hop cost would be acceptable. Else, a switch to a node closer to the root, but at a higher toll cost, will be initiated.

This is, at best, an approximation to an actual link quality, when connected, and then having actual chirp devices connected to it.

One is tempted to suggest that the propagator make a hasty connection and perhaps later, switch parents but this is costly. Nodes may switch parents constantly, causing local oscillations (switching back and forth between sub trees), which eventually percolate to the top.

"Mother" Nodes can therefore not leave the nest, while descendants are switching around—it would simply feed the chaos. Hence decay functions are built into the hierarchical control system that manages the network tree topology. Permission to switch parents travels at least as far up as the parent of both sub trees—since both are being affected by the switch. There, if there nodes have settled down from the previous switch, permission is granted.

In order to discover candidate parents, each relay node needs to scan its environment periodically, preferably a broad scan covering multiple frequency channels available to the transceivers. If it has a dedicated scanning radio then its normal function of transporting chirps is not interrupted. Else, it must request a scan "lunch break" from its parent, in order to use its radios to scan on other frequencies than the one it is using. At that point, it will need to tell its incoming link from its parent, to "hold all messages". During that period, the clients are effectively temporarily detached, see FIG. 49.

A parent node would have multiple scan requests, which would be permitted in some weighted, round robin manner, weighted in favor nodes with more clients, for example. Using such a round robin scheme, each sibling node of a patent would be granted a timed lunch break, so that no two siblings scan at the same time, thereby missing each other. The siblings may know of each other but without mutual probe requests, have little knowledge of the signal strength and tested link quality. Further, since the current "mother" parent's siblings (e.g aunts) are also potential parent candidates, none of them may be in scan mode either. Hence the scan request is being permitted by a parent's parent or grandmother. By the same token, the decision to allow a node to switch is therefore also addressed by at least a grandparent to the requester node.

In general, changes within a sub tree (child moving from mother to aunt) will not affect the grandparent aggregated upstream throughput—since both the aunt and mother are its children. Hence, if the shift request is within parent's siblings, the perturbation is contained and temporal. In general it is at least grandmothers of the intended parent candidate provide the final permissions.

For network topologies with less than a few hops, it is more efficient to let the root node address both switch and scan requests. The root node is generally more processor and memory equipped, since it also handles the IP to chirp interface. As one of many "hubs" for the chirp buses, it is also the logical place for small data subscribers and agents to reside. Some of those agents, Navigational agents, may wish to have a say in the changes in network topology. Thus agents are part of the control plane managing the physical network. Since the physical network and logical network map to each other, the only option is to change the network topology, by moving nodes around, based on the global (root level) toll cost/hop cost criteria. The network topology is thus managed to be in dynamic alignment to subscriber demand.

As in insect colonies, the primary function of every node, all the way from the edge/branch nodes to the root node is identical. Each node wishes to improve its lot, but with a view to long term network stability. This is akin to ant or bee colonies, where the common good affect all positively. Thus a node may be directed by the root node to switch parents because it would streamline the publishing stream. Or nodes may be directed to disassociate a chirp child and have another sibling (aunt) adopt the orphan. Thus each of the sibling nodes may, over time, become specialist hubs for category clusters and the social network coalesces towards more efficient routing. This is akin to trees changing their growth to favor changes in sun direction. Adaptive Network trees, like natural trees are driven by the common good of the entire tree, including all constituents, down to the chirp devices at the edges.

Chirp Routing Protocols

Chirps, like pollen, are often simple and lightweight, for reasons explained above. In one embodiment, they use low cost and low overhead IR based transceivers, see FIG. 18. The chirp may be relayed through propagation agents via multiple hops. Eventually it reaches the port of entry in the chirp aware router—using transceiver slots operating in the same medium as the chirp or its relay agents, see slots in FIGS. 6, 7, 9, 12, 13, 19.

Figure 6:
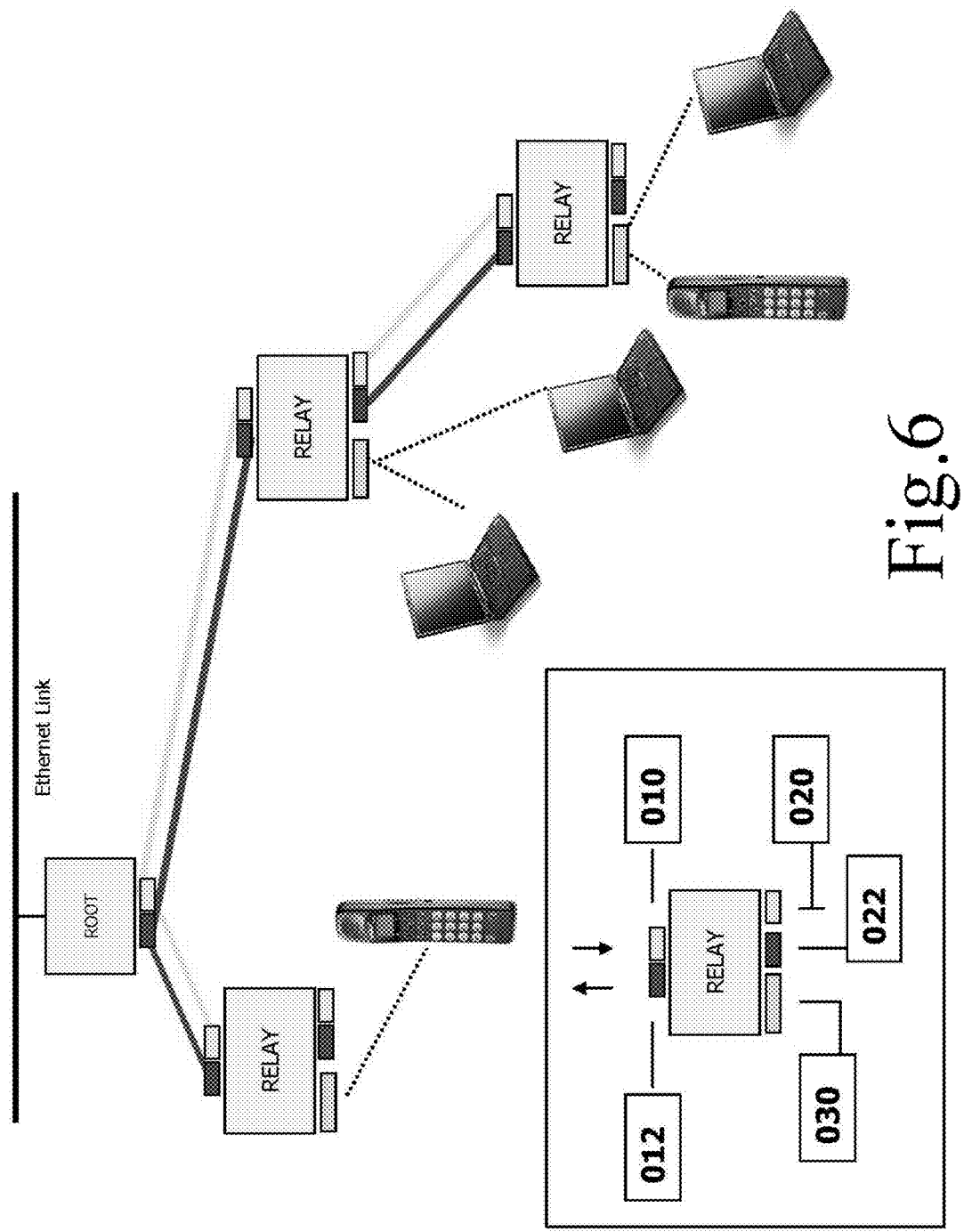
FIG. 6 illustrates another embodiment of the two logical radio approach but with five physical radios. The uplink and downlink radios (shown as one radio FIG. 6) are split into two radios, in this embodiment, with each responsible for one direction of traffic. Bandwidth is doubled and latency halved, since traffic in the opposing direction now has its own channel or logical "lane". Thus, the radio labeled 010 in FIG. 5 is now radios 012 and 010. Similarly, the radio marked 020 in FIG. 5 is now split into radios labeled 022 and 020. The radio pairs 012-010 and 022-020 provide the same functionality as the radios labeled 010 and 020 in FIG. 5 but with twice the bandwidth and approximately half the latency.
Figure 7:
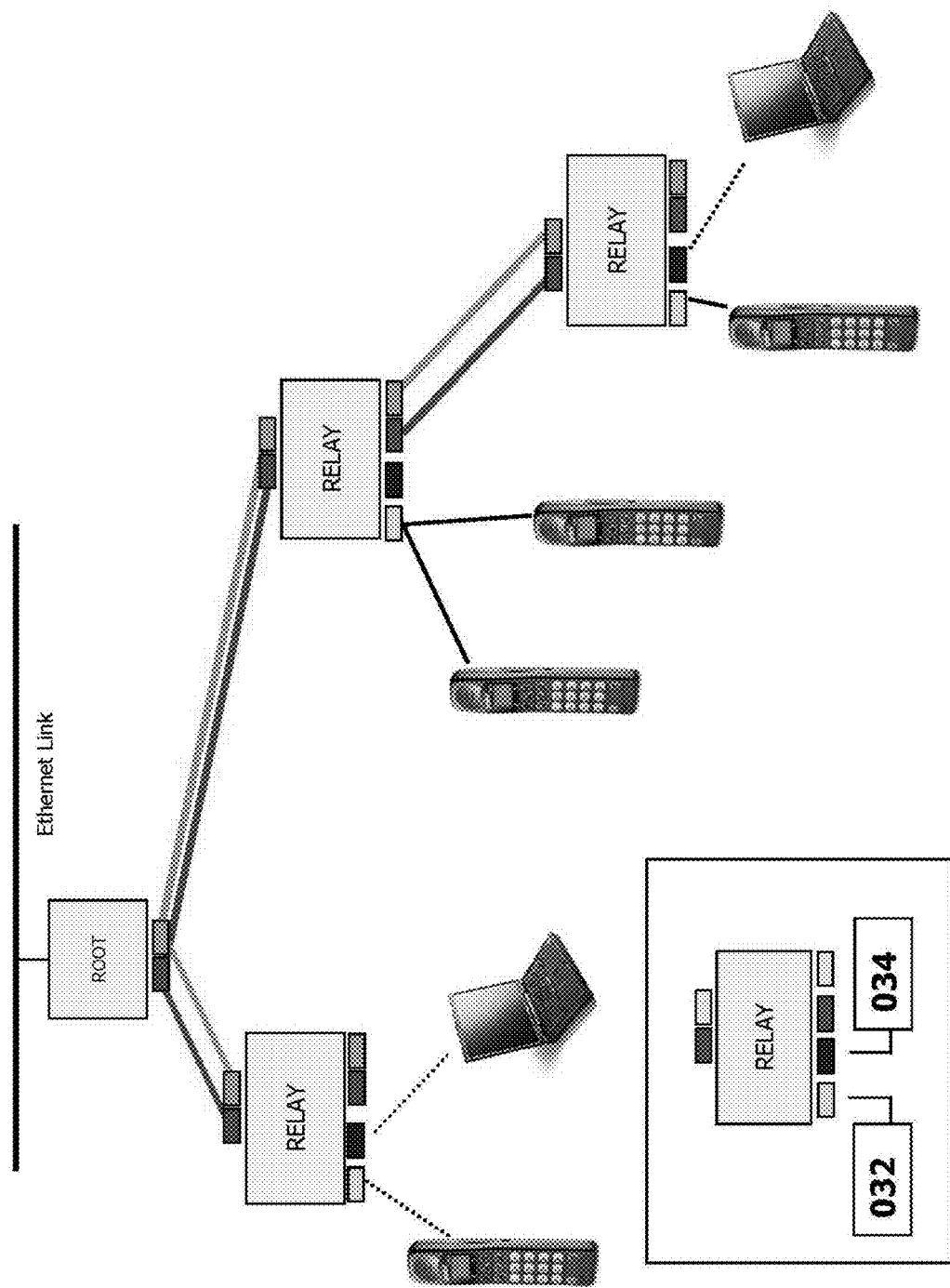
FIG. 7 is an extension of the five-radio embodiment shown in FIG. 6.

FIGS. 6, 7 show transport up to the root node using dedicated backhauls for VOIP chirp-like packets and data. In another embodiment, the chirp data maybe converted by agents to travel in another packet format/protocol, see 22 in FIG. 8. Then, after the first hop, IR chirp data would be converted to Wi-Fi based chirp data formats, see FIG. 18. Or, in another embodiment, chirp devices may share the same Wi-Fi spectrum, as described below.

In an embodiment where the chirp devices and Wi-Fi devices share the same Wi-Fi spectrum, the chirps are "simple", they operate clumsily and the agile IP based Wi-Fi devices must proactively avoid contention. This agility may be provided by Access Points, in one embodiment. One slot of nightlight embodiments, FIG. 13, 020, indicates a four slot configuration with an Access Point. Another slot, could house an IR transceiver. Once received, the chirp must eventually be converted into some Internet Protocol compliant packet, to travel upstream/downstream in search of interested flower/agent/tunes.

Figure 26:
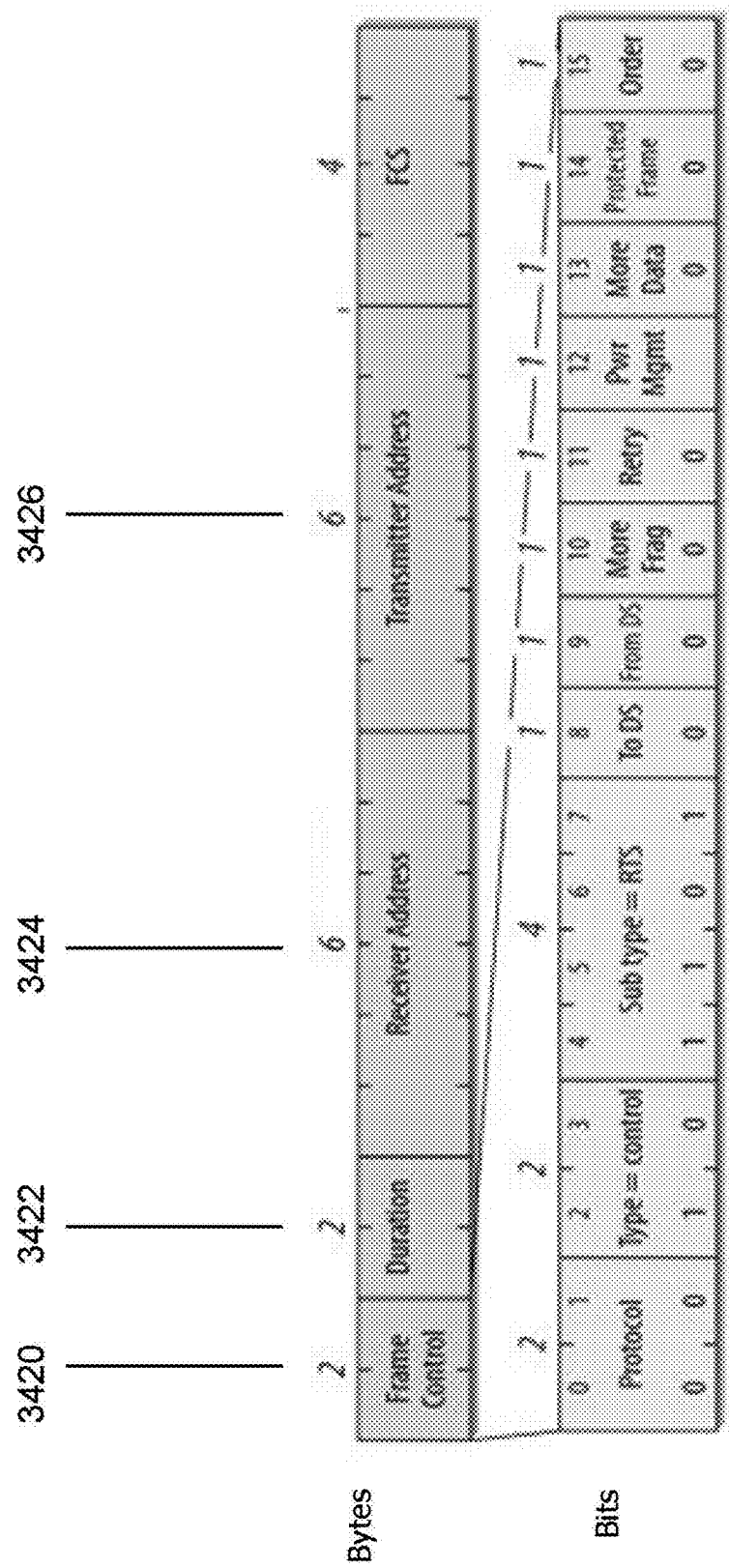
FIGS. 26 to 28 depict representative IP based "light" or low payload packets that may be used to transport chirp data over a IP based network. 802.11 packets are used as examples. Chirp data is encapsulated in such packets for onward transmissions, in unicast, multicast or broadcast modes, in search of flower/agents/tunes/subscribers interested in the chirp/pollen. In one embodiment, chirp devices use such innocuous frames to transport payload—only chirp aware routers know how to recognize them as chirp packets and process their (secure) routing to appropriate agents accordingly.

Internet Protocol uses a "From" and "To" addressing scheme. This information is generally public, for IP based routing (wired and wireless) to work. FIG. 26 shows a representative Wi-Fi Request-To-Send (RTS) packet format. RTS announces the intent to transmit and specifies the "to" (receiver) and "from" (transmitter) addresses, see 3424, 3426. The Frame Control data, 3420 at the beginning of the packet contains pertinent information such as power management features intended for access points to know when the device will awake and thus buffer its packets. This is also relevant to chirp devices and their interactions with night lights. Note that Frame Control Data may be used an existing protocol to communicate a distinctly different form of addressing, related to pollen and flower/agents Chirp communications are not limited on strict requirement of providing a fixed "to" addresses, as is described herein.

The Duration Field, 3422 indicates time of transmission requested, which Wi-Fi stations use to set their Network Allocation Vector (NAV) and avoid contention. In one embodiment, to prevent network congestion and to prevent transmittal of outdated chirps, even blind chirp devices—chirping randomly—can provide this information. Co-located devices can then be agile and avoid stepping on their clumsy fellow dancers in the same RF space. Note also that, an RTS is typically followed by a CTS or Clear-To-Send from the Access point managing 802.11 stations associated with it. Therefore, if chirp devices specify their periodicity, or the transmission pattern they are following and their current pattern sequence index, then the APs can preempt contention at the expected chirp transmission time by sending a CTS ahead—like a police car siren, it warns both IP aware and Chirp aware (hear and send) devices of other, unexpected traffic.

Figure 27:
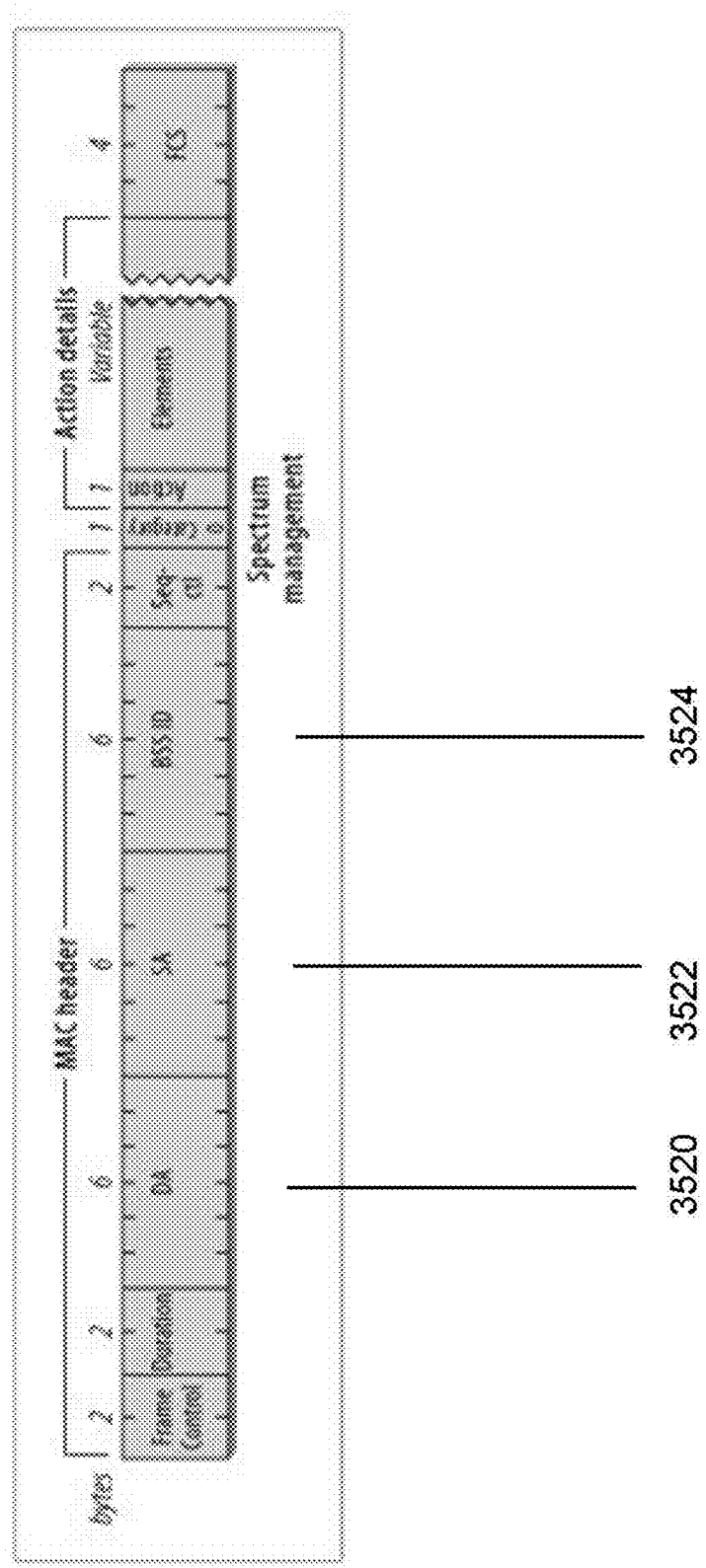

Vendor specific chirp information exchange may be supported in the 802.11 standard through Action Frames, see FIG. 27. In one embodiment, these contain 1 byte for Category and 1 Byte for Action type, see FIG. 27. Hence there are 255 non trivial categories of information, with 255 non trivial types of data being sent, each of which has 255 non trivial Dialog Tokens—expressing data formats. With appropriate filters one Action Frame could provide data for multiple agents/tunes in a compact transmission. Note that, akin to the RTS packet, it contains Duration information. It may also contain the chirp equivalents of Destination Address DA, 3520, Sender Address SA, 3522 and BSSID, 3524. DA and SA relate to Receiver and Transmitter Addresses in the RTS, FIG. 26. BSSID may be loosely thought of as a chirp in search of a specific "flower"/tune/agent.

Chirps may thus be encapsulated in exemplary Wi-Fi Action Frames, for onward transmission to other chirp aware routers. The packets will travel through prior art—and not chirp aware—routers without incidence. The exemplary Action Frames may be sent in unicast, multicast or broadcast modes—this is dependent on the Destination Address DA. Should IP multicasting be used, then, with IGMP protocols, chirps will be efficiently transported to the interested members of the multicast group. Efficient transport mechanisms have been described in Ser. Nos. 11/266,884, 11/818,899, 12/696,947 involving bulking, scheduled delivery, servicing isolated clusters, maintaining SIP like registries, etc. are all are applicable to chirp transports over IP. If the subscribers/agents are not known or choose to be hidden, then IP group based multicasting (e.g. IGMP) is not useful. A more brute force approach is needed. This is broadcast mode, where the Chirp packets may travel both upstream and downstream of the mesh tree.

Broadcasting is how pollen reaches the "interested" flowers in nature. As long as the broadcast durations are managed, flooding and network congestion is contained. For example, mesh network nodes described in this application send out "heart beats" announcing their presence and current state regularly in broadcast mode. Heart beat counters are used to avoid resending of "old" packets. Second, the mesh topology is tree-like, hence broadcast directions are limited to up, down or local (within siblings). Third, the packets themselves may be encoded with time to live function or the maximum number of mesh tree hops. These methods have been successfully applied to contain flooding in a tree based mesh network. They are be reapplied to "chirp" heart beats, maintained by the routers, if needed, in one embodiment.

In the event chirps need to leave the mesh network and enter non chirp-aware networks, flooding control is used, with time to live functionality employed in one embodiment. Additionally, the bulk container bus delivery service is specifically designed to efficiently send packets over non chirp aware networks by forwarding them to a chirp aware router at the other end, using standard IP based routing, with applicable encryption. Thus chirps will get to where they need to go, to their agents/tunes/flowers, using either multicasting or broadcast modes.

While (pruned) broadcasting techniques will get the chirp to the interested flowers, it is over-provisioned, like allergy season. One approach to providing more routing information is to specify both a navigation agent and a data handling agent in the same chirp. The navigation agent accesses a portion of the chirp packet. Access is limited to the routing/navigation of the chirp, not its payload. Navigation directives may be either physical or logical. Physical navigation is turn-by-turn directions e.g. three nodes up, third child sibling node down, stop. This is useful when private and static networks are deployed. Logical navigation is more flexible e.g. move up within three hops in search of Agent-For-GE-Toaster, stop. If the agent is not found, then put the chirp in a lost and found area in a community mail box for forwarding to mobile agents. For example a kitchen night light provides updates, via smart phone agents, to a user, when he returns home, in one embodiment.

Extensible Network Management

Figure 38:
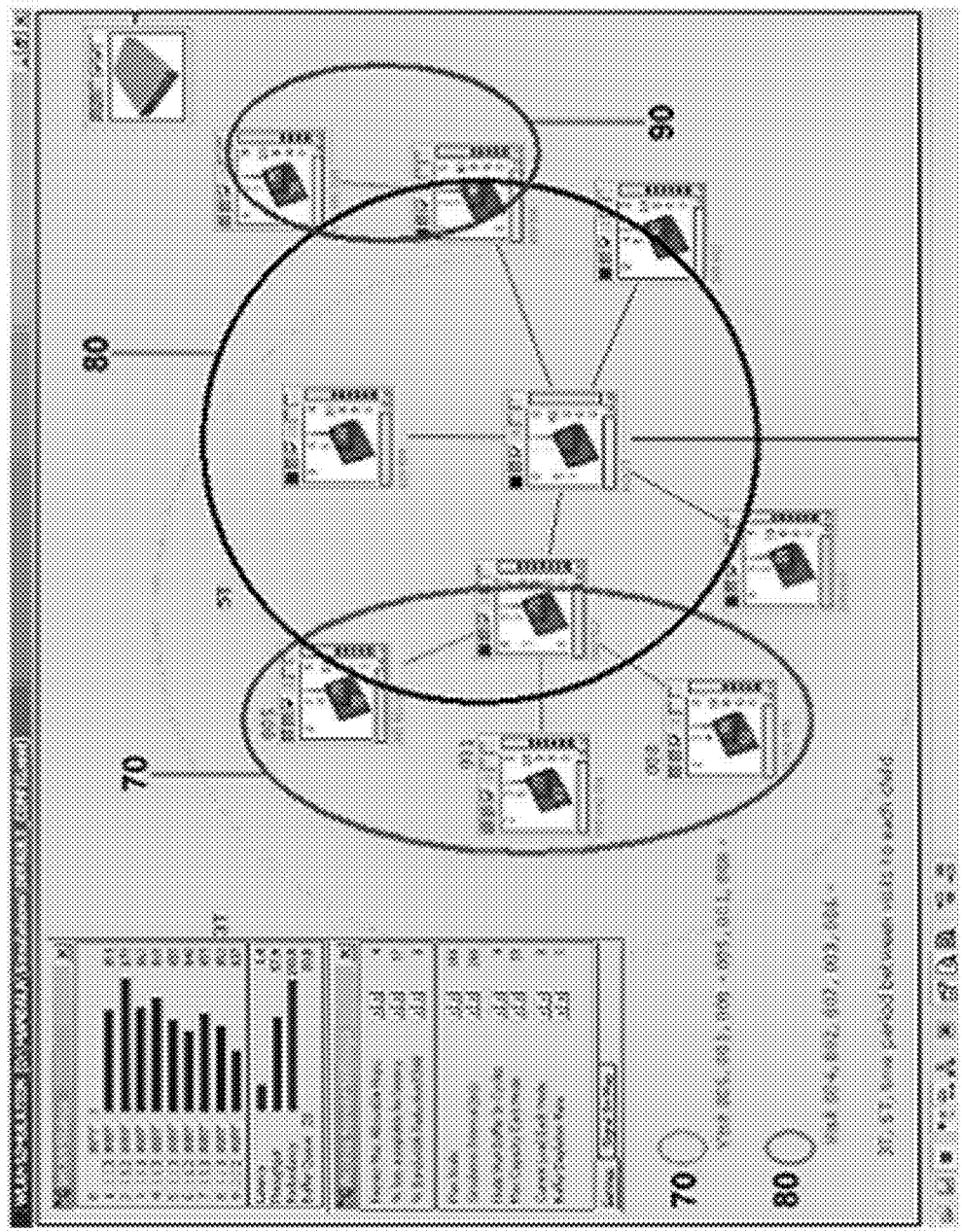
FIG. 38 depicts the dependency of latency sensitive traffic to the network tree topology, specifically, the number of siblings in sub trees along the route to the destination node/parent/root.

FIG. 38, a reprint of FIG. 10 of Ser. No. 10/434,948, explains why network latency and topology are inter-related and hence relevant to latency sensitive VOIP/Chirp bus delivery schedules. Ser. No. 10/434,948, teaches a round robin approach where, the AP services each client in turn. In that example, 10 ms is the (equal) service duration for individual client services. Packets are buffered till a round robin cycle is complete. At the end of each cycle the container is sent, per up the tree, in one embodiment. The local latency upper bound would therefore be 30 ms for section 70. By the same token, the root node is servicing 5 clients and hence the upper bound to reach the root node is 50 ms for sections 70, 80. Further, the example pointed out that, had all the nodes been connected directly to the root node, the latency would be 90 ms. 1 hop networks—all clients connected to a root node—are not necessarily "better". A five-hop string-of-pearls, O(n) routing scheme, FIG. 37, may provide better service, than the 1-hop 5-client star, FIG. 38, Section 80.

Thus, in one embodiment, bus delivery schedules are driven by the round robin delay caused by servicing siblings, at each sub tree along a route. More siblings imply more latency and favor node/device migrations. Accordingly, network topology is dynamically modified based on toll costs of larger "families" see FIG. 1 and Appendix A.

In FIG. 38, nodes operated independently and asynchronously but based on a common multiple of some service time interval e.g. 10 ms. Minimum Bus Intervals vary, based in the number of siblings. In Ser. No. 11/266,884, FIG. 20, the bus interval is set. Buses leave at preset intervals, regardless of whether the bus is full or not. In more efficient implementations, the departure time is flexible, and buses may wait till more passengers arrive, within a prescribed waiting limit, see 61/555,400. Thus the stream and CSMA allocations are based on "stacking", in dynamic alignment with "Customer Satisfaction".

Figure 21:
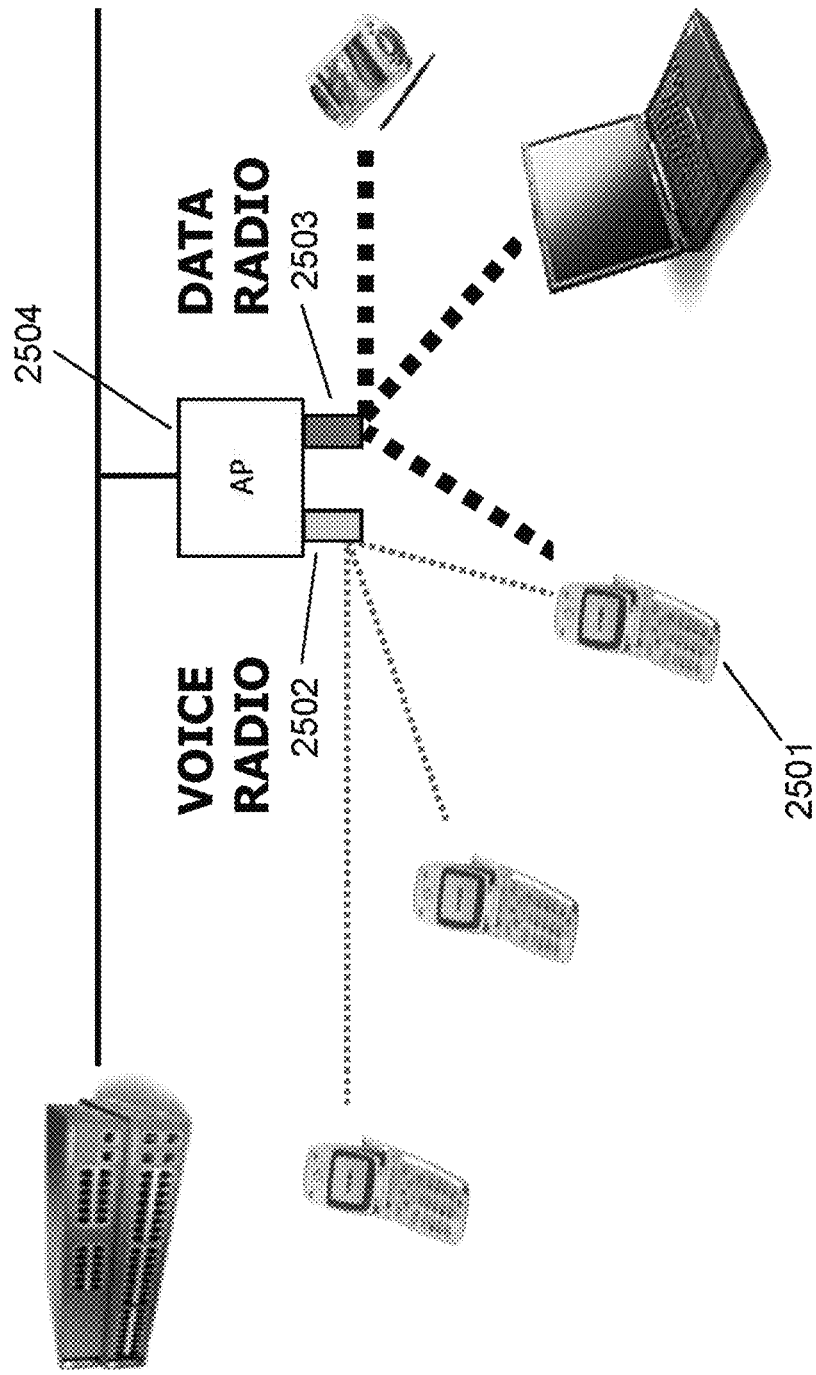
FIG. 21 shows a voice device talking to a dedicated voice radio and data devices taking to a data radio, with one phone 2501, capable of taking to both 2502 and 2503 in one embodiment. The night light embodiment 2504 manages both voice and data transceivers, in the depicted embodiment.
Figure 22:
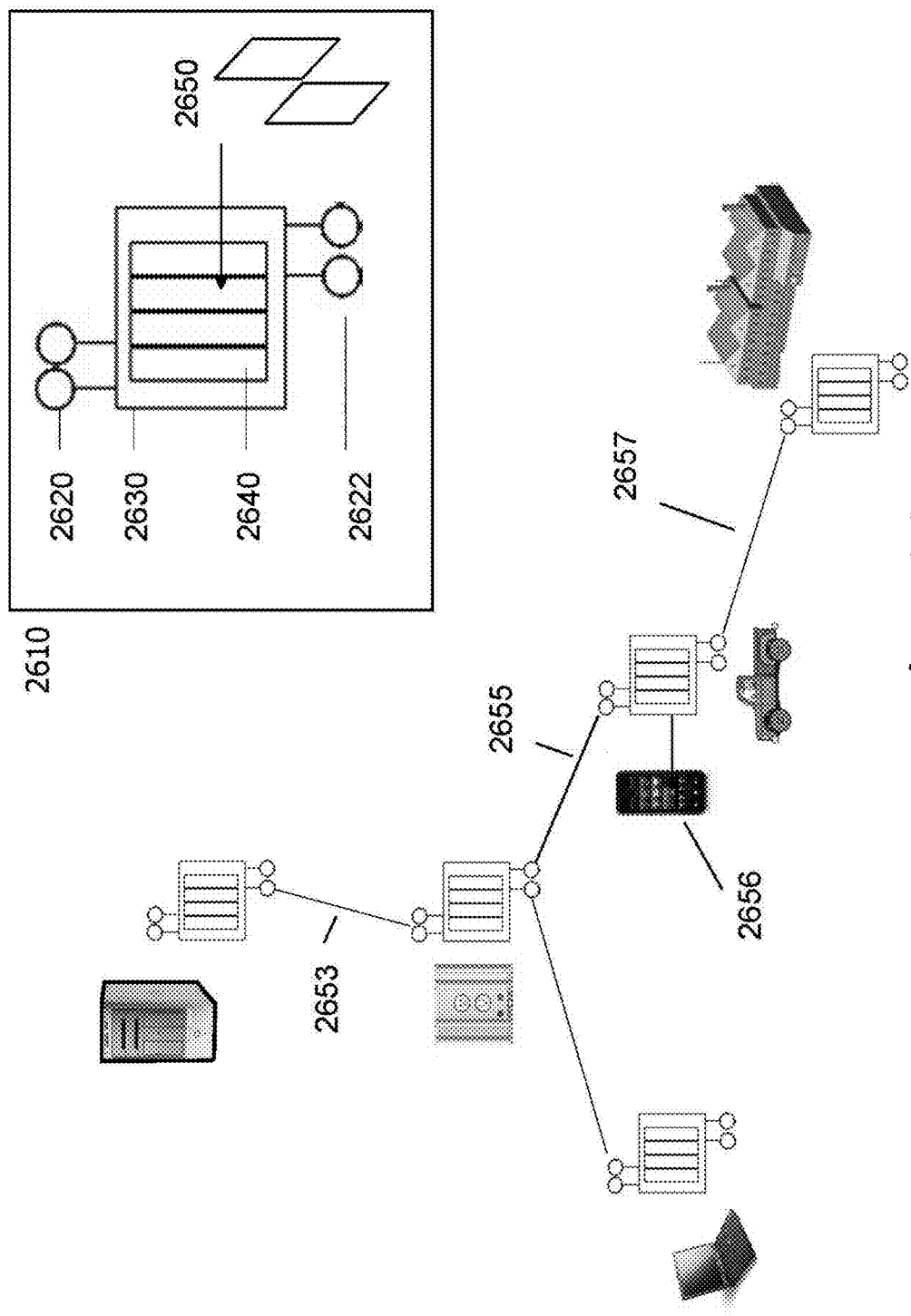
FIG. 22 depicts the dynamic collaboration tree for an exemplary supply chain application.
Figure 39:
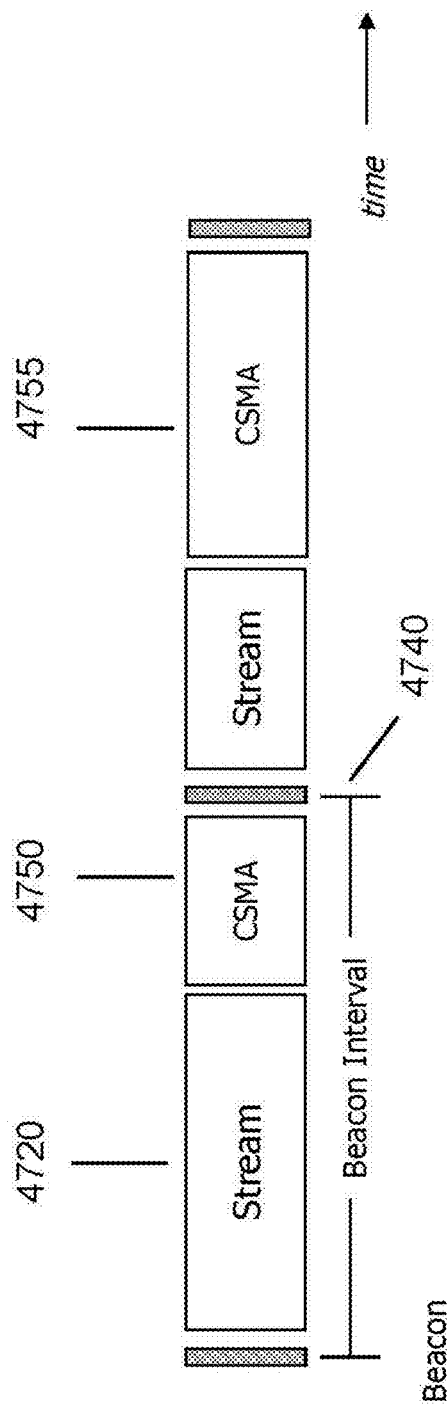
FIG. 39 depicts the use of a reserved time slot for transmitting bulked, latency sensitive data, whereby clients remain silent during transmission in this time slot. The time slot allocations may be fixed or variable.

In FIG. 39, the bulk bus transport stream 4720 is first, during which all clients can listen but not talk, see FIGS. 9, 20. The remainder time 4750 is used to transfer data back from IP based clients to nodes etc. Further, FIG. 21 shows separate "channels" for concurrent transmissions. Contention is reduced during the Stream section, 4720 and possibly more. SCAN agent, FIG. 9, measures overall activity of disparate packet types (a form of "channel list"). Note that in Wi-Fi standard infrastructure mode, all communications are with the AP, hence tree based routing is inherent.

In one embodiment, regular chirps/heart beats are received by the node through one of its logical "slot" interfaces. IP traffic is also received from a slot interface. Both data types are then priority queued for onward transmission. Further, the data may be limited for local consumption, e.g. regional streams, FIG. 40, or sent upwards and/or downwards e.g. Global streams, FIG. 41. Thus, the amount of traffic flowing through the network is lumped together. The ability to identify different traffic regions, their locations and patterns is therefore of value to network administrators and VOIP/chirp device manufacturers alike. The ability to record and play back sequential snapshots of network topology changes is also relevant to simulation, diagnostics and adaptive learning.

Figure 42:
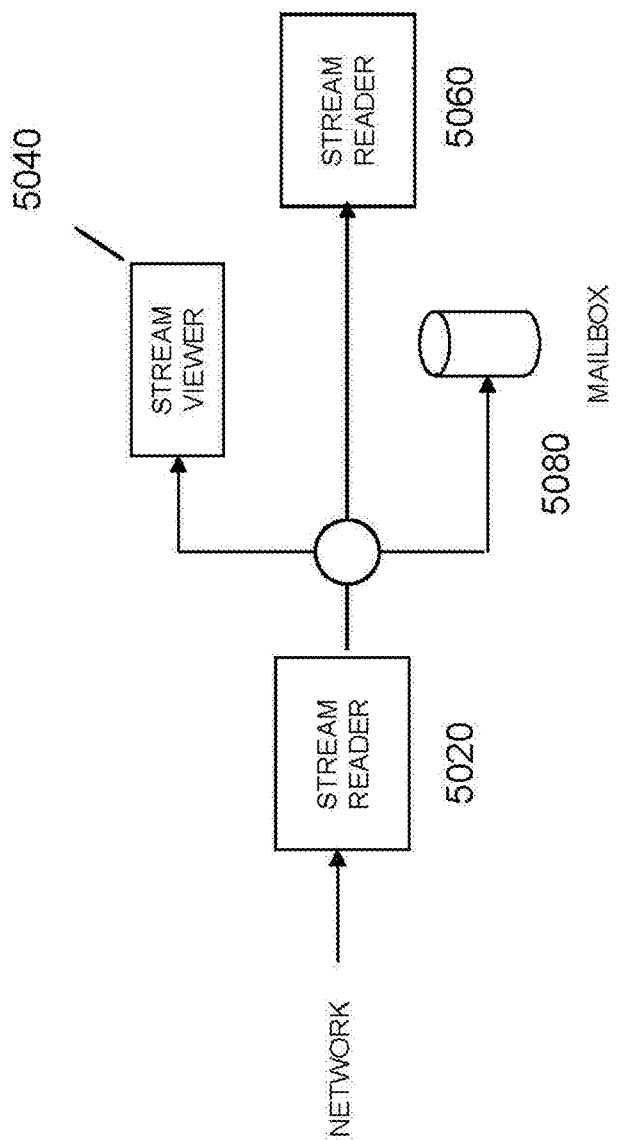
FIG. 42 depicts the Stream Reader, an agent authorized to peer into network router transmission and receiving packet queues, prior to their onward transmission through the network. Like Post office sorters, they identify and sort packets for scheduled deliveries, prune dead letters, duplicate messages etc. They also provide decoded outputs for Stream viewers, a custom GUI for the data. Stream readers may also forward output to other readers, mail boxes or messaging systems.

FIG. 42 depicts the stream reader, in one embodiment. Special purpose Stream Readers are privy to data traffic queued for transmission at a node. Like post office sorters, they identify and sort the "mail" and therefore, help to collectively define bus schedules, reduce dead letter re-transmissions etc. Stream readers, resident at the node, feel the "pulse" and therefore provide early warning signals to the Mesh Control Layer. More "mail" from one node may increase toll cost for other child nodes to switch parents, using load balancing and adaptive power control methods, Ser. No. 10/434,948 and FIG. 1. The use of resident agents in Access Points, to manage flow, was also first introduced in Ser. No. 10/434,948.

Figure 43:
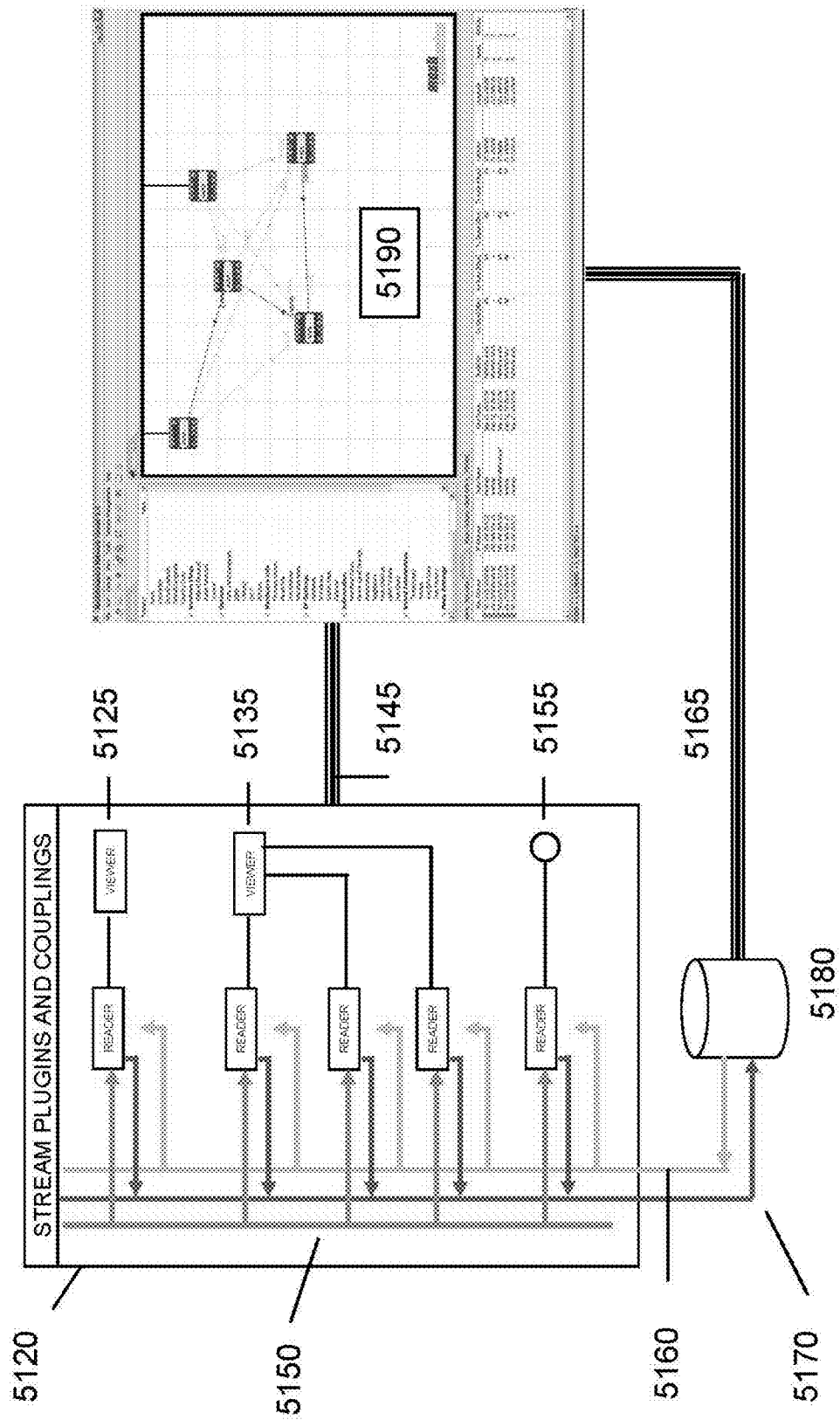
FIG. 43 depicts a circuit diagram of Stream Readers and their associated Stream Viewers, wired together to provide a capability, in this case "feeding" a section of the composite view ports 5190. The composite view port is back drivable since its connection may be to real or historical data.

Stream readers can feed multiple stream viewers, 5040, sequential readers/agents, 5060 or a logging database 5080 community mailbox etc. A circuit of collaborating stream readers and subscribers emulate complex logistic supply chains, see FIG. 43, 5120. Disparate traffic data is sent to knowledge repositories 5180. Secure Control lines from it, 5170, drive sub-circuit behaviors and their outputs, 5125, 5135, 5155. Repositories may also provide the secret handshakes needed by readers to correctly decode public network traffic 5150. Thus bulk network traffic, 5150 may employ little or no encryption and thus be lightweight, like pollen. Further, the Network Viewer 5190 may be connected to the real time stream plug in circuit 5145 or run it in playback mode, 5165 from knowledge repositories 5180. The same circuit based framework 5120 may also provide interleaved real time and historical trending, simulations and machine learning, FIG. 44, 5290 and 61/555,400. Note that 5155 is not connected—it is in "connectionless" broadcast/multicast mode. Thus both direct and indirect subscription styles are supported within the same stream reader framework.

Figure 47:
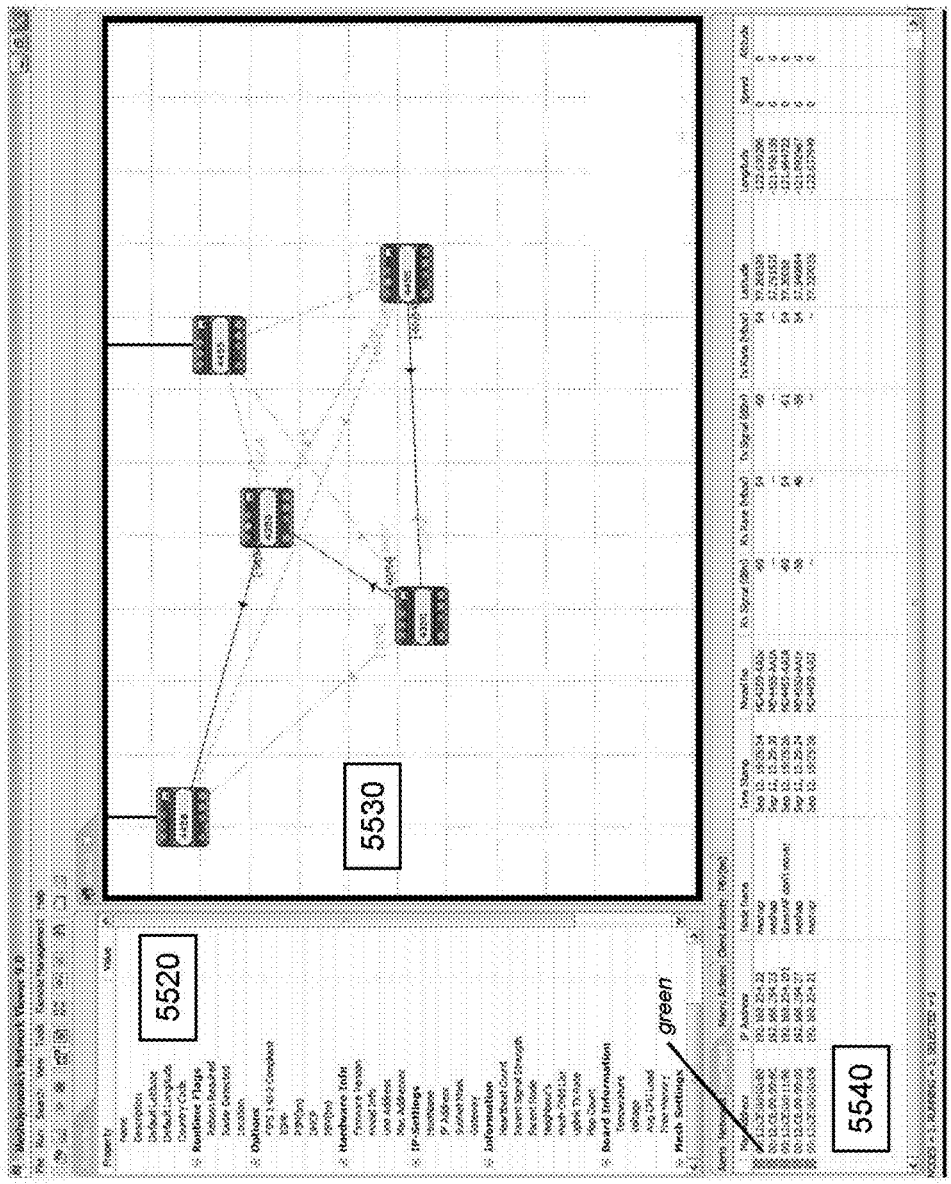
FIG. 47 depicts an embodiment of methods outlined in FIGS. 39 through 46.

From a control systems perspective, a network management system (NMS) receives node heart beat data and provides snap shot views for both human and automated agents. The circuit based approach engenders rewiring—swapping in/out data sources, or using consensual data from multiple readers to drive inferences, see 61/555,400. They may also be used to monitor different types of streams in addition to the Heart beat streams published by the nodes. For example, in FIG. 47, 5520, a custom heart beat was introduced in the Settings Viewport, for bidirectional Machine to Machine (M2M) data streams inside mobile/isolated man and machine clusters, FIG. 31, 36, 37. This enables both human and automated agents to monitor and control remote machinery and their operators. Further, FIG. 47, 5530 depicts the current mesh topology in dark lines. The lighter lines are alternatives gleamed from mesh node heart beats, which in turn was gleamed from SCAN agents, FIG. 9. Also in FIG. 9, the Packet Classifier 010 and VOIP Concatenation Engine, 020 are particularly relevant for terse M2M messaging. Their status/health is also monitored, 5520. The client activity and alerts, 5540 are generated by M2M readers at the node interface, which in turn are received by subscriber agents. They generate the alert for the machine maintenance subscribers.

Since the health of a network is only as good as its participants, there exists a need for an extensible and open framework for rapidly developing means to view, within one dashboard, salient or related behaviors of complex man and machine networks—especially when they are intertwined. Ideally, a comprehensive open network management system manages the health of the network routers (and it components, FIG. 9) and also the health of its clients: humans and devices. This closer relationship ensures dynamic alignment in fast changing pace of global supply/demand chain of data flow.

Figure 44:
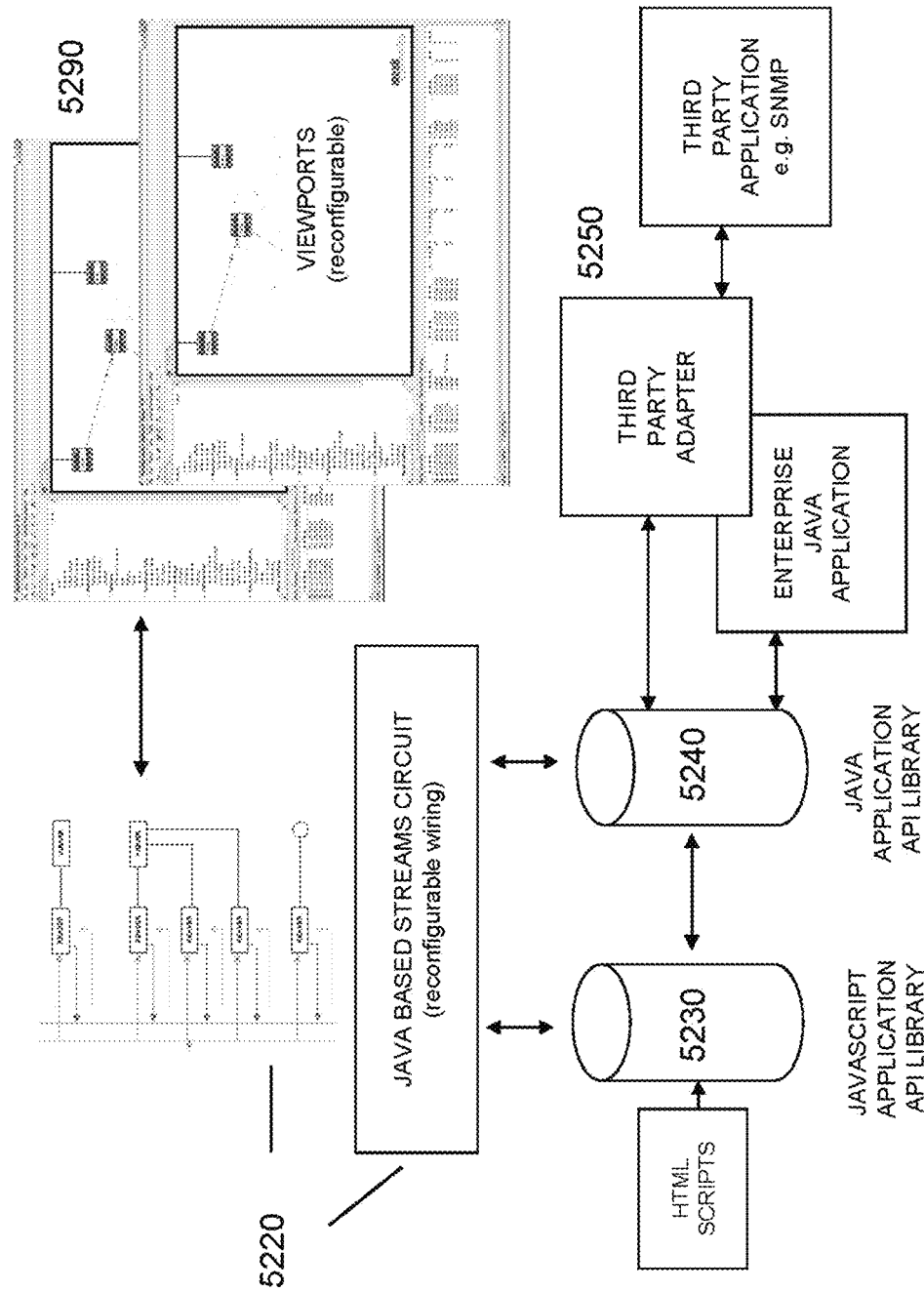
FIG. 44 depicts the adapters and API interface components that provide an extensible, open library of stream reader and viewers. This enables the rapid prototyping of custom circuits to provide specialized competencies. The view port additions enable human participation in managing the network health. This includes, through adaptor view ports, all assets of the network and their health.
Figure 46:
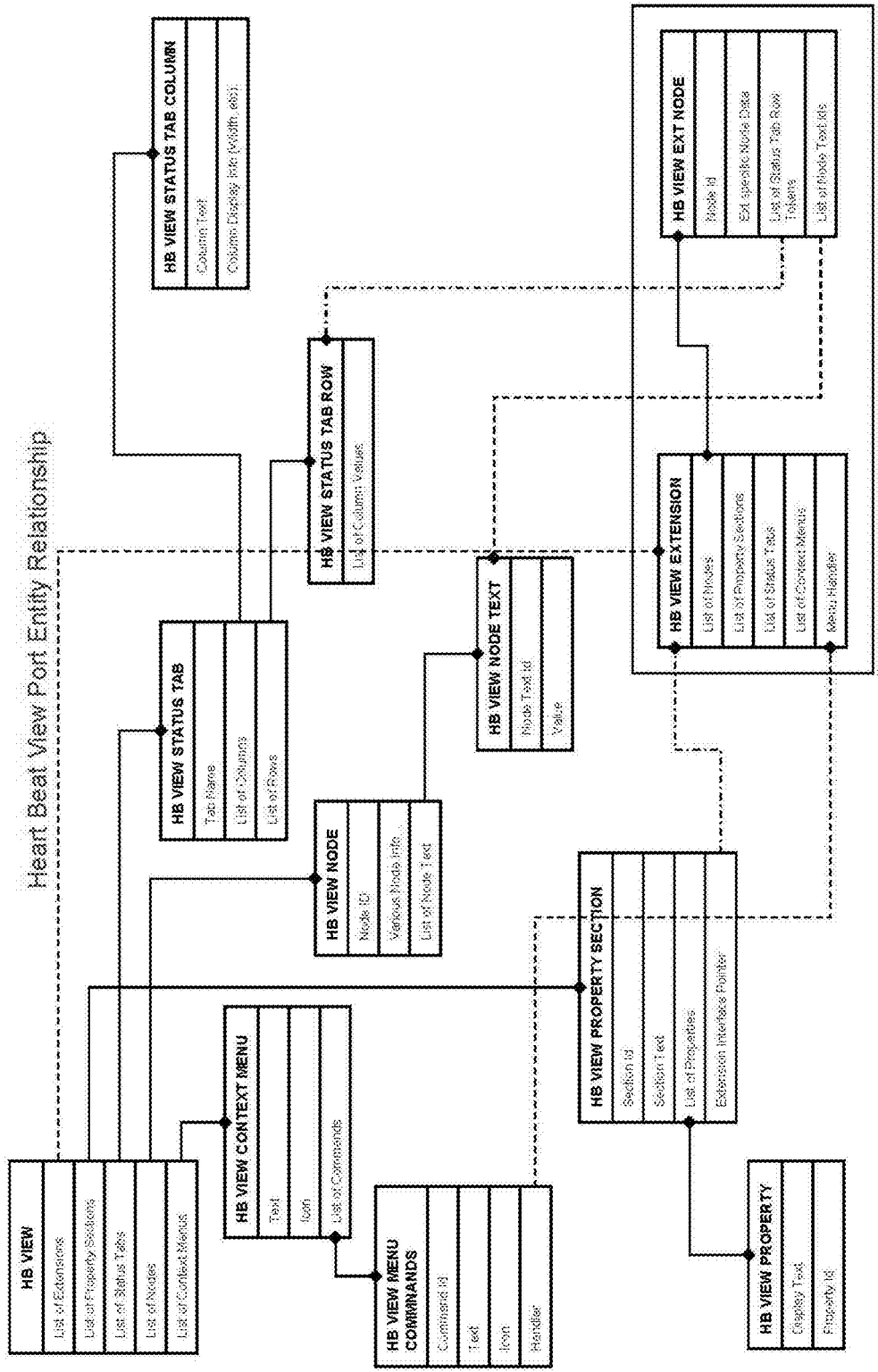

One embodiment of an open extensible Stream Reader Framework, FIG. 44, is implemented in Java. A subset, JavaScript API 5230, provides dynamic and customizable HTML based views. Custom Stream viewers define the GUI for different devices and form factors. More complex business logic applications use the Enterprise class Java API and Repository 5240. Third party adapters and applications, 5250, extend the network to consumers/providers of information and their viewers. FIGS. 45 and 46 depicts the published interfaces for the Network Manager Streams API and the Heart Beat Entity relationships, respectively. Together, they enable speedy viewport development, FIG. 57, for extensible human and agent collaborations e.g. FIGS. 1, 10, 11, 16, 20, 23, 24, 31, 34, 36, 37.

Additional Approaches to Managing Chirp Contention

The typical chirp data transport data packet must necessarily be small/light, to avoid contentions with IP based "heavy" traffic. In some embodiments, the RTS packet FIG. 26 and the Action Frame, 27 are short packet types used and attractive candidates for individual chirp packet transmissions to the Access Point (AP) that first receives them.

In some embodiments, even blind chirp devices can include the DURATION information 3422, so IP based devices and other Chirp devices with listening can avoid contention during the time that chirp packets are known to be active. Further, if the device follows a known transmission periodicity/pattern, then the AP can preemptively clear the communication medium, by sending out a Request to Send/Clear to Send frame (CTS) that effectively silences both chirp aware listen capable devices and 802.11 client stations.

If blind chirp devices use larger packets then blind chirp packets should register their chirp pattern with the night-light/router. Each chirp must then also contain the chirp pattern sequence number in each transmission. Then the router can generate a CTS in anticipation, since it knows both pattern and sequence number. The CTS will therefore preannounce the time reservation made for the blind chirp device. Thus provisions exist for larger blind chirp packets, contingent on coordination with the device's local router.

If listen-capable chirp devices use larger packets, then they also should register their transmission patterns when first pairing with the nightlight/router. The router can then generate the anticipatory CTS. Additionally, routers, based on the type of traffic pattern it is seeing, can direct these chirp devices to reposition their time of transmission to avail of a bulk CTS with a duration value set to cover multiple sequential device chirps.

This embodiment is, in effect, the reverse of FIG. 20. In FIG. 20, the bulk transmission from the AP to multiple listen capable devices is managed by sending out a bulk transmission to all and informing then of this common time. During this time the VOIP like chirp like devices are expected to silently listen. Conversely, the chirp router can also specify when the chirps from devices should occur so they are contiguous and thus covered in bulk periodically. Now, the devices are also being taught when to talk—sequentially. Thus the forward and reverse methods proactively deal with chirp contention using multiple means including those described in Ser. Nos. 11/266,884, 61/615,802, 61/555,400 et al. Chirp routers are acting as the collaborative scheduling agents and engendering collaboration between chirp and non-chirp clients in sharing the same media with minimum contention. Embodiments include chirp aware smart phones, Wi-Fi Access Points and other devices, where a logical radio "slot" provides the requisite software/firmware functionality.

Inherent Security in Chirp Data Transport

Chirp data transport involves traversing the IP network, in some embodiments, and are thus susceptible to snooping/hacking. But this is not your typical IP data packet since the data is based or Chirp/Pollen-ID and/or Flower/Agents-ID etc. These are not typical IP or MAC-ID type Sender/Receiver Address Frames, 26 through 28. However the same format is available for chirp devices use to specify, if desired:

a) The IP Destination Address (if applicable), and can include other addressing information depending on the type of transmission involved—e.g. unicast, multi-cast or broadcast, 3520,
  b) Chirp-ID (in the Sender Address frame, SA, 3522),
  c) Agent-ID being sought (in the BSSID Element, 3524)
  d) Any other use of the IP frame formats, recognizable by an agent.

All options (and their variants) exist within the exemplary Action Frame format, suitable for transmission over standard WIFI networks.

Figure 28:
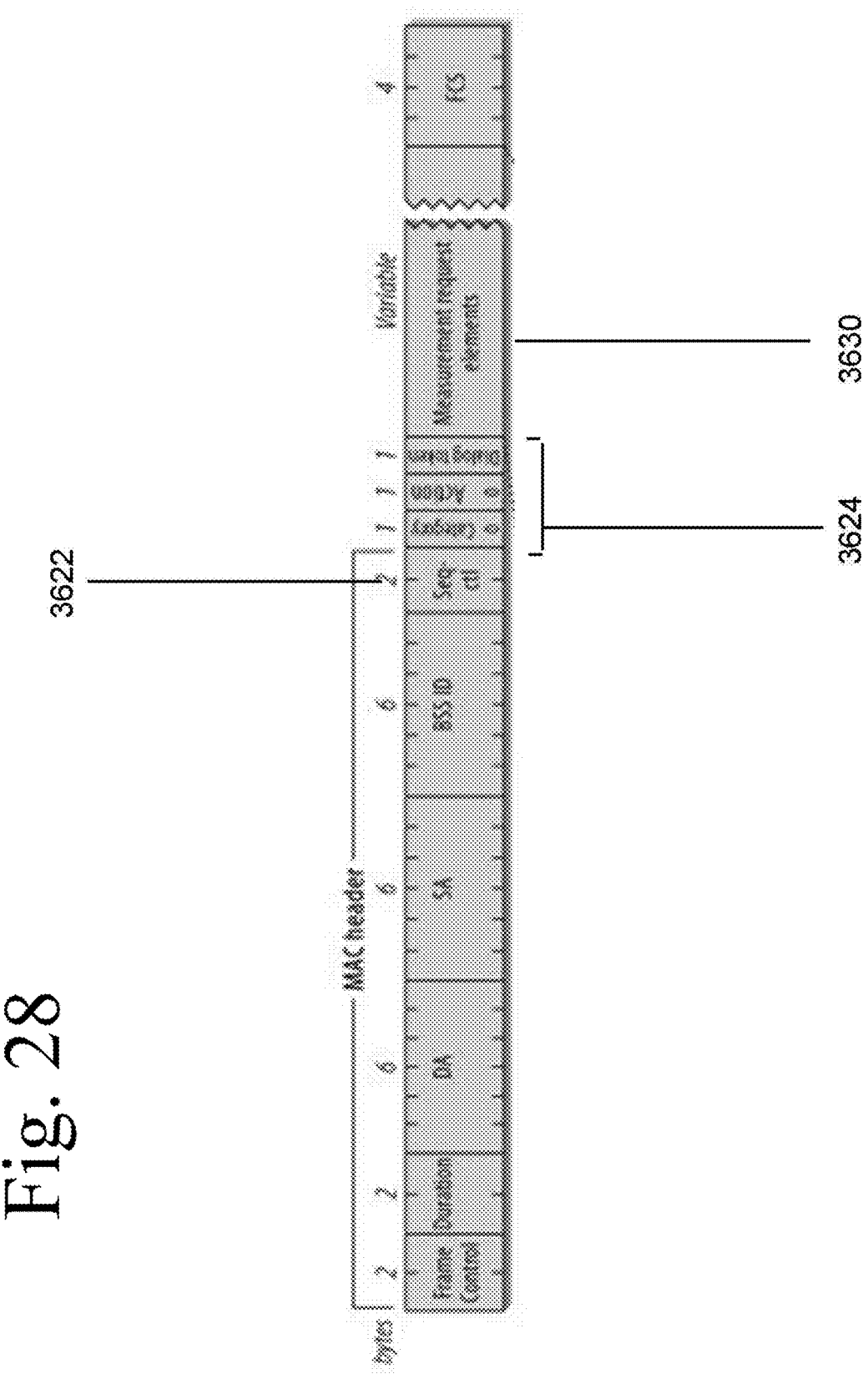

FIG. 28 shows a measurement request action frame, 3630. These management or action frames look like the innocuous request from stations requesting information from a specific AP (with BSSID). Only chirp aware routers are aware that these are actually chirp packets and that the data in the DA, SA and BSSID is to be interpreted differently.

Further, chirp routers know just enough to decode the DA, SA and BSSID data sections, FIGS. 27-28, to provide necessary routing. They cannot decipher the vendor specific information elements—only specific agents/tunes/flowers hold those keys. In other words, routers can engineer the "winds" and "buses" to move the pollen, define the schedules for the buses, based on QoS settings in IP-like packet, but do nothing else.

How does the Chirp aware router recognize a chirp packet? In one embodiment, the router knows which interface transports Chirp packets. It has a complete list of 802.11 stations associated with this AP. As part of the tree topology, it also has a list of all stations downstream—via the downlinks, FIGS. 3 through 7. It does not have access to the routing tables up stream, as part of the tree based routing scheme. However, it may use distributed SIP registries that contain both chirp device and agent ID locations. Ser. No. 12/352,457 describes using dynamic SIP registries to provide VOIP phone connectivity within dynamic isolated clusters. The same principles may be used to define where agents/flowers are, or the reverse look up—where chirp devices are, of interest to a particular agent.

Through either SIP like registries, or the routing table of its IP based stations, each chirp aware router is aware that these chirp packets are not emanating from one of their 802.11 clients/stations. No one else in the system—both outside the mesh network and within it has this insight—access to the distributed routing tables of 802.11 clients and/or distributed SIP like registries is needed.

Even without the aid of SIP-like registries, chirp routers are still cognizant of the special nature of the data packets being transmitted. Chirp routers are keeping track of which interface was used to inject the IP packet into the mesh network. In the mesh nodes shown in FIGS. 13, 19, there are multiple interfaces generally provided—the uplink and down links of Backhauls (BH and FD) and the client Access Points (AP). If the chirp packet came in through on of the APs, then it is marked as a chirp, since the Chirp ID provided does not match an associated IP based client's IP address or MAC-ID in its routing table. Note that the AP does not need to keep a list of chirp devices it services—it surmises its identity based on the exclusion principle, namely, this device ID, if an IP based device, is not in its routing tables. This implies, that chirp device locations and identity do not have to be stored, if anonymity is desired. The chirp will still be forwarded. up and/or down through the up links and down links the mesh tree, marked as a chirp in search of the agent/tune/subscriber. The identity of both chirp and its interested agent/tune/flower may be hidden and yet the pollen will reach the flower. This extends existing prior art IP based routing security.

Thus, in one embodiment, even with both Chirp-ID and Agent-ID hidden agents who receive broadcast chirp packets, are the only ones privy to what is being said, by whom, and intended for whom, using this specific data format etc. And only these agents can route such packets to other agents in its private SIP like registries, have them or other agents inform routers to stop broadcasts other otherwise affect the routing—at each step along the bus delivery route.

Further, an agent can convert the data flow to be IP based, with regular IP addresses. In one embodiment, private networks coexist and span both chirp and conventional transmissions using "pattern" hopping techniques known only to them. Part of the data could travel as IP Data frames while others via chirp protocols, analogous to musical chords or dual signatures needed on a check. Only agents know the (chorded) "tune" This further obfuscates the chirp data flow.

In embodiments, chirp data comprises IP based transport packets whose format is regular and legitimate IP-based packet. It supports all the Frame Control feature sets, FIG. 26, 3420, including multiple frames, power management and Distribution System (DS) flags. Thus, competent agents, running on chirp aware routers, may also convert IP data (including VOIP packets) into chirp packets, send them anonymously to another agent and then reconvert them back to IP traffic. This obfuscates IP based data flow. Thus both Chirp and IP payloads may be used interchangeably to obfuscate data flow within both chirp and legacy networks.

Approaches to Small Data Results in Big Data

FIG. 28 depicts the Measurement Request Action Frame, as a representative versatile Chirp packet. In one embodiment, the measurement data field 3630 is of variable length for flexibility. In some embodiments, three one byte sections are provided 3624, marked as Category, Action and Dialog Token respectively. Thus each section supports 255 non trivial variations: Each chirp packet has 255 ways of expressing:

1) Category: What type of chirp data is being transmitted
2) Action: Which State information is being sent.
3) Dialog Token: What type of data format, parameter list is being used.

Despite the terse length of chirp transmissions, there are sufficient variations to define precisely the type and nature of data being transmitted. Each of the 255 categories for each chirp device have 255*255 different ways to express machine state as classified under Action, and Dialog Token. Thus M2M communications may be terse but specific in terms of the data provided to "small" data integrators. Further, chirp devices may follow patterns in bulking transmissions. Thus 5 different measurements, for 5 distinct variables, may be transmitted in one payload or five smaller ones. Further, since the Dialog Token defines the "key" to parsing the data, it could also represent 255 unique parameter list orderings. Thus the chirp data can be jumbled between patterns making it difficult, like secret handshakes, for snoopers to decipher content, especially since the pattern used is also changing, like temporal keys, but with significantly lower overhead.

Agents can operate on other agents. Hence one agent can forward the chirp—after massaging the data, if needed—to another agent and so on. Agents can also spawn other agents, so distributed computing and routing is engendered. Thus one agent could clone itself to generate two containers so two buses concurrently carry containers to different destinations. Note that pruned broadcasting mechanisms, see Ser. No. 11/266,884, ensure that chirp like VOIP packets are transported selectively. Further SIP-like local registries, see Ser. No. 12/352,457, may also be used as subscribers/agents interested in specific chirps.

Complex business process logic flow is thus possible through a single agent spawning multiple collaborative agents, all of which emanated from receiving a chirp. By distributing the intelligence in an agent based network needed to service the chirp, chirp data, while terse, is still very powerful. Terse data need not be restricted to simple-minded functions. Note that in nature, simple ants create complex colonies. By the same token, chirps can be terse but not "simple" in the aggregate. Multiple chirp flows through a distributed mesh network, will interact with a hierarchy of agents. Some provide propagation. Others serve as Integrator agents operating on multiple chirps, to generate meaningful "small" data and situation awareness. An agent based network is a significantly more powerful means of providing dynamic routing/propagation agents and higher level functions, like integrator agents, all within the same distributed meshed network.

Propagation/Routing agents also signal to each other, in some embodiments,—so if one agent receives the packet first, it can tell the routing agents in the chirp aware routers to stop broadcasting, thus containing broadcast traffic proactively. Agents on mobile devices can move from one router to another, to further obfuscate their location/identity.

The routing agents MESH CONTROL and SCAN depicted in FIG. 9 may expose their API to selected agents who may then change the routing tables and redirect traffic at both local and remote mesh nodes. A dynamically reconfigurable routing architecture emerges where agents drive the routing/scheduling of delivery at each logistics hub, working in consonance with the Mesh Control Layer, FIG. 16 and its features, FIGS. 17 through 24. The Collaborative Scheduler 61/555,400 is another agent available in the support framework. Together, they ensure pollen reaches intended flowers as/when requested.

Figure 14:
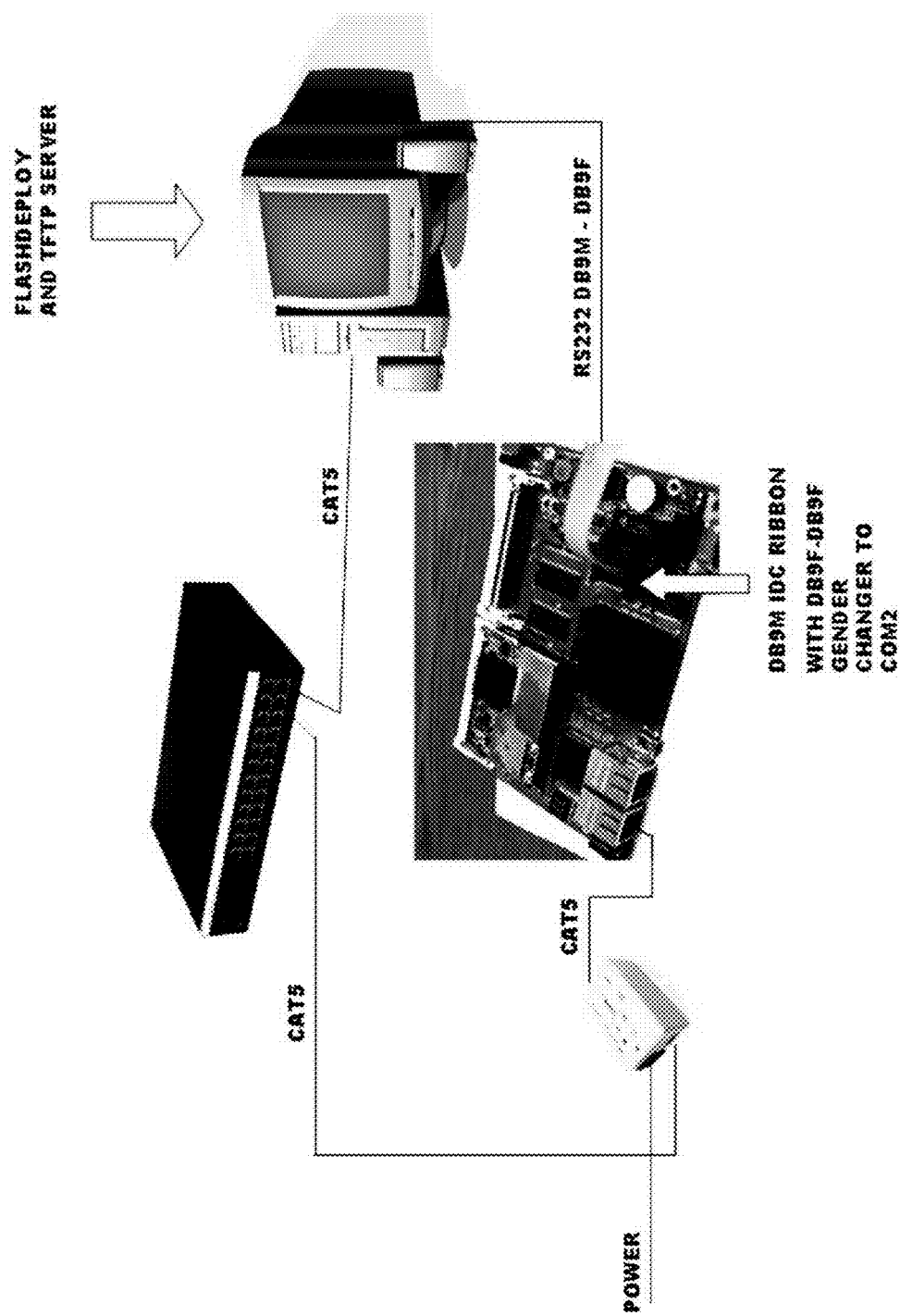
FIG. 14 depicts how the installation software is tagged to both the radios and board characteristics. It shows a serial line connected to load the boot loader program, after which the Ethernet port is used to complete the software installation and branding process. Compiling the install program on the board it is intended to run on performs this function, thus creating a unique software image.
Figure 15:
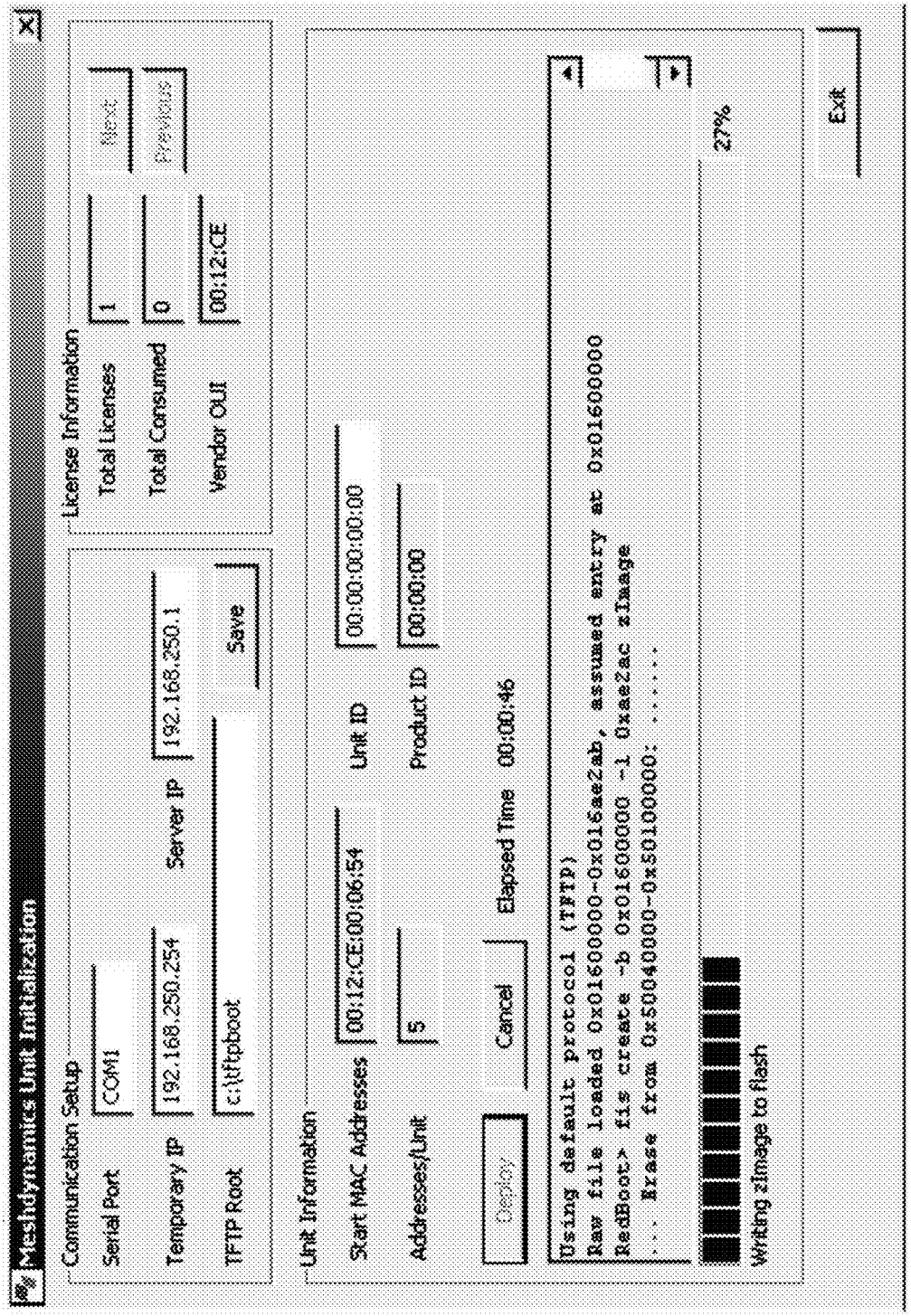
FIG. 15 is a screen dump of the Flash Deployment software developed and implemented to ensure that software generated for the install of this board cannot be used by another mesh node. When the software installation process begins, the software is compiled on the board it is intended for and the compilation process is unique since it is based on a number of unique factors. The software is generated on the board that it is intended to run on—to ensure that the software image cannot be used to run on another board, thus preventing both software privacy and dissuading theft of the mesh nodes.

In some embodiments, agents are physically located on a mesh node or node clients (e.g. removable USB security stick on a laptop client device). Agents may also physically reside on the mesh node, FIG. 12 on a card slot or Ethernet port in the node. They can also be baked into the firmware at flash time, see FIGS. 14, 15. And they can also be "registered guests", through software that manages the ACL and other lists that Access Points use, for example. Operating inside the mesh node, they can redirect massaged data to a secure server, through secure socket connections. Many agents may be mobile, with intermittent connectivity, see FIG. 23, 24. Since the connection is both intermittent and short, the data flow is not useful from a snooper's perspective. Further community mail boxes agents, resident or remote, may be used to buffer recent broadcasts for the agent and obfuscate flow. Applying an agent/tune/flower female receiver oriented approach provides a transport mechanism which is inherently more secure and more versatile, without requiring any changes to legacy systems.

In some embodiments, the base level chirp/agent discovery process is multicasting/broadcasting. The pollen/flower search is driven by chirp ID and/or Agent ID, through Chirp Aware Routers. Extensions include inter agent communications within the Agent "Social" Network/Collaborative Ecosystem. Thus, very private internal broadcasting clusters may form, within the outer layer of the base layers.

Two different network "trees" emerge. The physical network tree has chirp devices at the edge, edge router/relays to core router "roots". Similarly, the agent social network is, at their "root" level, big data agents. Below them is myriad agents massaging/filtering/integrating the small data chirps requested by them. Further, the big data "root" agents have access, at the root level, with other fellow roots. Each root agent has access to all of its agent in its sub trees. These include agents that change routing rules, and schedule the "buses," to remain in dynamic alignment with changing publisher and subscriber "blobs" of activity, see 61/555,400. Recall that chirp aware routers provide both chirp and IP based connectivity. Command and Control directives may thus be securely and speedily transported between agents. A hierarchical scheduling system emerges, where higher layers set the adaptive model parameters for lower layers.

Chirp capable nightlight embodiments exist in the form of smart phones, with Chirp Friendly sensors/transceivers e.g. IR, Ringtone, Light or Tactile Patterns/Tunes. Consider in one embodiment a secret rendezvous between "app" or agent "red" with agent "blue". In FIG. 31, 3940, the soldier has made contact and their smart phones exchange indecipherable chirps.

In this example, the soldier returns to his unit, 3940 and smart phones exchange information again, as part of buddy system-if the soldier did not return the data is not compromised. Distributed agents (local and remote) confer over the mesh network to decrypt the information and disseminate relevant snippets to individual smart phones. One information snippet may be the time and place for the next rendezvous. Only the "chosen" phone owner receives this message at a "schedule" defined by stacking agents, see 61/555,400 et al. Thus agent based "social" networks may form, merge, disperse with agents dynamically managing the "schedule" for dispersal of secret information.

In chirp agent worlds, pollen will find the right flowers, either through brute force (e.g. multicast, broadcast) or more subtle means, with chirp nods, winks and secret handshakes inside a distributed but secret agent referral and forwarding system. An agent meshed network forms on top of the mesh routing delivery platform of buses, winds, mail boxes and other features described herein. Hierarchies within these smaller close knit self-sufficient communities include, in some embodiments, integrator agents, who assimilate chirps, regurgitate to produce "small" feeds and ship those, also using the same delivery mechanisms to upstream big data agents. The integrator agents may search and find other "blue" agents, FIG. 31 and collaboratively put disparate and diverse snippets together to feed "big" data.

Chirp Datagram Handling

Some new IP based packet handlers will need to be invented to stem the deluge of largely repetitive and non critical data. Since sensors do not typically have large memory, sending it up will be the common option. Periodic IP connectivity will be mandated.

The IoT version of the publish/subscribe world of pollen and flowers is significantly different from our traditional IP based networking with its roots in point to point communications:

- Its usually unidirectional—many chirping devices, may not have listening capabilities, so the communication is one way only. Receiver address is then meaningless.
- The IP packet header overhead is unacceptable for small chirp packets and the IP protocol was designed to be general purpose and static—you cannot use the bit stream to define your own genetic strands and its vocabularies. This is too restrictive for a burgeoning class of devices that simply chirp a few bits a day but want to be sure their chirps get to the right flower.
- Since the same data source may be of interest to multiple subscribers, point to point communications make little sense—its simply kicking the can up to a central server that then still distributes data as part cloud services for subscribing Integrators. Contemporary thin client paradigms are based a more direct link between devices and integrators, via incumbent IP based traffic flow. Device (raw) data is forwarded up to big data cloud servers, where the economies of scale favor centralized processing. This is a top heavy architecture where point to point transport is convert into more usable publish-subscribe format only at the top.
- A more balanced architecture, especially if device (raw) data is repetitive, is to provide some pruning/aggregation and exception handling closer to the publisher sources, rather than pay for it to travel upstream and then be discarded. If the devices in the thin client model can support it, it will be tempting to move some of that processing downstream, resulting in fatter clients. Putting more processing into every device does not favor economies of scale.
- A more economic and efficient model would be to provide a central "hub" for device raw data to massaged into more useful forms for cloud servers. Big data subscribers are interested in massaged "small data" that fits into the format needed to feed the big data analytics. Intermediate agents fill this gap between raw data and big data. In short, some form of agent based local processing makes sense, regardless of whether devices are IP or chirp based. The control loop, is then split between the devices and agents and then the agents to their big data subscribers. In the thin client model, there was effectively one control loop between devices and servers. With the agent hub in place, devices may converse with the hub, in native dialects. The agents convert their bird speak in to a form more palatable to the vocabulary and formats of big data servers. The device publish stream is being converted into a small data stream, which big data servers are subscribing to, in addition to receiving raw data, if needed, on a case by case basis. The overall architecture is more scalable and more efficient.
- In this distributed and balanced setting, a local agent of the big data server can manage what exceptions interest them. The task of pruning and aggregating is delegated to a lower level of control. Round tripping is obviated. Using the Mars Rover as an analogy, Houston is kept abreast of "interesting" developments but local control of sensors/actuators in handled autonomously by resident software agents. This obviates needless round tripping between the rover and Houston, providing a more equitable distribution of task and resources. This is more efficient since it also reduces both traffic and server load. The output is from agents is more palatable "small data"

Regardless of whether device communication is IP or chirp based, a layered control loop, (with agents as intermediaries acting as the translation mechanisms between the upper and lower control loops) is inherent more efficient than round tripping. Some devices, like smart phones, are inherently chirp capable (e.g. IR and Wi-Fi) and can participate in both control loops, acting a bridge between the two banks of the river, each with their own control loops.

Beyond round trip latency considerations, there is a more fundamental reason for this tiered control and communications model. The language and vocabulary of sensors is fundamentally diverse from that at the big data server level. Sensors publish their limited view of the world, while "Big" data provides insights into a more comprehensive world view, incorporating multiple sensor streams, past history, future trends etc. Since function dictates language and vocabulary, some form of translation is required—one cannot expect purpose built machinery to communicate directly without translation.

Figure 48:
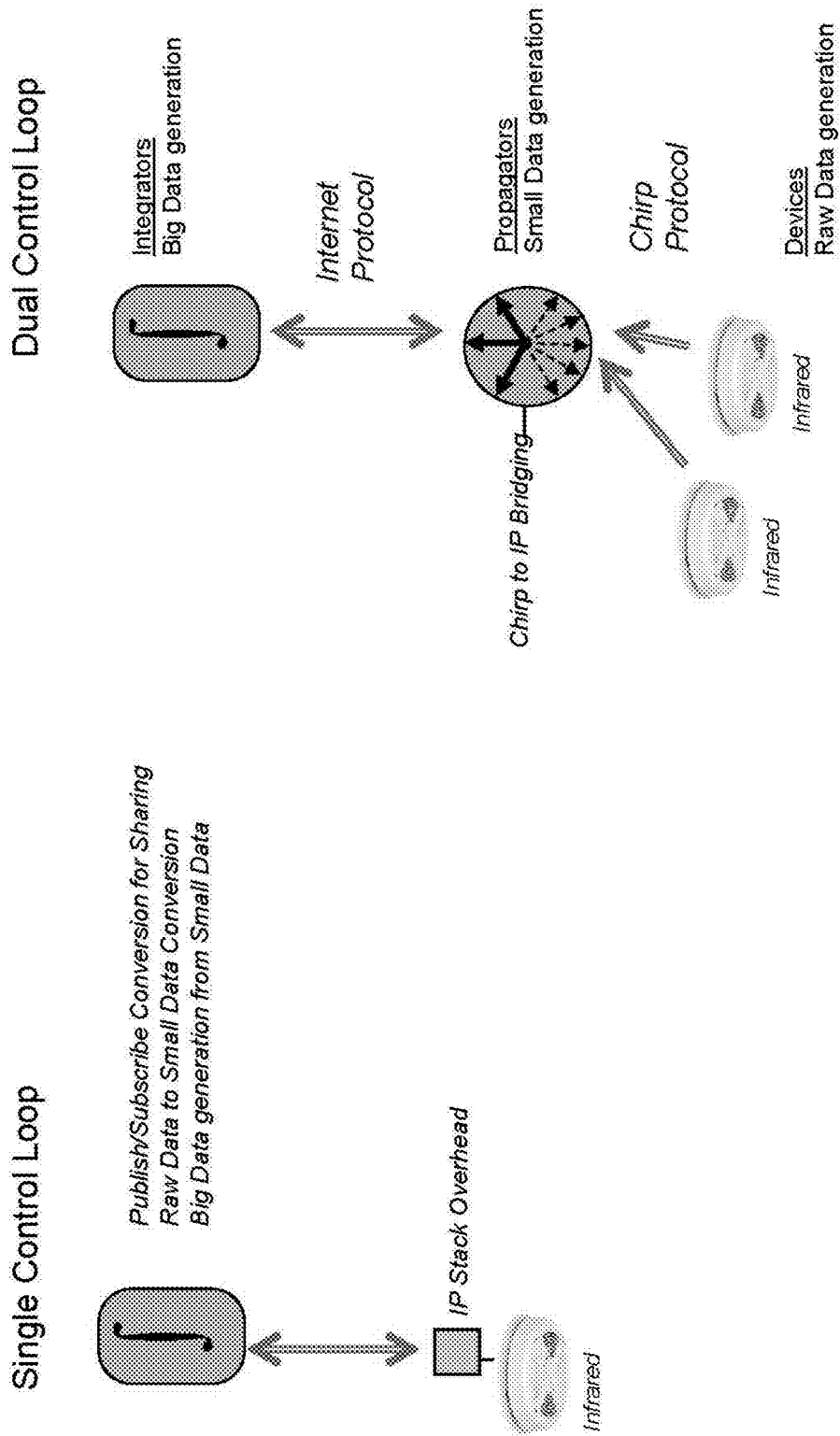
FIG. 48 compares contemporary thin client, single control loop architecture to a dual control loop, with a membrane separating the two control loops but, through the chirp to IP bridge/membrane, there is bidirectional, pruned and selective traffic, based on collaborative scheduling of bus schedules in both directions. Note that the two control loops are working on their own frequencies but neither is waiting on the other, see also FIG. 38. This predicates the need for a "hub", e.g. Propagator. They also serve as bridges between the upper control loop, IP based and lower, tighter (low latency/isochronous) control loops preferably in more efficient chirp protocols. Note that the overhead of converting raw, machine specific raw data to a more palatable device abstracted format (e.g. small data) is performed within the cloud in the single control loop model in one case, and delegated to propagators in the other. Further, the lower control loop, between propagators and devices can be low latency/isochronous while the upper control loop can focus on more infrequent high level tasks: performance tracking, exception handling system updates (event based, low latency), routine hourly reports (periodic) etc.

In the contemporary, thin client model, FIG. 48, Left, that translation takes place in the cloud, where data is sent in a format palatable to big data consumers. Needless to say, that puts the onus on the machines and their M2M communication protocols to be intelligible. What was a terse purpose built dialect now has to be interpreted in a device abstracted language. Agents and their location within the lower control loop reduce this burden, FIG. 48 Right.

An intermediate agent based architecture is also closer to publish-subscribe frameworks that big data systems are familiar with. Cloud servers, through web services, subscribe to multiple sources of data. Big data systems may be viewed as market places where publishers/subscribers or data providers and consumers meet and exchange. The "exchange" is one service that enterprise middleware software provide at Layers 7 and above on the network stack. For example, Tibco provides a platform where real time feeds are both published and consumed. Multiple and diverse applications employ generic and extensible real time publish/subscribe "exchange" infrastructure to conduct business.

Figure 49:
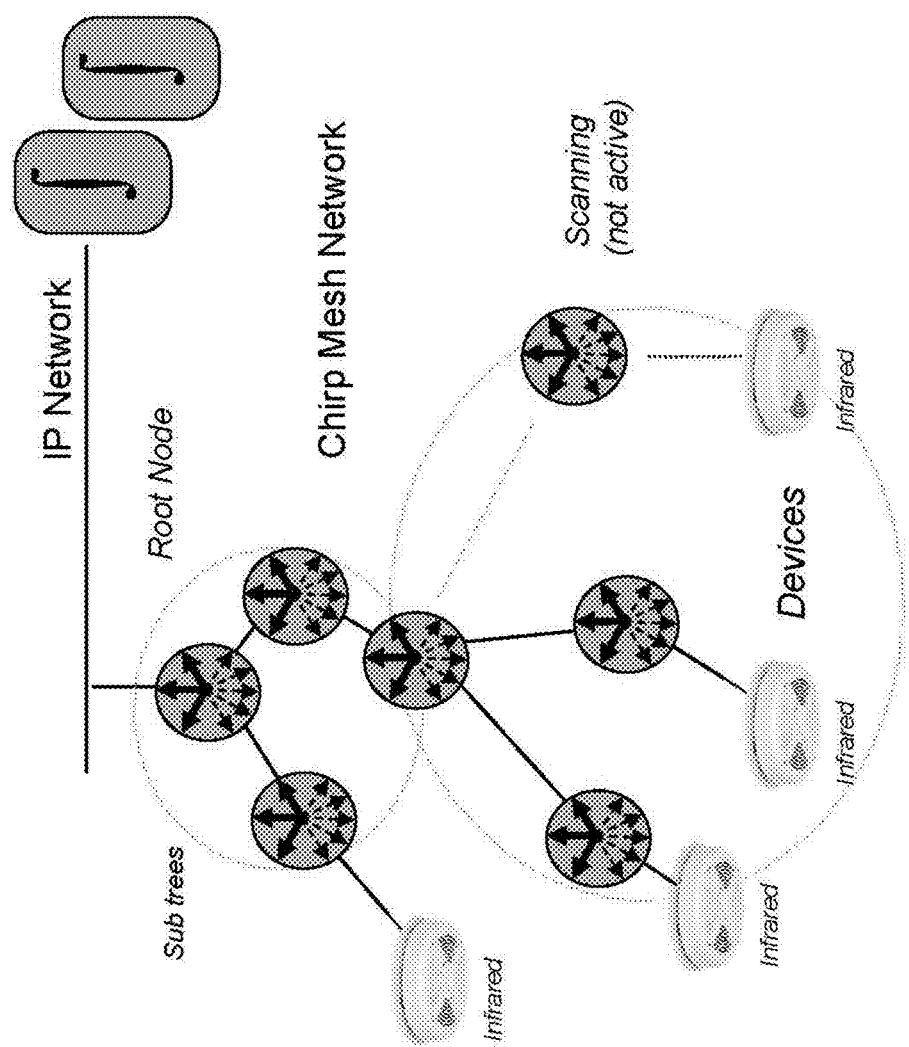
FIGS. 49 and 50 depicts a burgeoning market place "exchange", where the confluence of multiple sources of terse but potentially rich content streams, often in organic protocols occurs at propagator trees. The root node serves as the Chirp to IP bridge/membrane. Small data is progressively refined and pruned, in proactive manner, as data moves upstream, like salmon upstream. Chirp packets no longer needed are discarded along the way, thus managing content relevance. Since chirps are category based, the protocol handlers (on both sides of the membrane) are logically part of the same publish subscribe bus system, with buses operating at different schedules. The distributed system manages the bus schedules to ensure control loops at all levels are operating without disruption. An Analogy would be nationwide bus services involving both greyhound and county run bus services collaborating on bus schedules to minimize overall delay, based on current traffic supply/demand.
Figure 50:
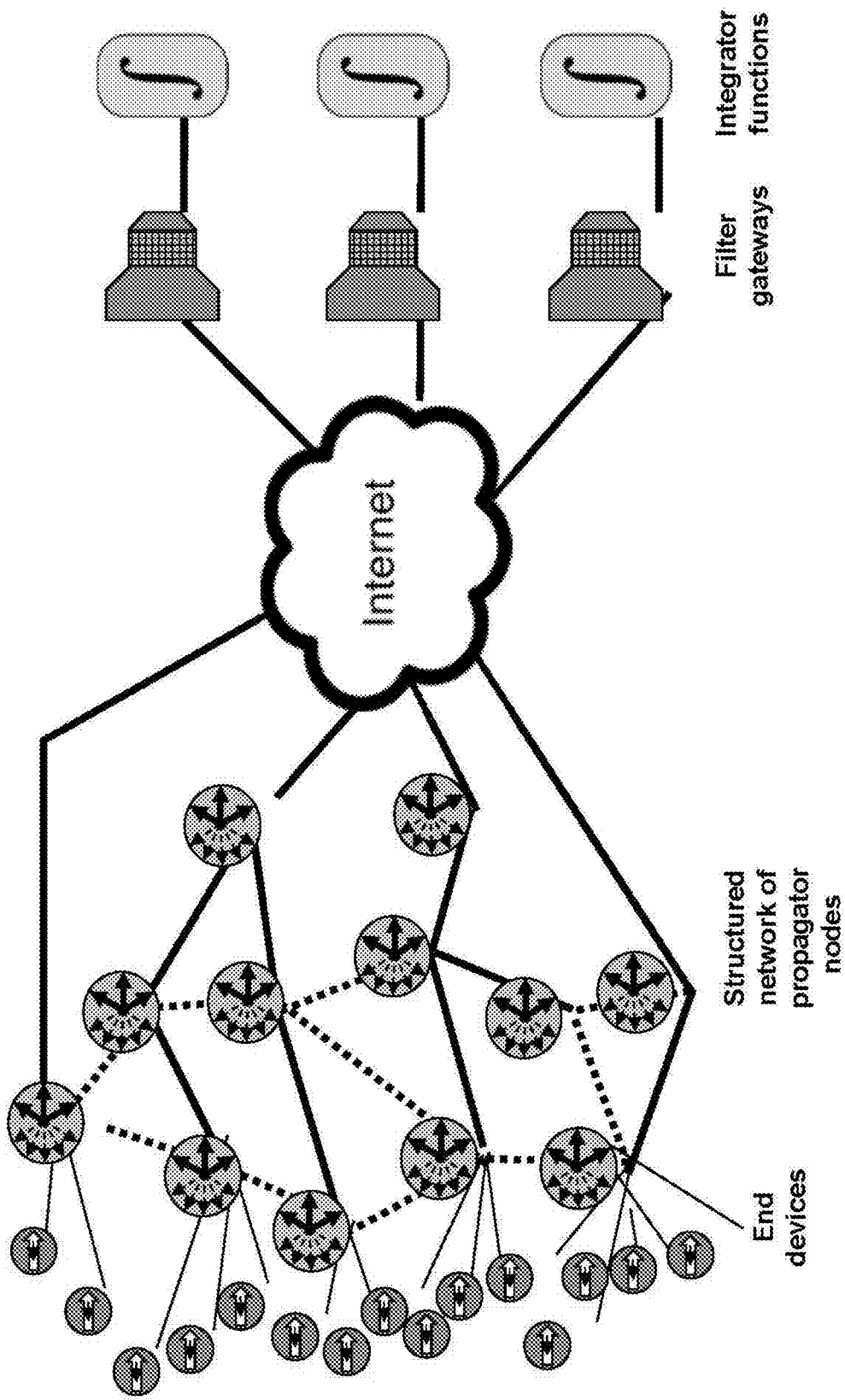

Another type of "exchange" is burgeoning at the lowest edge of the network, see FIGS. 49 through 50. M2M communications is rapidly evolving into its own form of localized publish/subscribe exchange, with its own function driven vocabulary. This community of sensors and actuators will need for their own, potentially private/isolated exchange. Many to one relationships, like any publish/ subscribe framework needs to be supported. The smaller communities coalesce into a community tree of communities, but with flattened information flow, akin to bus routes along the network of mesh nodes and their agents.

Figure 51:
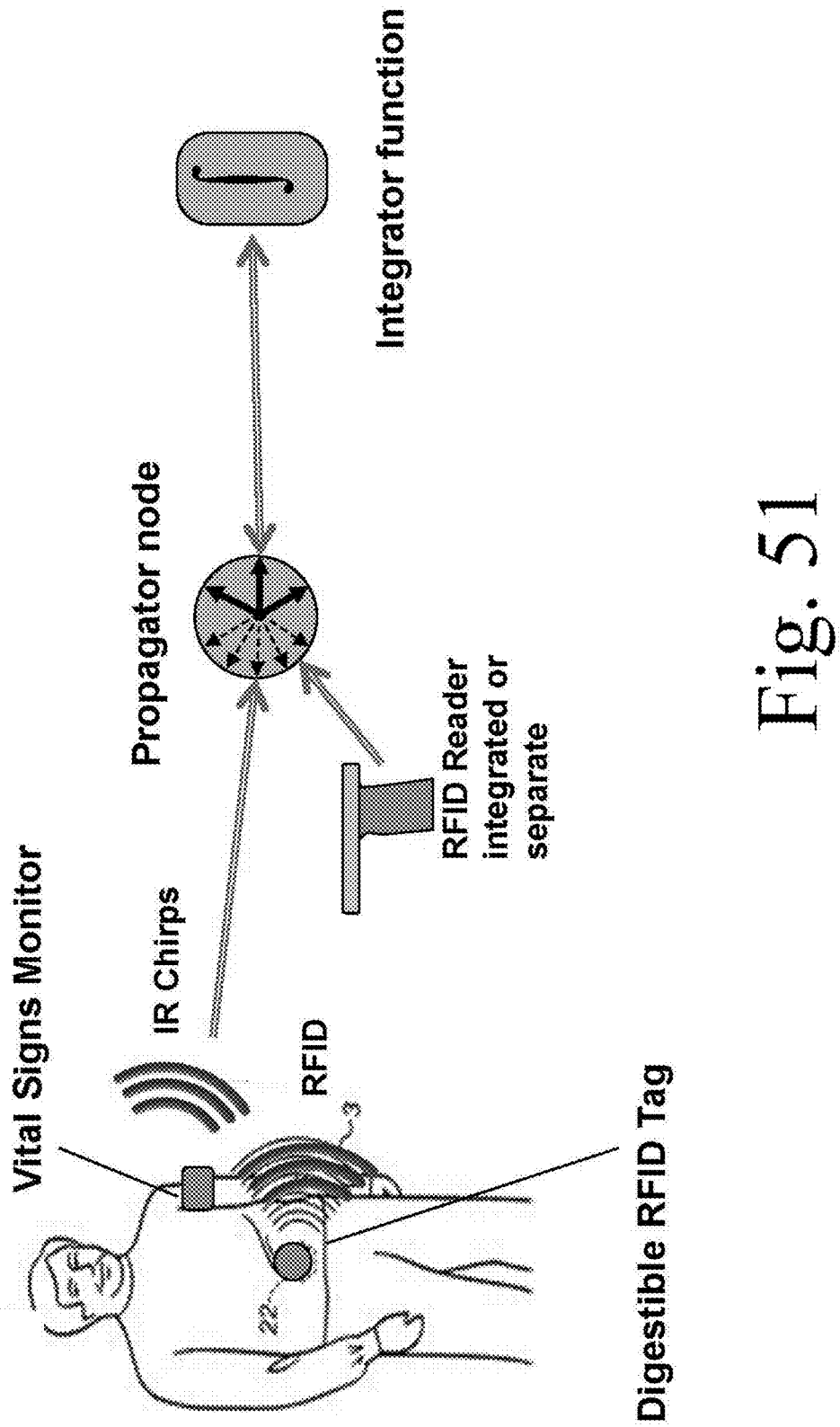
FIGS. 51 and 52 depict a publish/subscribe exchange/market supporting multiple devices and integrators each operating in their own private communities/but also part of the same logical exchange.
Figure 52:
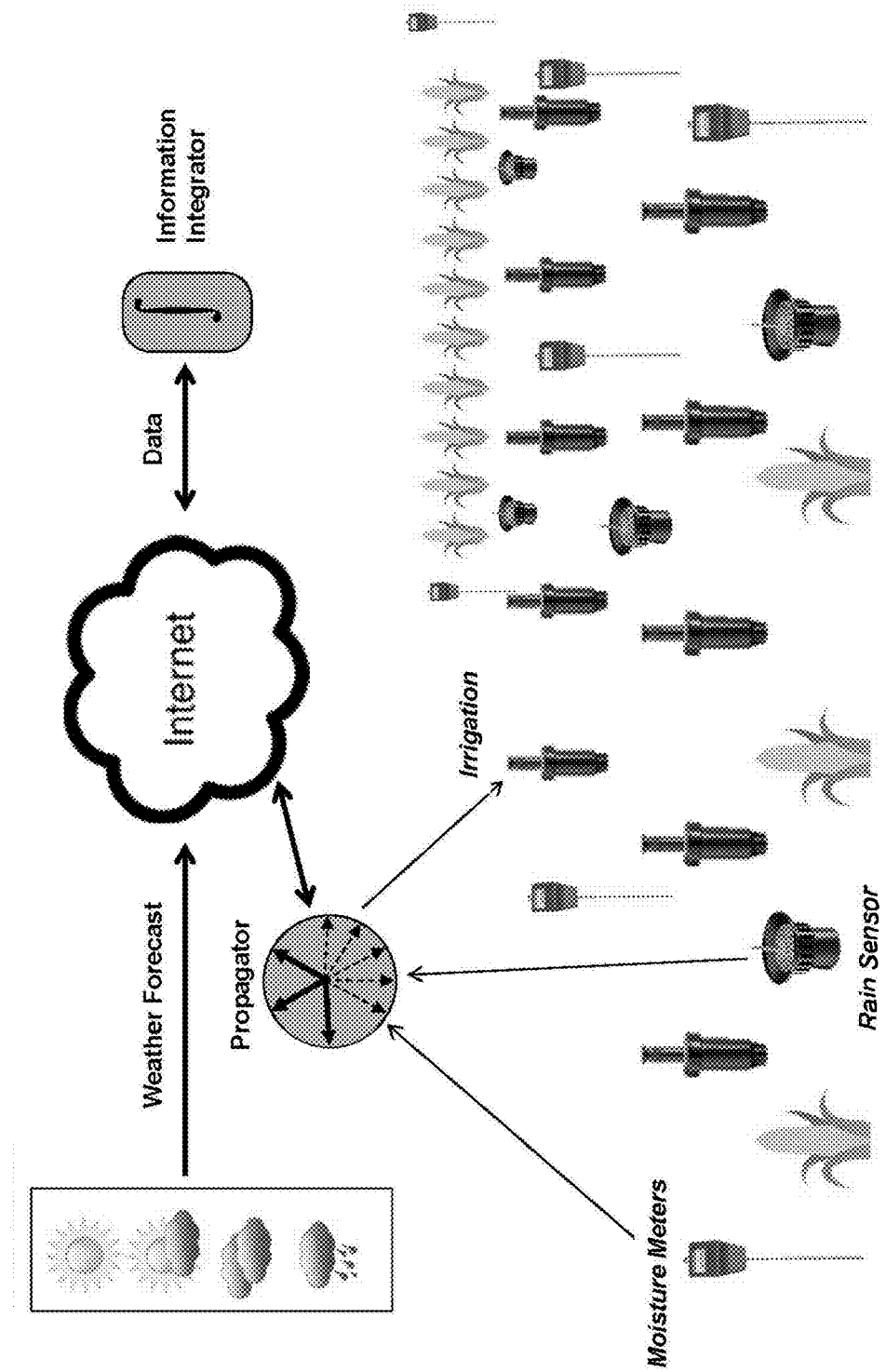

FIG. 51 is an example of a small community of sensors, providing, vital sign inferences and warnings gleaned from pattern/trends of multiple sensor streams. A field of such local integrators, generating small data, feed into progressively larger streams, see FIG. 52. Here, a composite view of the current ground moisture level is integrated with weather forecasts of likely rain to direct whether some areas of the field need additional water.

Figure 53:
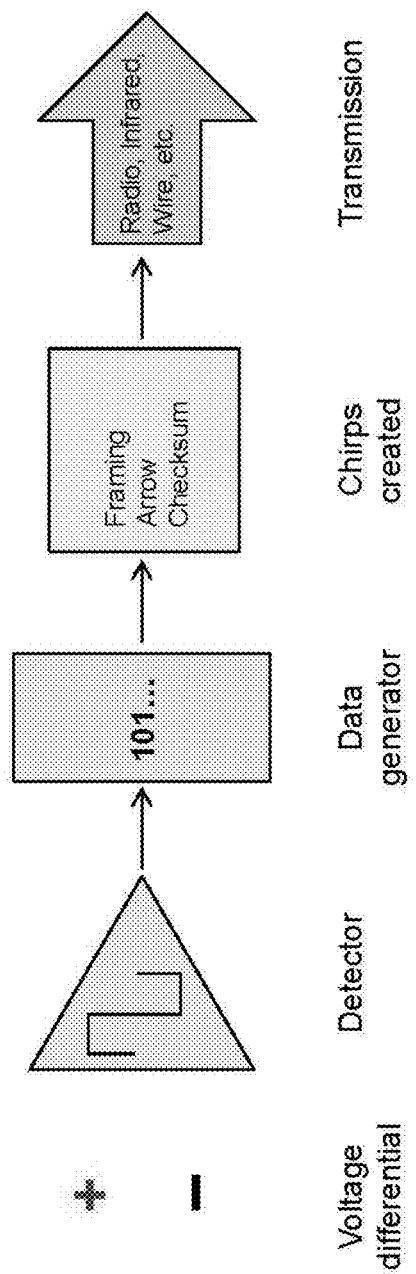
FIG. 53 depicts the simple circuitry needed to mass manufacture very low cost, low footprint, light "pollen" generators. In millions of simple End Devices, basic physical states will be converted to Chirp payloads. An address, "arrow" of transmission, and checksum are added to this payload to form the complete chirp packet.
Figure 54:
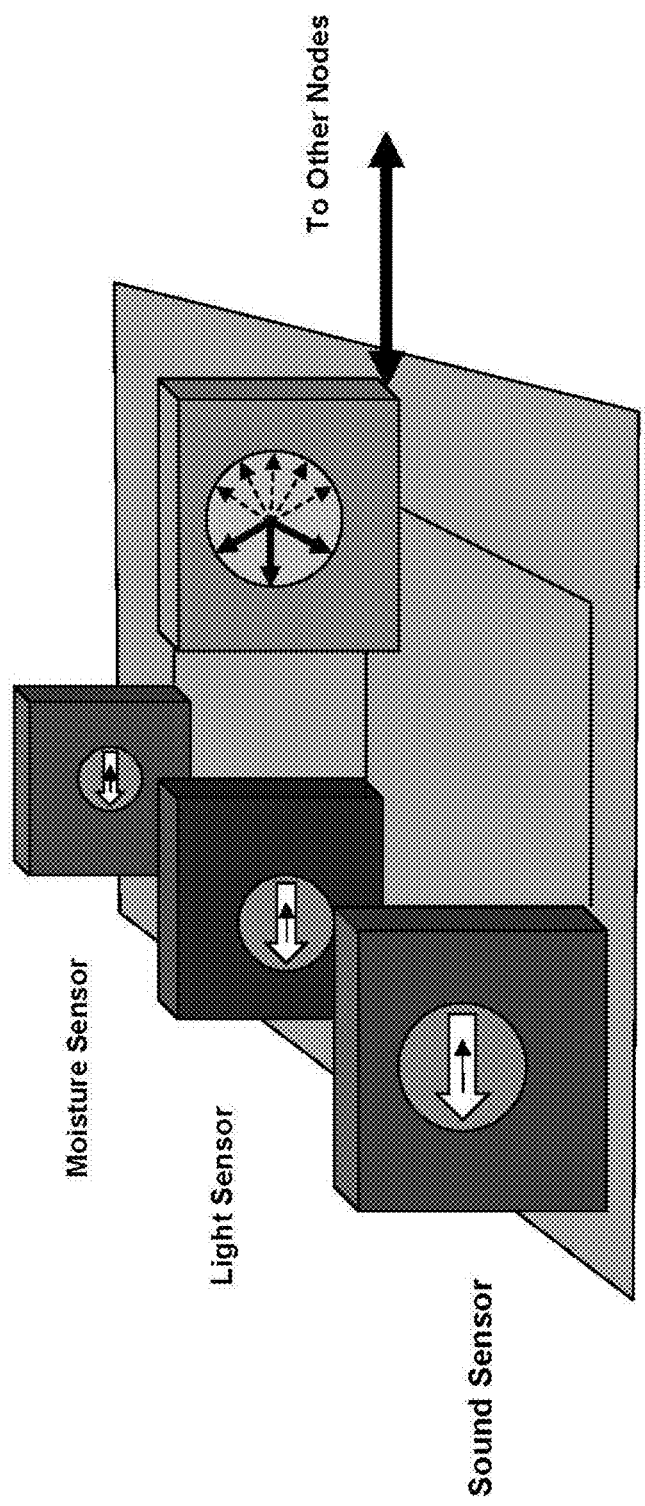
FIG. 54 depicts a first layer, rudimentary small data generator, where sensor fusion/consensus generates early warning signals with fewer false positives. The propagator and first layer integrator may be bundled as one device, servicing both single and multi-sensor subscribers in the local meshed network and beyond.

Simplifying the transport mechanisms of sensors and actuators has profound and compounded network effects. If sensors are no longer burdened by an incumbent IP protocol, not designed to be inherently publish-subscribe or exchange based, then they than free chirp is terse, purpose built organically grown, collaborative communities. The Dewey Decimal system, for example, enables terse content classification shared across all library "exchanges". Its analogous implementation could function as pollen category classifiers. Now, raw sensor data immediately becomes sort, search and publish worthy. Further, the decision to combine multiple sensors into a composite firmware package can be validate by subscriber trends indicating their interest in a local integrator/small data generator. The circuitry for the Chirp transmitter on the propagator/integrator is then shared, see FIG. 53 and the combined device provides additional functionality. FIG. 54 shows an integrated multi-sensor package.

Figure 55:
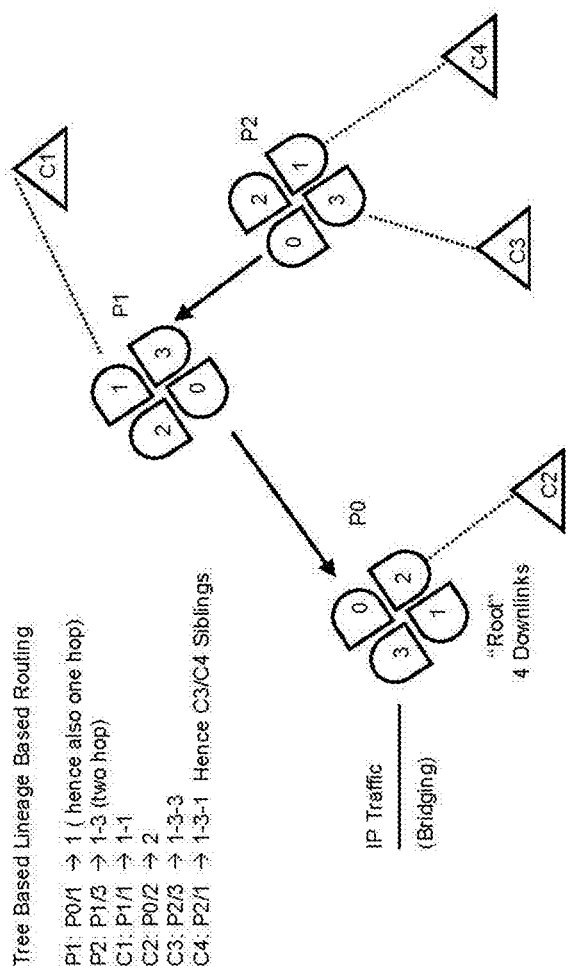
FIG. 55 depicts a four leaf clover like propagator, with 4 independent transceivers, 90 degrees rotated from each other. The 4 transceivers may be logically assigned uplink, downlink and scanner functionality, based on where the clients and relay node parents are located and the current network routing priorities. The transceivers may be dynamically and logically reassigned as the network topology changes or as clients migrate into and out of the network. Note that, as other 4 port devices depicted in this application, there is only one uplink per the 4 leaf clover design—it is scalable O(n) tree architecture. One layer is shown—overlays of such devices cover different wireless transmission media (e.g. Infrared LEDS for Chirp and Bluetooth for IP networking). A stack of such four leaf transceivers than thus service both Chirp and IP clients, including other propagators. Since routing is lineage based, siblings are easily recognized. Ability to see siblings provides fail over redundancy with minimal change to routing tables. This engenders stable, healthy networks.

FIG. 55 shows a network of chirp propagator nodes. Each of the elements in the four leaf clover configuration are transceivers. The transceivers, in one embodiment, are identical, so that uplink, downlink and scanning functionalities may be logically assigned. The network topology is flexible, when required, see FIG. 1. One layer of this 4 element propagator services chirp IR traffic. Layers are stackable, since they are operating on different, non interfering wireless medium (e.g. IR and Wi-Fi). When Chirp and IP traffic are operating in the same unlicensed band, then the propagator proactively reserves time slices for chirp devices, using well understood reservation techniques (e.g. RTS/CTS).

Control Loop Polling Intervals

The social network or community of M2M participants, will, over time form their own real time market place, with links to the enterprise level market places in the cloud. Some form of linking the two market places is needed, without forcing either to coalesce into a single control loop, thin client model. As an analogy, the Mars Rover is a single entity functioning semi-autonomously with at least two control loops. The lower control loop, operating every few milliseconds, closes a tight, purpose built, isochronous loop between sensors and motors, keeping the Rover on track with its planned destination. The higher control loop, operating in minutes (between Earth and Mars), cannot be used for tight motor control. It is, instead, used to provide planned destination coordinates, for example, which is then translated to lower level commands and activities by the intermediate translation layer between the two control loops.

Compare, in FIG. 50, the overhead of centralized process biased approach on control loops and associated latencies. In the thin client model, latencies are compounded by those the non deterministic latency of IP CSMA/CA and CSMA/CD protocols, over multiple hops from source to destination. In the dual control model, there is a membrane separating the upper and lower control loops of IP traffic and Chirp traffic (includes IP devices operating as chirp devices, when needed). Data flow between the membrane is publish/subscribe based. The Propagator hub manages bus schedules in both directions so both control loops are satisfied. Ideally, neither should be waiting on each other. For this to work, the two control loops can run on different frequencies but both need to be aware of the timing diagram needs of the other.

One implementation requires hubs to publish their incoming traffic schedules upstream. Upstream ascendants on the mesh network or routing path, can then back calculate when a chirp bus of aggregated packets needs to arrive so their "stock" feeding into their business processes, is maintain in a regular, non-disruptive rate. It can communicate that "demand" to the "supplier" node. The aggregated demand at the supplier drives it to be in dynamic alignment with its subscriber. This may involve more frequent smaller shuttles. Conversely, it may dictate convoys but will lower frequency. The two control loops are collaboratively changing their polling intervals if needed.

Layered control systems often have set polling intervals, generally a multiple of the lowest loop e.g. the sensor/actuator level. In thin client situations, with no pruning/aggregation and exception handling, the need to close loops quickly is understandable. Hence the historical need for tighter polling at upper control layers. With agent based delegation to the lower control layers, Mars Rover successfully converted Task level commands, sent asynchronously, with minute delays, to drive low level isochronous control sensor-actuator loops, operating in milliseconds. Upper control loops no longer have to be "tight."

When inevitable packet transport failures to accommodate do occur, the degradation in performance of the overall system is still graceful, because the small data generation uses pattern matching and inferences, sometimes operating in a composite device, FIG. 54. Hence early warning systems are activated sooner, at the local level. Local evasive action within local M2M sensor/actuator communities, obviates adverse network effects. Disruptions are both graceful and contained.

A Classification Based Protocol for the Edge Network

With intermediary agents and membrane in place, individual sensors and actuators may simply evolve their language and vocabulary for what they were designed for them to do. This intermediate agent service then bridges the gap between raw data and big data. Now, devices, using their own, proprietary pollen formats can chirp in their own dialects—no standard common language is needed. Devices can remain simple, agents can be arbitrarily complex.

Further, nothing stops devices operating in both networks and forming their own bridges. IP agents can decipher the IP encapsulation where the payload is a aggregation of chirps and perpetuate the publishing beyond chirp membranes.

Beyond efficiency (large packet formats etc) there is a more fundamental reason to support a different transport protocol, rather than couch a new description language inside the payload section of an IP packet. But it is still a destination based routing protocol. It is not inherently publish/subscribe.

Packet type ID in the packet header provide the information needed to drive the routing according to associated packet handlers. Adding new packet handlers vocabulary and protocols for IP based M2M communities poses a challenge. Routers have to know how to route these new types of packets. The new "agents" need to be accessible across the entire router network core and edge routers, including legacy routers.

Further, while there are known classifications for sensor types, but its an evolving field—providing specialized packet handlers within the routers, to handle their routing needs is not practical. Standards committee processes are long, tedious and largely controlled by the larger networking companies, with a vested interest in maintaining the status quo with IP for everything. New devices, such as composite sensor arrays FIG. 54 and private, semi autonomous communities, FIG. 55 are just beginning. They will require their own private, terse, tight control loop. Some organic evolution is called for.

The primary reason for chirp based devices is their inherent simplicity and that protocol may organically evolve to support device categories not yet dreamed of, let alone how they interact with us and the world. Burdening these publisher/subscribers with the detritus and restrictions of a solely IP based transport is simply too small a canvas for the developers of these brave new products to create in.

IP formats were designed for coarse classifications of packet type routing handlers: e.g. Voice, Video, Web browsing, File transfer. Application specific granularity (Devices→Sensors→Moisture→Device-Type-A) cannot be easily expressed in a format intended to address sender oriented communications based on IP addresses and MAC-IDS. The type of data may be expressed in the payload section, but peering in payloads, slows down traffic. There are inherent limitations to sender oriented traffic flow.

Nature uses a Receiver oriented network. Pollen publishers have no receiver address per se, nor do they know where their ultimate destination will be. A pollen category based identification scheme is receiver oriented—the pollen simply travels in all applicable directions, it is not destination based. It is the onus of the subscriber to accept (flower) or reject (sneezing) the pollen. Category Classification publishing connect pollen to flowers in an inherently more direct manner.

Routing Based on Category Classifications

What would such an extensible protocol look like? In Nature's DNA sequencing, there are strands of genetic code that are recognizable. Sometimes there is a marker that helps align samples so we can see the strands repeat across specimens. Genetic fingerprinting is extensible.

In Nature's world of publish/subscribe, pollen is being published for subscriber flowers. Pollination is essentially a selective pattern match. The same logic will now we applied to the IoT Publish/Subscribe world. Here chirp pollen, eventually arrive at a bus station. Chirp pollen have no idea where to go—this is a female/receiver oriented world. What does the chirp bus station hub need, in order to perform its function? It needs to know:

Where the flower in search of this pollen/passenger is and
When the flower requires the pollen/passenger to arrive there.

It can then drive the bus schedules to ensure an equitable compromise between bus size, its frequency and cost of IP during different times. Smaller bus loads will leave more frequently, for passengers in a rush, others will be compensated by a lower bus price for travelling on the larger but less frequent convoys.

Thus supply and demand of the chirp packets and its arrival is driven by dynamic subscriber demands. Scheduling of packets is covered under Collaborative Scheduling, in a referenced application. it relates the moving packets closer to delivery schedules ahead of others less in a rush. This is a dynamic form of prioritizing, based on pollen life and subscriber demand.

For now, we return to challenge of putting pollen/school children on the correct buses. At the bus station hub, pollen/passenger will collect and should be directed the bus best suited for them. This must be determined largely by public information, provided by the chirp/pollen, as its genus type, depicted by a DNA like strand of data in its public category bit stream.

Like DNA markers, only the flower knows where to look for the markers and what they are, to determine if there is match. Further, there can be small changes in the data—it does not have to be error free. As long as the markers are not corrupted, the faulty data will still find its way to bus station. There, it may be examined further, to determine if it should be put on the bus or discarded.

If Markers are corrupted, they may still be relevant, if a gradation scheme is used. Thus, consider a 4 bit marker 1.0.1.1. Assume that it is mistaken read as 1.1.1.1. (e.g. 15 instead of 11) Pattern 15 requires Byte 1 in the category field to be A,B,C or D. Thus matching sequences in the DNA strand will eventually result in this pollen pruned and sent to a dead letter section. Since chirps are repetitive, this loss is not critical. Note however that false positives are being progressively pruned—before chirps board IP buses.

Using markers in a relative manner, as opposed to fixed settings in an IP packet is a light form of security, like pollen—only the intended flower knows how to decipher the payload. Note that "markers" between "packet header" fields is fuzzy, unlike IP packet headers. This makes security "light".

Propagators simply need to know what direction to send the data—up or down the network tree. This is not complex in a tree structure with O(n) routing. Recall, this is not a peer to peer network, requiring O(n2) computation of routing paths, as suggested by traditional sensor networks, e.g. Zigbee. Thus, the direction (up/down) suffices in tree structures. And the direction should point to where subscribers are.

In addition to aggregation, propagators, in conjunction with their subscriber preferences may also be needed to perform pruning. Traffic flowing upwards from remote moisture sensors in the Wine country in France, to an Amazon hosted cloud service in the United States, could well be small, but, given the number of such sensors, the IP traffic is significant. IP traffic is not free: some means to control what is sent over IP is needed, specifically, prune repetitive data, close to its source (as opposed to the cloud server/Integrator).

Local pruning and aggregation favor placing agents closer to the sensor raw published stream. Here the subscribers/ their agents have more control over what they want sent to them. A subscription model would defray the cost of transport and pruning.

Skeletal Architecture of Chirp Packets

Locating the subscribers efficiently and developing the correct bus schedules and routes, is of common interest to both pollen and flowers. As in spring, there is a finite time of life for the pollen to have value to flowers.

Propagators, need some pollen genus category description to enable the match-making: what does this descriptor look like? As an analogy we return to bird chirps. We have categorized bird chirp sounds, based on studying individual bird categories. We can identify the bird type from its chirp/tune/melody. Hence those subscribers interested in melodies from doves, can now receive those recordings, based on bird category. The categories will have to support different levels of granularity—some bird enthusiasts are only interested in doves near their homes. Hence the category field, should be sufficiently flexible in design, to support further drill down.

In both melody/tunes and DNA structures, there exist "Marker" strands of information that provide a common pattern across members of the category. These markers occur at specific locations and are of specific patterns. Thus, some categories may be described as those that have an 8 bit marker, always in the 4th byte of the bit stream. Thus the classification could be 4.8.XX.XX, where XX are more levels of granularity that may be gleaned from knowing a specific pattern type and what it entails, in terms of how to further classify the public (no security but not necessarily universally decipherable) category field.

Consider the 8 bit pattern is 1.1.1.1.1.1.1.1 or 255. 255 may indicate a pattern where the 4 bytes are 4 one byte classification sub categories. Thus a 4 byte genetic strand may now be interpreted as A.B.C.D, where the letters occupy one byte each. The complete category is thus 4.8.255.A.B.C.D. In one embodiment 4.8.255 is publically accessible pattern information and at the start of the bit stream, the location and size of the marker (255) is specified, as opposed to at the end of the public category shown in FIG. 48. This enables a quick bit mask to look for all publishers in categories 4.8.255 etc. Those capable of providing further granularity in the chirp signature will need to access pattern that provides the map or implicit field markers for A.B.C.D within the category strand. Thus, in one embodiment, all of the following provide deeper classifications of the pollen/chirp/uniform:

4.
4.8.
4.8.255
4.8.255.A
4.8.255.A.B . . .

Thus Propagators, depending on their access to internal field data, can always provide at least 3 levels of addressing (e.g. 4.8.255) and potentially the complete DNA strand/signature. That may be sufficient for coarse aggregation: pollen of the same feather may be flocked together. At least three levels of granularity in bus schedules are supported. Larger, infrequent convoys cover 4.8.XX categories, while smaller shuttles for more frequently requested data can specify precisely what is of interest e.g. 4.8.255.A.B.C.XX Pollen categories thus drive the bus loads, their contents and their frequency, at differing levels of granularity.

Note that A.B.C.D is distinct from B.A.C.D. In general there are 4*3*2*1 or 24 non null combinations for a 4 letter vocabulary A,B,C,D.

In another embodiment the set of 255 8 bit pattern markers denote eight 4 bit markers. Now the pattern arrangements are 8*7*6 . . . =40,320 arrangements of 8 letter vocabulary: Since 4 bits support up to 15 non null numbers, 8 distinct letters are easily supported within 4 bits. Like DNA, the vocabulary may be terse and small, but the patterns depicting the category are not. Small data can be rich in content.

Incognito Pollen:

Some pollen may need to travel incognito. That is, hey expect propagators to rebroadcast them, potentially in all directions, till an agent discovers them.

A "4.0" category pollen implies a marker at byte 4 but its length is not specified. Agents with bit mask filtering can locate such semi-incognito pollen, they know what the marker is. Note the marker can be arbitrarily long or short. Short markers increase the occurrence of false positives with other marker types (e.g. 4 bit markers 1.0.1.1 sharing same 4 bits as 8 bit marker 1.0.1.1.0.0.1.1). agents that have this level of information can also glean other data from the packet melody/strands, to filter them out.

A "0.0" category pollen does not specify either the location or size of the marker. This is completely incognito and the propagator may continue to rebroadcast the pollen both up and down the tree till it reaches either roots or leaves of the tree. Chirp devices have no access to the IP network except through the bridging propagators. An agent at the chirp interfaces is either present or the pollen dies. It cannot cross the Chirp Membrane. Hence IP traffic congestion is obviated.

In some situations, a 0.0 pollen may wish to specify a direction and nothing else—e.g. up or down the tree. Thus, in one embodiment 0.0.1 pollen are upwards, while 0.0.2 pollen are downwards. Since each category has its own vocabulary and language, 0.0 chirp families may choose to use the next two bits to define direction (0.0.0.1, 0.0.1.0), as opposed to marker size. Languages defining how the strands of DNA comprised by bit streams are both versatile and secure—since it is generally receiver oriented.

IP based sensors and their traffic may also use category patterns as part of their data classification schemes. In that case IP based packet headers will specify the sensor MAC_ID or serial number within the payload, in addition to the category classification for IP based agents in the cloud servers or local to the IP interface of the propagator. By the same token chirp devices may, in their private payload or public category type, contain an IP address where they wish their pollen to be sent. The chirp interface of the propagator receives this chirp, local agents/apps decipher it, prune it, repackage as needed for IP highways.

Individual Information within Chirp Signature

Beyond category information, bird chirps carry individual/private information, see FIG. 48. Nature's random number generator changes the individual birds chirp tonal qualities, governing each bird. This serves as a form of identification. Thus, mother birds know each of their children's distinctive chirps, though all are using the same chirp family packet format and its associated shared vocabulary.

The IoT counterpart of this individual identification may include:

1. Chirps at distinctively different patterns (e.g. tunes)
2. Public category classification, include some ID e.g. last 4 digits of the manufacturer SKU number of the device.
3. Lineage based—e.g. child of kitchen router.
4. Location based: e.g. located in kitchen, close to toaster. (from signal strength analysis)

Note the combination of chirp tune, its last 4 SKU, location and lineage *collectively* define a distinct bird/sensor. While none are unique, their combination is sufficiently distinctive. Uniqueness is not required.

The combinations have inherent randomness since their constituent elements (e.g. transmission pattern of chirps) are random. They are not unique, like IP or MAC ID addresses, so there is no burden of maintaining a global database. Pretty good distinction in the bird chirp is sufficient for the mother. By the same token, pretty good distinction is sufficient for the bus drivers e.g. propagators.

Note that individual data, typically in the private section, may also be present in the public section. Thus, some common types of sensors, e.g. Moisture, may not need to a private section: the data may not need to be secured.

Transmission Agility Information

In the event chirps share the same Wi-Fi medium, one part of the public category section needs to contain chirp transmission characteristics. In other words the "uniform" should support network agility. Smarter, more agile devices can become aware that simpler chirp devices will be active at intervals specified. Thus, data related to when and how often the birds chirp and what pattern they use (as in melody/tunes or rhythm) is needed by both propagators and agile devices to ensure they the network can anticipate and hear chirps distinctly and without co-located interference on the same "channel" from other devices. Note that in nature, bird chirps are syncopated—birds are cognizant of each other. This data also gives propagators the option to shift smarter, more agile chirp devices to other times. Or the propagator, after review of local client device transmission patterns, can request a change to the dipswitch settings of a device. The devices that support such flexibility, is again, part of the Pattern Marker et al. Thus, after some tuning, there may be sufficient distinction in the melodies so mother propagators can easily recognize individual offspring.

Extensible, Non Unique, Pattern driven Chirp Signatures

A skeletal view of the Pollen "Uniform" emerges. It contains patterns, defining other patterns, each of which provide a more refined level of detail. Access of that detail can be controlled to answer:

1. What type of pollen is being transported (pollen category)
2. How often is this data published
3. What is its publishing frequency pattern (may be dynamic, may need observation over time, implying learning and discovery)
4. Distinguishing features of individual chirp devices e.g. serial number, location, lineage)
5. Information on transmission pattern so agile devices can share the same medium without interference.

Note that all of the above is easily discernable by rudimentary bit masks—that is, if you know what pattern you are looking for. Thus, in one embodiment a propagator agent is instructed to look at bit location 13 in all 4.8.11 packets. If it is set to 1, that is a universal flag for "unit malfunction, type 1". The agent is required to convert that information into an IP packet and forward to the manufacturer specified in a byte 1 (e.g. A in 4.8.11.A.B.C.D).

The public section defines the chirp/pollen category, needed for bus scheduling and packaging of packets. This is sort of like the bird category. Without this category information, the propagator does not know which direction to send the packets, as in which bus route to employ going up, down trees and where to clone more packets for multi-cast transmissions when multiple subscribers exist.

The second, typically private, section is the message—what a particular bird is saying and some (typically private) information about this particular bird. It uses the same concepts as the public section, but it has its own locations of where markers are, what those pattern signify and hence where the implicit field markers are. The 4.8.11.A.B.C.D family may use a completely different scheme for the private section than the 4.8.11.A.B.D.C strand/family.

The public and private parts of the chirp packet are separated by a publically known Public-Section-End-Marker. It is of variable length. In one embodiment, it may be 4 bits or 8, depending when whether 15 or 255 different types of (public) chirp patterns are needed. Note that if only 7 different markers are needed, then a 3 bit marker suffices (2**3=8).

Some default public markers will be provided, through consensus or standards bodies. These will be reserved for common use by sensor manufacturers of a specific category e.g. all moisture sensors manufacturers will use a category A.B.C.D.E.F, a 6 byte category address).

In that exemplary 6 byte genus family a end-of-public-section-marker will always appear at the end of the 6th byte. It will be one of the defined types. New types may be added as within the size of the marker in bits. Thus, if manufacturers feel that 255 distinct markers are needed to define a second level of granularity in the category classification, then they would jointly agree to support a 1 byte (8 bit) marker and its associated overhead.

Note that with 6 bytes there are a total of (2 exponent 8) exponent 6 or (248-1)non null unique category assignments. Further, with an eight bit marker type, the sub type classification now supports (256-2) category classes.

All chirp packets may not need 6 bytes of classifications. If it 4 bytes, then the marker appears at the 4 byte partition. How does one know where to look for the marker quickly and efficiently? In one embodiment, the first part of the public classification category contains both marker location and its size. For example, the classification category pattern with 6 bytes would have the 8 bit marker position 6.8 stated so before the public section begins. Without knowledge of the location and size of the marker, the entire packet is gibberish, recall classifications are based on public marker location.

One embodiment reserves the first three bits of public category field to define the end marker location only and the fourth bit is the size of the marker. If both are specified then both marker location and contents are extractable. The category field can then be deciphered based on the marker pattern description. The Marker pointer is shown in the start of the packet but is also a variable. If some propagators do not know of this new type of bird chirp, they will simply send it upwards. This is one way pollen can direct the winds that carry it.

In one embodiment, the first three 3 bits for the Marker position support 7 marker locations. These may adequately express the location of the marker, e.g. 0, 1, 2, 3, 4, 5, 6 and 7 bytes long.

Note that the same Marker Number (e.g. #200) provides diverse interpretations simply by its location. This is similar to DNA sequencing, where the location of the distinctive sequence helps recognize and align patterns.

Category Byte Size

Many simple devices may require only one byte for category (255 variants) and another 4 bit marker for the pattern type, see FIG. 48. Thus each of the 255 category numbers may be interpreted up to 15 distinct ways. This allows for close to 212 interpretations of a 1 byte category field. Similarly, a 6 byte category/genus would allow for (248-1) variants, each supporting 255 patterns (8 bit Marker). The "genetic code" describing a sensor category, may be expressed in multiple ways using this extensible pattern based format.

For non zero byte public sections, the marker type provides all the information needed to interpret it. The pattern defines where the content subsections/fields reside within the public section. Hence simple devices, may use a larger public section to include data, also public. Here no private section is needed/used.

A zero byte location is defined, in one embodiment, to mean that there is no public section. The Marker type points to a data pattern which provides the information needed to interpret the private section, following the (empty) public section. The Marker pattern is then being used to interpret what follows generally as payload. Thus flexible use of the Marker Pattern is supported, beyond its intended use. Thus a marker pattern and associated classification of the data packet may together constitute an IP packet payload. This is relevant to IP based sensor streams that prefer IP connectivity over Chirp to IP bridges.

Marker Pattern Templates

Sharing the same marker type, at the specific locations (e.g. 1 byte) engenders collaboration between manufacturers of the same sensor type. They may agree to jointly use a range of Marker types (e.g. 200-220), which share common fields, but use other fields, both in the public and private sections to provide more detailed and/or secure information. An shared used marker pattern template emerges through this collaboration.

Creating a new marker type (#221), may not require the traditional central standards body review process because the repercussions are local. For example, introducing a new marker type in location 1, affects only the 1 byte public category users. Within that, it affects those who wish to use the same marker pattern number. Contrast this with defining an new IP header format. IP headers must comply with IP requirements in order to be readable. This is potentially affecting all users.

The Marker Template is therefore a organically evolving pattern masking scheme that helps consumers delve deeper into the public section/category classification ID. As such, it loosely resembles IPV4 or IPV6, subsections of the entire IP address. Note however that IP addressing is destination based. After the packet reaches its destination, the payload is deciphered, in the cloud. Then the information, perhaps still device specific, is device abstracted. Then comes pruning and aggregation in the generation of small data. The small data is now publishable, within the distributed processing of big data servers (e.g Hadoop based). It must now be inserted into the publish/subscribe framework of web based services.

With Chirp Category templates, small data is generation closer to the source, where it can have more impact in tighter sensing-control-actuation loops. And since it is category based, finer granularity is simply a matter of loading the appropriate agents, at any level within the chirp network or chirp-aware IP agents—that know how to look into IP encapsulations of aggregated small data.

In one embodiment, the category section this a bit stream with contiguous fields, like strands in a DNA sequence. Knowing how to look into it, helps decipher the bird chirp category better. But this requires more processing and is therefore intended for subscribers interested in finer granularity. As the pollen progresses up stream, it continues to be disseminated with finer targeting to the interested subscribers, who can also drill down themselves, if they prefer, by requesting broader category searches.

The lowest level of granularity needed for the bus drivers is simply the marker location and its number. Hence Byte 6, 4 bit Marker, value 1.0.1.1 is sufficient to get the pollen to Bus type 06.4.11. This is sufficient to get the pollen/chirp to a 6.X bus station.

At the bus station for 6.4 buses, specialized 6.4.11 travel agents may peruse the category pattern to uncover two more sub categories each of which, are specified by the pattern description to be 1 byte each. Now it is known that category is 6.4.11.250.250. Subscribers willing to pay for this level of detail are alerted. Thus chirp/pollen can be very specific in terms of where they want to go, using a variable pattern template structure.

Again, pollen is implicitly managing the winds that carry it, since manufacturers can decide where those agents are placed along the route starting with 6.4.11 and getting progressively finer.

Bus schedules are now driven by the bus load and when the packets need to delivered. This is related to the collaborative scheduling engine, where the coffee order and its delivery are aligned to provide lower stacking and better quality of service/Customer satisfaction. The size and content of the packets is being managed to ensure timely delivery in dynamically changing scenarios. This becomes a more tractable problem as more refinement into the pollen category is possible closer to the pollen publishers. However having pattern matching agents 6.8.001 through 6.8.255 (8 bit marker) resident at the bus station requires CPU processing—this may be an enterprise chirp router but overkill for the home.

Hence multiple types of propagators emerge, each with their own category types. Or SIM cards slots are provided, so categories of chirp packet handlers may be supported. Some packet handlers will be secured to specific hardware; others may be software agents/apps.

Thus, yet another means available to pollen, to direct their wind, is to specify the propagator category or agent type it is in search of. Agents reside on propagators or in the cloud. Their existence is known internally within the propagators tree like mesh network. Hence going up or down the tree will eventually move the pollen towards its handler within the chirp network. The agent handler can then provide the small data that needs transport over the IP highway, via the chirp buses.

If the propagator has no category pattern agent then it will kick the can upstream. Alternately, in one embodiment, a public pattern template (e.g 255, 15) specifies how detailed navigation details are in the category section, e.g UP 3, DN 1, Left 2). Here the network topology is being used to find the flower this is relevant to static, secure networks, where the topology is managed. Note that the directions can encompass both the chirp network topology and it parent IP based network tree, in an hybrid mesh network comprising of both.

Routing Agents/Apps and Network Loading

The marker number is essentially a pointer to a look up table of patterns, see FIG. 48. Device manufacturers have multiple options regarding how to use the marker patterns. In one embodiment, by mutual agreement, 15 and 255 denote navigation based information for 4 and 8 bit markers respectively, e.g. (North 4, East 1) Further in another embodiment, 14 and 254 denote IP addresses in 6.X classification schemes for 4 and 8 bit markers. Thus two public means are made available for pollen to specify their intended flowers. IoT pollen can drive the winds that transport them, all the way into IP land, without agents.

Pollen intentions can thus be explicitly encoded. Or it may be fuzzy, as in: "look for an agent that knows about 6.8.11.A.B". Here, the propagator network and its routing tables are needed. The routing table keeps track of where the clients are, includes chirp devices and chirp routing agents. Some chirp routing agents/apps may be on the Chirp to IP bridge, and capable of securely accessing the entire category fingerprint, peruse the contents and decide what to do with it.

The efficient path of the pollen is thus gated, filtered and then redirected at progressively finer sieves, akin to Zip Code classifications for mail. Letters that fit "standard" patterns (size and weight) are processed efficiently. Others will be dealt with after the simple stuff is completed—this is how greedy algorithms work. The price paid for the flexible chirp format is that non standard package types will emerge and must be handled albeit less efficiently.

As an example, in one network, there are a handful of byte 4.8.XX categories, others are all 2.4.XX or 6.8.XX. It would make sense to move the 4.8.XX agents to a propagator that handles more 4.8.XX buses. A 4.8.XX bus central hub emerges, at least temporarily, based on the center of gravity where 4.8.XX pollen and their subscribers are. Some chirps may have more hops to travel but by economies of scale, 4.8.XX bus deliveries and scheduling become easier and less costly. The system can support declining margins.

Dynamic loading on the network is examined by nodes of the hybrid mesh tree (of both IP and chirp devices), from the root of the IP tree, downwards. System administrator are notified, who can move the agents residing on the network nodes. This will alter the pollen path and streamline flow. Further, if the agent is mobile (as in not locked to a particular physical device) then the network can automatically move the agents to where overall traffic flows best. This is akin to changing mesh network topology to meet changing latency and throughput requirements.

Both the physical network topology and the logical network (based on where agents reside), eventually stabilize and learn to adapt the topology to provide stable, tunable bus schedules and routes. At each hop along the network tree, pollen in being pruned and aggregated. It is being pruned along the path, at each bus station, since pollen has a relevant life and may have outlived it. Or the subscribers have lost interest. It is being aggregated at each bus station hub along the route to meet bus schedules and economic passenger quota. Publish and Subscribe sides of the demand/supply chain are thus in dynamic alignment.

Propagator Node Networks and Operation

Trees come to mind when we think of Nature's scalable creations. Trees are older than Man and have a highly evolved networking structure that is both efficient and adaptive. The structure is recursive: Any part of the tree replicates the same structure. The underground roots are an inverted tree, branches are horizontal tree, all connected through the trunk. A network of trees, some "rooted" to the tree trunk, others through relay nodes. The logical and physical network of branches all follow one simple rule: the "uplink"—the head of the branch is always one. An pitch fork branch (one with three roots to the tree trunk) would be considered a freak of nature. It is this simple rule—one uplink only—that ensures O(n) routing. Scalable Networks are possible.

Figure 56:
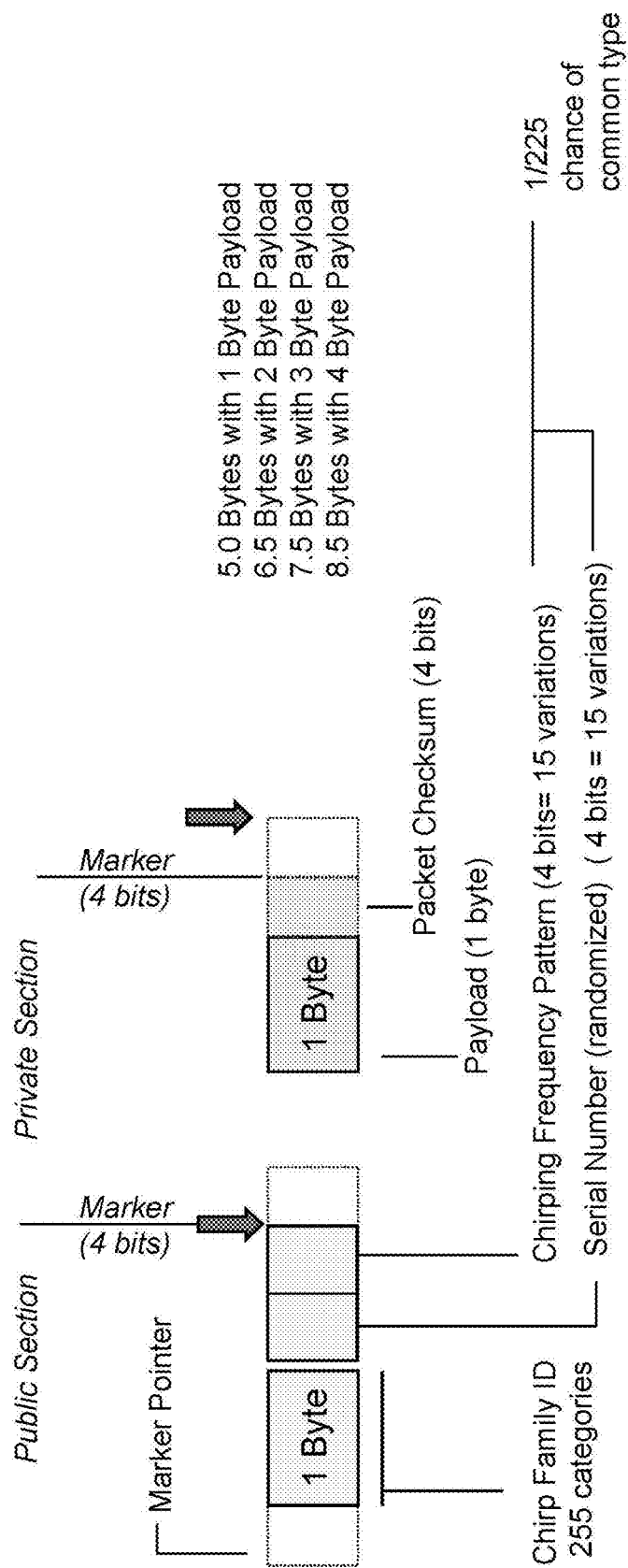
FIG. 56 depicts a category classification based approach to publishing M2M data. The Marker Pointer tells the router/propagator/agent where to look for the type of Pattern being used. Thus Marker patterns located at Byte 6, would be part of the 6.X . . . family. A 4 bit Marker pattern value of 15 would imply that data being published is part of the 6.4.15 family. This coarse granularity may be sufficient to route the published data in the general direction of interested subscribers. Further levels of finer granularity are available to agents aware of what Marker Pattern 15 signifies e.g. how the category data in the 6 bytes of (open but cryptic) finer classification data are expected to be read.

The tree structure is emulated in the IoT world envisaged. For example consider the propagators P0, P1 . . . P3 see FIG. 56. P0 is the "root" node since it has an access to the IP network bridge. P0-P1-P2 form a string of pearls relay for chirp clients C3 and C4. The both share the lineage P0.P1.P2 and hence are identified as siblings. Lineage is part of their identity.

Propagators form sections of a sub tree, the simplest of which are a string of pearls e.g. P0→P1→P2 forming a link in the chain requires at least two interfaces e.g. uplink and downlink transceivers. For example, P1 slot 0, is an uplink connecting to P0 Slot 0. P2 slot 3 is a downlink providing connectivity to P2 uplink slot 0. By convention, Slot 0, refers to the uplink, except for root nodes (P0). Root nodes have only downlinks—their uplink is the IP bridge.

The propagators are shown with 4 transceivers e.g. Infrared LEDs or other short range wire-less transceivers. They are placed in the general vicinity and with arbitrary orientation. Propagators periodically scan the environment and reorient/reassign the slots so there is always one uplink connecting to a parent propagator node. The choice is based on the best available effective throughput, all the way back to a root node. The parent selections are not always smaller hop based. For example, P2 may be able to "see" P0 but throughput P0→P2 is inferior to P0→P1→P2. In other words, Min (throughput P0→P1, throughput P1→P2) is still better than (throughput P0→P2). In the event it was not, P2 would logically reorient its uplink, so Slot 3 would now be the Uplink facing Slot 0 of P0.

Thus, a 4 slot transceiver, with arbitrary orientation, may logically reassign slots 0 through 3 to ensure connectivity back to an upstream root node. The slots 0 to 3 are thus being dynamically reassigned to maintain an effective tree based network topology.

Managing Latency in Network Tree Topologies

Propagators are placed in locations where they can form tree branches as shown above, all the way to a "root" node, that bridges to the IP edge node. Chirp networks extend the edges of the IP network without adding additional overhead to the IP end of the network and also serving as pruning and aggregation agents for IP based subscribers. In effect, they present alternatives to the current IPV6 thin client model, which, even if intermittent connectivity is assured, requires data to travel up the cloud before its essence is extracted. The cost of IP transport is minimized. And the cost of more expensive and power hungry IP aware devices is concurrently avoided.

Some chirp data is more time sensitive than others. Kicking the can upstream to big data cloud servers, simply burdens both the edge and core network infrastructures. Further, Moore's law is linear, while Metcalfe's in O(n2). As the sensor data at the edge grows, processor speeds (for both routers and cloud servers) will not keep up. Hence M2M traffic latency will deteriorate or become more expensive. Hence some relief is needed at the source of the deluge—the edge of the network. Here pruning and aggregation of only "relevant" data brings things back into balance. Metcalfe Effects are kept in check.

The primary function of the propagators/relays nodes is to send upstream "relevant" data, which agents, residing in their firmware, have expressly requested. The agents know the categories of interest. Additionally there could an exclusion list provided—for categories of no interest. The nodes will record the existence of those categories in the network, but will not forward. This reduces up stream traffic.

One cannot always know, a priori, the type of categories of interest, any more that winds can always provide focused beams of pollen to their awaiting subscribers. Some discovery is needed, through, at the very least, notification, from "mother" propagators, that a new category of sensor "bird" chirps have become "active" in a geo location under its care (e.g. sub tree of network). Notification summaries of sensor activity would therefore be periodically provided. Interested subscribers can then direct their agents/apps to provide the level of granularity/aggregation/pruning/exception handling needed.

Over time, an agent based social network emerges, agents logically reside at main branches of sub trees, where there is sufficient data flow/analysis to justify to additional processing power needed in the propagator. It is thus tree based, in accordance with O(n) scalability. There would be consumer and enterprise versions of such propagators. In consumer versions, there are limited agents at the node—most data may be pushed upstream to parent nodes and their agents, all the way to cloud servers. This multi-hop path and its associated latency may be inacceptable for some mission critical enterprise applications. In a previous era, Programmable Logic Controllers, (PLC) wired to sensors and actuators on the factory floor, managed the deluge of real time, latency sensitive M2M traffic, escalating only that which fell out of their rule based relay ladder logic diagrams used by PLCs. Today, that same approach may be applied to rule based agents residing on propagators, close to the sensor/actuators. This reduces latency for enterprise class M2M communications.

Beacon Heart Beats

The extensible chirp protocol may be used by propagators also, to provide information at various levels of granularity. Within the propagator community there will be specialists who will connect only to other specialist relays. They may limit their relay efforts to specific chirp categories or devices thereby forming a private and exclusive logical chirp network. These specialists may use other nodes to provide their transport and routing, but in effect, the meaning of the data being routed in intra specialist.

In order to support routing requests from the wider community, all propagators collaborate when possible—in service of the larger network. Thus basic routing is part of a common protocol and language, extensions are specialist/navigation agent based.

The basic routing is akin to layer 2 wired switch stacks and their wireless mesh node equivalents, see FIG. 1. In both cases, tree topology ensures scalable O(n) routing overhead. In each case, there is only one uplink.

The very basic "beacon" information that relays may transmit must minimally include the hop cost, toll cost and parent name. The parent name is needed, because then a prospective child can talk directly to the parent. Recall the grandparent manages scan and switch events. Hence, they know if a better parent is available but is out to lunch, performing a scan. Thus, a propagator node may be left awaiting association permission from a prospective parent node's parent till a scan is over. This delay ensures that connections once made do not have to switch to a better candidate, discovered after some later scans. The grandparent is being proactive.

Thus, the very basic heart beat from all nodes must contain:

1. My name
2. My Parent Name
3. My hop level—from the root node
4. My Toll Cost.

The orphan, during its scanning period after power up, sends and receives probe requests from multiple connected nodes in its vicinity. It can surmise which candidates are siblings, based on their parent name. Should it join either sibling, it is assured of collaborative alternatives within the same sub tree (the aunts). This engenders its "survival", in terms of redundant paths with minimal changes—the rest of the sub tree back to the root node is unchanged, between sibling switches. Routing updates are only needed at the last hop. In contrast, switching between entire sub trees is more onerous, especially if that sub tree's siblings are not available as back ups. Survival favors joining sub trees with multiple accessible sibling mother/aunts.

Latency and Throughput Tradeoffs

Beacon heart beats enabled orphans to discover potential parent presence. Their relative proximity is measured during probe requests, to determine effective link quality and include that in its selection process. The total available throughput in a string of pearls link is simply that of the weakest link—the link with the worst "performance".

Candidate parents may thus receive pings to test aggregate link quality all the way up to the root node. In general, each node has an inherent predilection to choose the best "lineage" to connect with. But there are tradeoffs. Ideally, all things being equal, nodes would wish to connect as close to root nodes as possible—since M2M traffic is largely upstream. However the link quality to a distant node, may be a lot worse than going through intermediary nodes.

In the simulations above, overall back haul throughput, from all upstream traffic to the root degrades as the tree topology (Caption 1) is modified by Toll Cost/Hop Cost ratios favoring low hop cost. Notice that Caption 4 is the familiar hub and spoke, single hop topology—with the worst overall throughput.

In addition to overall link quality, ascertains through pings, the availability of the candidate parent to service additional requests drives the final decision. Great overall backhaul throughput is academic if the node is already saturated, based on its limited processing power.

Toll Cost provides the nodes level of availability. Higher toll cost nodes are being selective, mindful of their own limitations and therefore protecting their existing clients for being crowded out. Thus allegiances are formed, where propagators develop preferences to belong to particular sub trees that demonstrate healthy characteristics (e.g. multiple sibling accessibility etc.)

Routing Table Updates

Having joined the network, nodes must now relay chirp broadcasts in their vicinity. Nodes have one uplink, to maintain the tree structure, though multiple uplinks, servicing disparate trees (to avoid cycles) is also permitted. Multiple downlinks can service both chirp and IP traffic on both the same and distinct wireless interfaces. The uplinks, could be either chirp or IP based (e.g Wi-Fi).

For each disparate uplink, routing tables are maintained that provide layer 2 switch stack functionality. Packets are moved either up the tree to ancestors or down the tree to descendants. The decision is based on a condensed routing table, updated by each node, based on comprehensive routing heart beat sent periodically and circulated within the relevant sub tree.

Thus nodes, operating on different frequencies, send out heart beats received through its uplink to a parents downlink. It then rebroadcasts it, both on its downlinks and uplinks, operating on different frequencies. Nodes now receive updates on their own uplink and downlink channels and disseminate the information to their own sub trees. In effect Nature's equivalent of allergy season is in effect. It is seasonal, because each heart beat is tagged with a counter number. Since heart beats will travel multiple paths in broadcasts, nodes ensure that the same counter number is not rebroadcast. Further, each node and its agents may decide how far up or down the tree to provide the broadcast. For example, a parent switch to sibling aunt requires no further broadcasts than the last hop routing table.

Eventually, each node is aware of 1. its own immediate children
2. In the case of propagator nodes, their children etc
3. Adjacent nodes that may serve as alternate parents
4. Its current overall current link quality and throughput
5. Through scanning, the overall link quality of alternate parents Over time, the cost of switching back and forth is reduced by developing more data on both the current parent and its alternatives. This information leads to stable networks at the local levels.

The routing table is available to all members of the current sub tree to (at least) the level of a grandparent. Thus each node is aware of is entire sub tree of descendants below it, at least two hops down. After that, it is somewhat irrelevant, since its grandchildren, on having the packets delivered to them, will know how to relay it further. All the grandparent needs to know is *roughly* where the chirp parent node, resides e.g. which portion of its descendant sub tree—a general direction of routing suffices. In the event chirp devices move around, one or two packets intended for them, will be lost (there is no retry or retransmission in chirp world). But most traffic is upstream. It suffices, for each chirp descendant under its care, nodes need only be aware of:
1. Chirp device Descendant's immediate parent propagator
2. Location of that parent node within its sub tree (e.g. lineage)
3. Hence a lineage path from root node to chirp device exists.

Some chirps will be picked up by multiple propagators. They will all rebroadcast the packets, in the directions specified (up/dwn). However in each case it will tag the packet with the chirp device's immediate propagator, which is the last part of a lineage tree. Multiple chirp packets will thus travel separately up stream through different relay paths, from multiple propagators that pick up the chirps in their vicinity. Multiple lineage paths are available.

Multiple paths is useful when redundancy is desirable. Such is not the case with chirp sensor data and the relative unimportance of any single chirp. Hence pruning of multiple paths is performed at the grandparent level. Chirp packets are relayed through one node only, typically the node closest to it and therefore the best link quality. Others, also picking up the chirps directly from the devices, are directed to ignore those chirps. The chirp device is now assigned a unique lineage or relay path back to the root. Thus, even in the case of unidirectional chirp streams, an association is made, to prune redundant traffic.

A tree based, scalable, hierarchy driven control system emerges, where filters are applied to progressively reduce redundant data upstream. Here is the beginning of small data, as data being sent upstream continues to be more refined as it passes through multiple rule-based logical sieves. The agents may be simple, ant like, but their strength also lies in numbers and their ability to support multiple interpretations of the same data and provide that perspective with significantly lower latency than if everything was pushed up to the cloud. There are situations where raw chirp data needs to send all the way up, but like the Mars Rover, when latency matters, some level of local autonomy is essential to the survival of a network burdened at the edges.

Thus, in this model of IoT, As schools of chirps travel upstream up the river to the root, agents at strategic locations along the chirp route may perform local pruning, aggregation and exception handling, thereby reducing the traffic and improving load performance. Since multiple agents can be operating on the same data, some form of collaborative scheduling and sharing of timing requirements is needed. This will be discussed in a later chapter.

Returning to pruning lets examine the savings in IP traffic for a 100 sensor network. Consider, for simplicity, a 10 node string of pearls chain, each propagator/relay supporting 10 sensors, all the way back up to the root. For example, these sensors could be part of an underground coal mining tunnel, with propagators forming the life line for both IP and chirp traffic.

Simple Rule based logic watches the methane gas occurrence across the tunnel. As you would expect, methane exposure at one region, would also affect adjacent regions and hence a blob of methane gas publishers may appear abruptly and unexpectedly.

Sending such "exception handling" upstream to big data servers is clearly valuable. It is questionable whether routine and acceptable readings would be sent over the cloud. But without some local handling, there is no way of defining an exception, without a base line of routine readings. Hence agents may also maintain some short history.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A tree-shaped mesh network comprising:
   a mesh of wireless nodes forming a tree shaped network with one root node having a connection to an external network; chirp clients; and wireless network clients;
   wherein chirp clients comprise chirp devices having only one transceiver wherein said chirp devices transmit short duration messages using said transceiver wherein transmission of said short duration messages are scheduled at preset transmission intervals and said short duration messages comprise an information payload to be delivered to a participant in the mesh network;
   wherein at least one wireless node of the mesh of wireless nodes is a designated chirp-aware node wherein said chirp-aware node sets the preset transmission intervals for chirp client communication by broadcasting a beacon which prepares the mesh network for transmission by chirp clients of the short duration messages and said chirp-aware node further comprises a bridge between the short duration messages and IP based devices wherein said bridge includes a wireless receiver to receive the short duration messages and is connected to said external network;
   wherein the short duration messages are encapsulated into action frames by the at least one chirp-aware node, for onward transmission to other chirp aware routers;
   wherein each wireless node further comprises two logical radios wherein said two logical radios are implemented using a single physical radio, and a service radio wherein each wireless node uplink and downlink operates on distinct non-conflicting frequencies; and
   wherein said wireless network clients communicate with said wireless nodes using said service radios.

2. The tree-shaped network of claim 1 wherein said chirp aware nodes further include firmware which allows the chirp aware nodes to designate a type of short duration messages which are transmitted using the tree-shaped network.

3. The tree-shaped network of claim 2 wherein said chirp-aware node forwards encapsulated short duration messages to its parent node only if the encapsulated short duration messages have been requested.

4. The tree-shaped network of claim 1 wherein said nodes further include agent processing software wherein said agents process the short duration messages received by said nodes comprising the tree-shaped network, wherein said agents process the data prior to sending said data to a parent node.

5. The tree-shaped network of claim 4 wherein said agent comprises a navigation agent and a data handling agent wherein said navigation agent only processes a destination portion of the short duration message.

6. The tree-shaped network of claim 5 wherein said destination portion comprises physical destination information within the tree-shaped network wherein said physical destination information comprises node by node directions.

7. The tree-shaped network of claim 6 wherein said destination portion comprises logical destination information wherein said logical destination information comprises a designation of data handling agent for said short duration message.

8. The tree-shaped network of claim 1 wherein nodes comprising said tree-shaped network switch parent nodes to lower a number of intermediate nodes to a top node within the tree network and wherein prior to switching to a new parent a node sends a probe message to test the signal quality at the proposed new parent node.

9. The tree-shaped network of claim 8 wherein said signal quality information is transmitted by a node as part of a heartbeat information wherein said heartbeat information sent by the transmitting node includes a name of the node, a name of the parent node, a distance to the top node within the tree network, and a toll cost value.

10. The tree-shaped network of claim 9 wherein said toll cost value comprises a value assigned to the current processing power usage at the transmitting node, a value count of active terse message and propagator children, and a value assigned to a link quality back to the root node.

11. The tree-shaped network of claim 8 wherein names of nodes are assigned randomly with the constraint that a parent node may not have two children with a duplicate name.

12. The tree-shaped network of claim 1 wherein said short duration messages do not include a fixed recipient address, and further wherein said short duration messages include the information payload and a duration field.

* * * * *